United States Patent [19]

Miyoshi et al.

[11] Patent Number: 5,197,122
[45] Date of Patent: Mar. 23, 1993

[54] DATA PROCESSING SYSTEM AND EDITING APPARATUS AIDED THEREBY

[75] Inventors: Akito Miyoshi; Hiromitsu Terai, both of Saitama, Japan

[73] Assignee: Honda Giken Kogyo Kabushiki Kaisha, Tokyo, Japan

[21] Appl. No.: 355,742

[22] PCT Filed: Aug. 22, 1988

[86] PCT No.: PCT/JP88/00830
  § 371 Date: Mar. 29, 1989
  § 102(e) Date: Mar. 29, 1989

[87] PCT Pub. No.: WO89/02117
  PCT Pub. Date: Mar. 9, 1989

[30] Foreign Application Priority Data

| Aug. 24, 1987 | [JP] | Japan | 62-209776 |
| Aug. 24, 1987 | [JP] | Japan | 62-209777 |
| Aug. 28, 1987 | [JP] | Japan | 62-216231 |
| Aug. 28, 1987 | [JP] | Japan | 62-216232 |
| Aug. 28, 1987 | [JP] | Japan | 62-216235 |
| Sep. 24, 1987 | [JP] | Japan | 62-239679 |
| Sep. 24, 1987 | [JP] | Japan | 62-239680 |
| Oct. 2, 1987 | [JP] | Japan | 62-250497 |
| Oct. 15, 1987 | [JP] | Japan | 62-258293 |
| Oct. 15, 1987 | [JP] | Japan | 62-258294 |
| Oct. 15, 1987 | [JP] | Japan | 62-258295 |
| Oct. 15, 1987 | [JP] | Japan | 62-258296 |

[51] Int. Cl.$^5$ .......................................... G06F 15/20
[52] U.S. Cl. .................................. 395/146; 395/144; 395/145; 395/147; 395/148
[58] Field of Search ...... 364/225.8, 226, 523, 364/943.1, 943.3, 943.4, 943.43; 395/144, 145, 146, 147, 148

[56] References Cited

U.S. PATENT DOCUMENTS

| 4,581,710 | 4/1986 | Hasselmeier | 364/523 |
| 4,723,209 | 2/1988 | Hernandez et al. | 364/225.8 |
| 4,723,210 | 2/1988 | Barker et al. | 364/518 |
| 4,723,211 | 2/1988 | Barker et al. | 364/518 |
| 4,739,477 | 4/1988 | Barker et al. | 364/200 |
| 4,933,880 | 6/1990 | Borgendale et al. | 364/523 |
| 4,949,287 | 8/1990 | Yamaguchi et al. | 364/523 |
| 4,951,233 | 8/1990 | Fujiwara et al. | 364/523 |
| 4,996,665 | 2/1991 | Nomura | 364/943.1 |
| 5,003,499 | 3/1991 | Fujiwara et al. | 364/523 |
| 5,018,083 | 5/1991 | Watanabe et al. | 395/147 |
| 5,031,121 | 7/1991 | Iwai et al. | 364/523 |
| 5,084,820 | 1/1992 | Nagaya et al. | 395/146 |

FOREIGN PATENT DOCUMENTS

| 49-65751 | 6/1974 | Japan . |
| 52-82162 | 7/1977 | Japan . |
| 56-1983 | 1/1981 | Japan . |
| 59-214966 | 12/1984 | Japan . |

Primary Examiner—Edward R. Cosimano
Attorney, Agent, or Firm—Pollock, VandeSande and Priddy

[57] ABSTRACT

An editing means where edited data are controlled in units of at least one page. A computer decomposes the data in units of at least one page into data on elements and data on layout and transfers the decomposed data to relevant D/B's for further control. Element data keys (or temporary keys) of a format in common to various kinds of element data such as documents, illustrations, and photographs forming one page are attached to the various element data. Thus, the one page data are formed of the keys and the data, the basic layout for one page, and the positional coordinates of the element data on the layout.

10 Claims, 35 Drawing Sheets

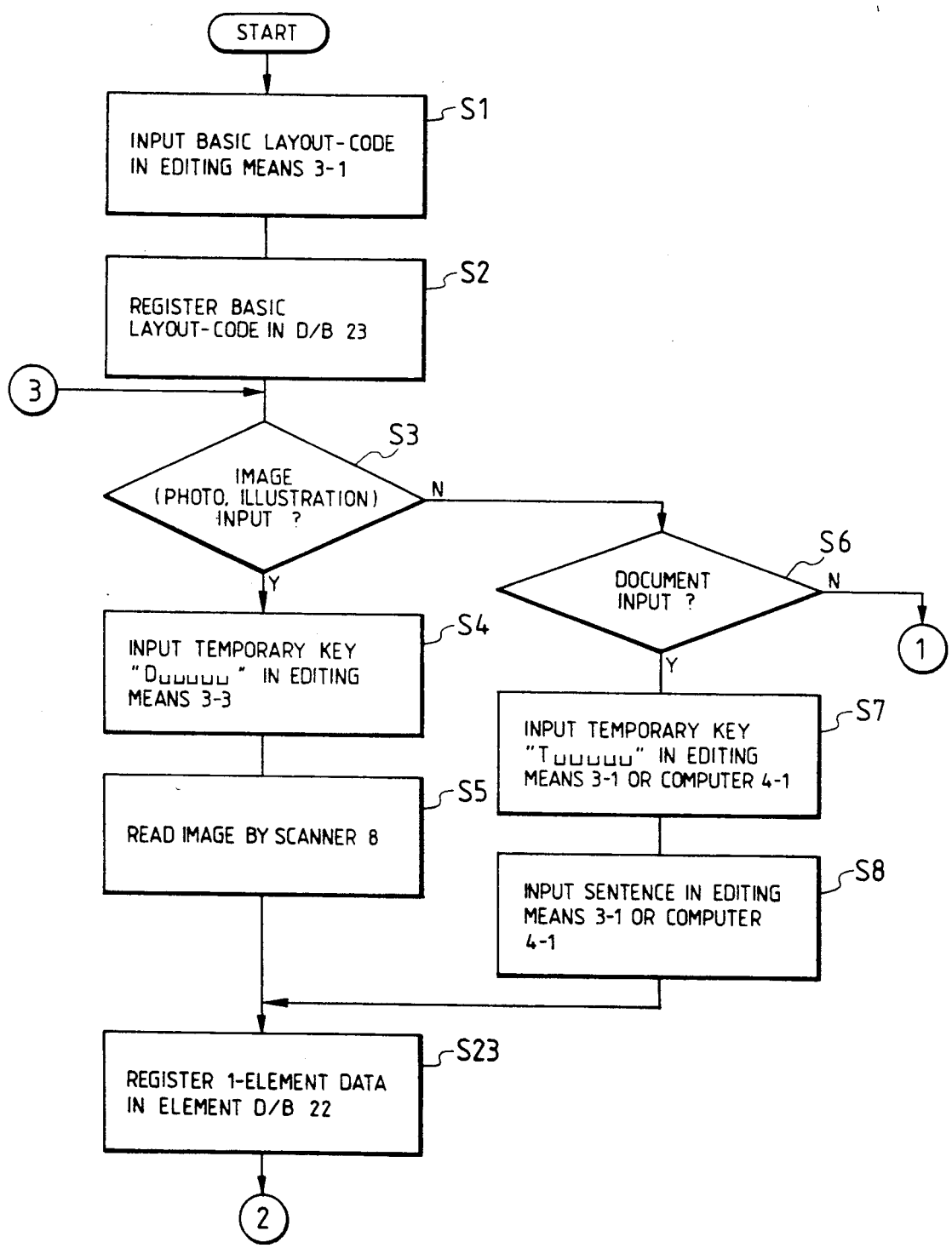
FIG. 3(1/5)

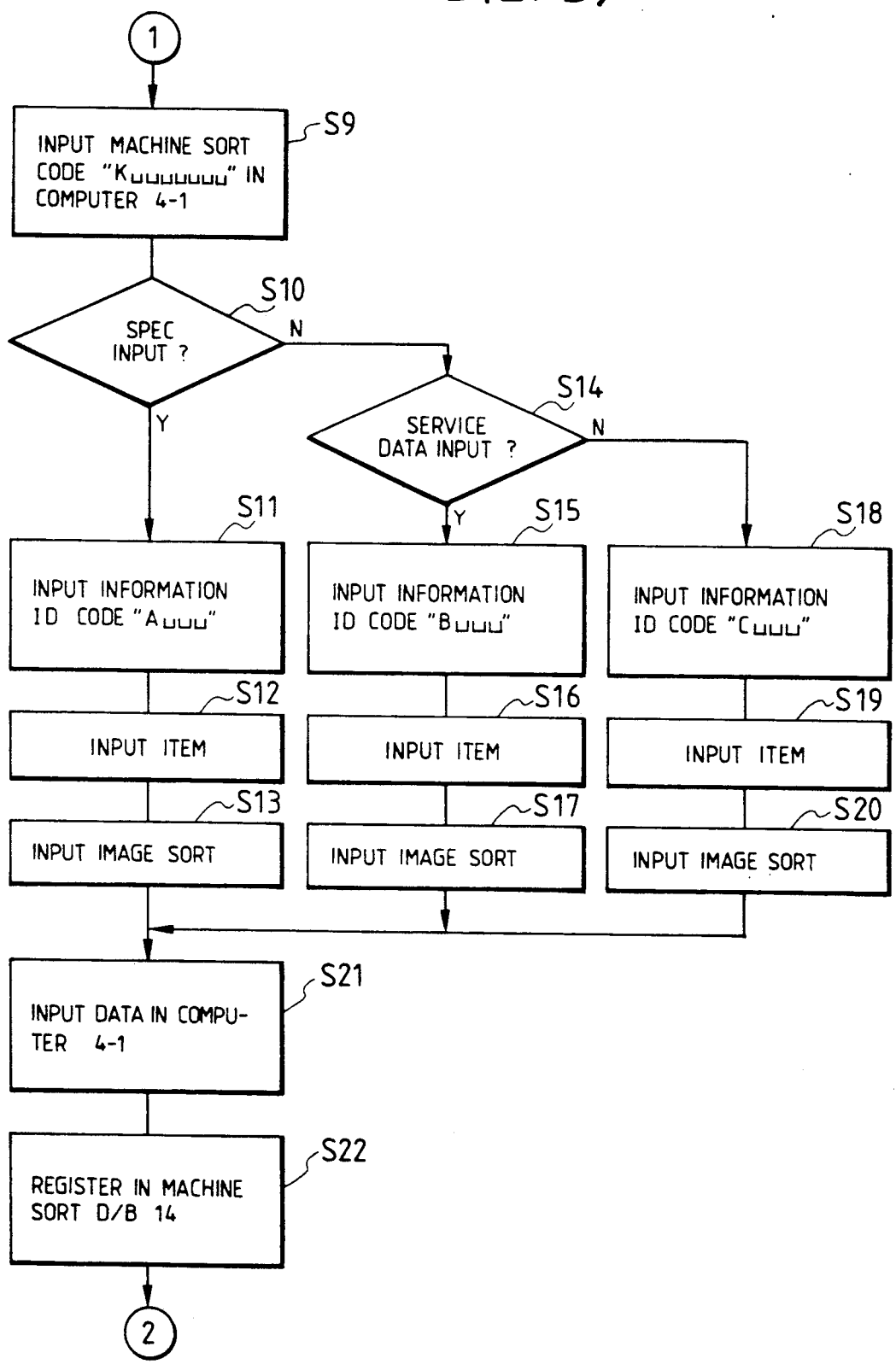
FIG. 3(2/5)

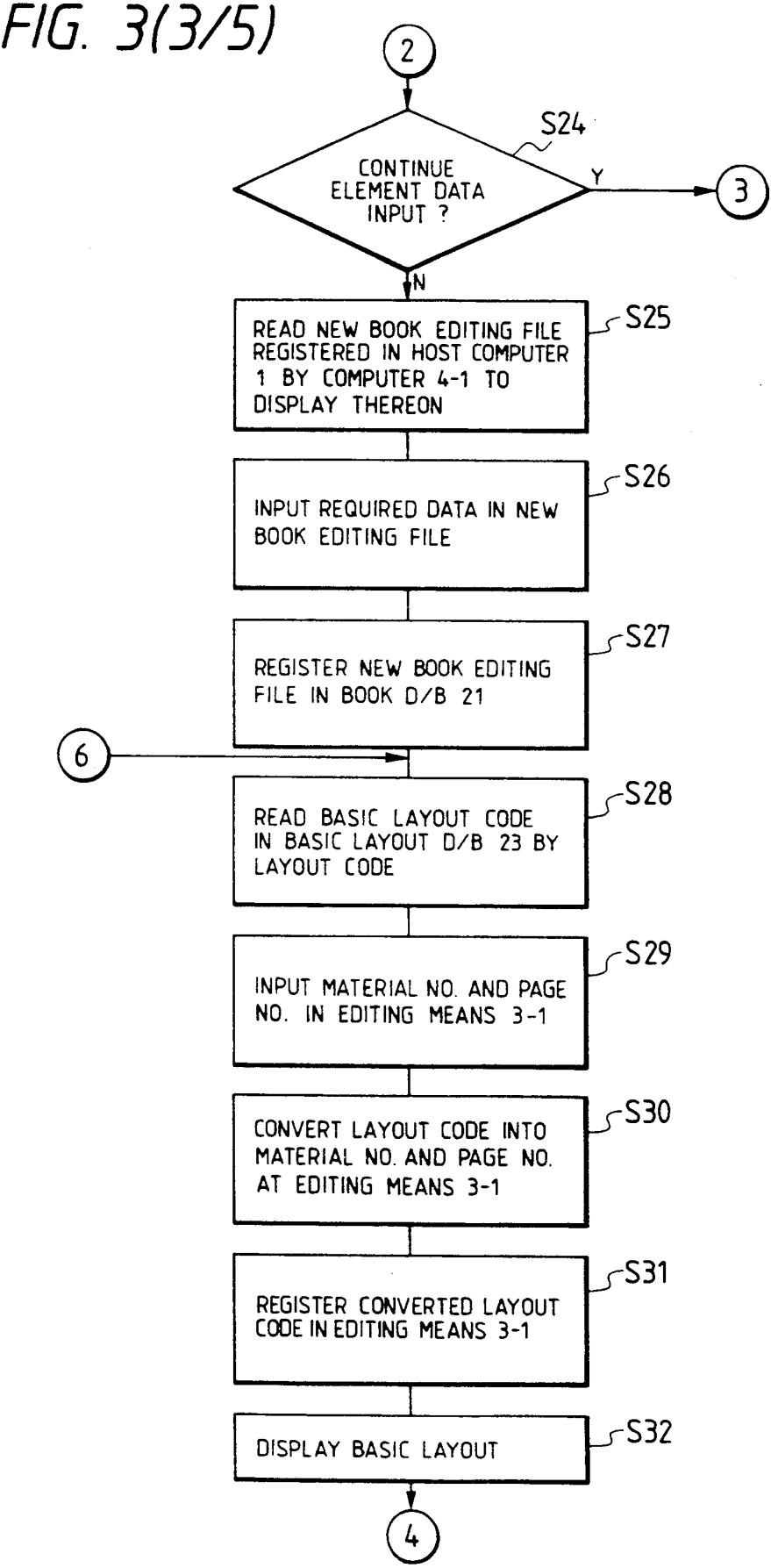
FIG. 3(3/5)

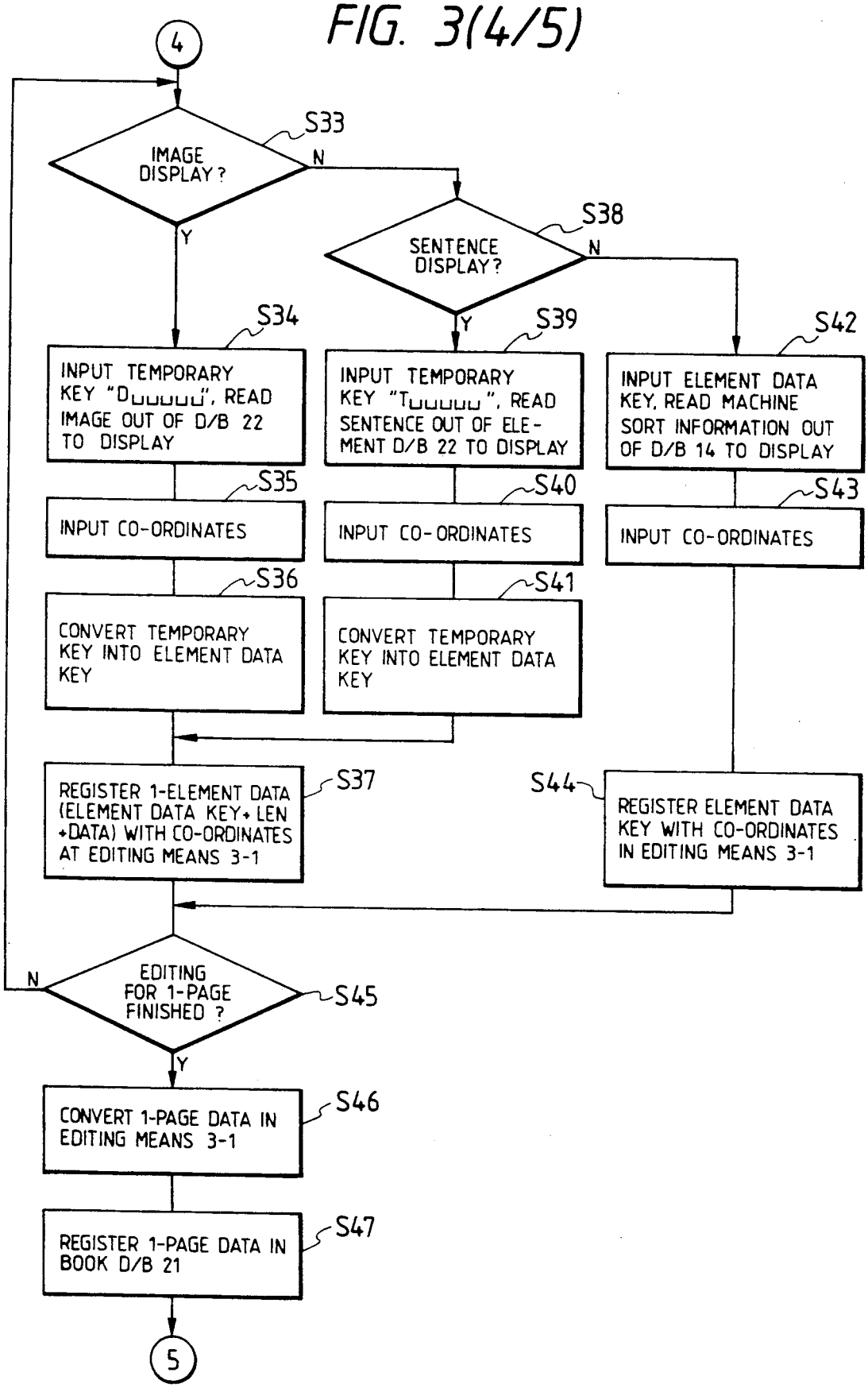
FIG. 3(4/5)

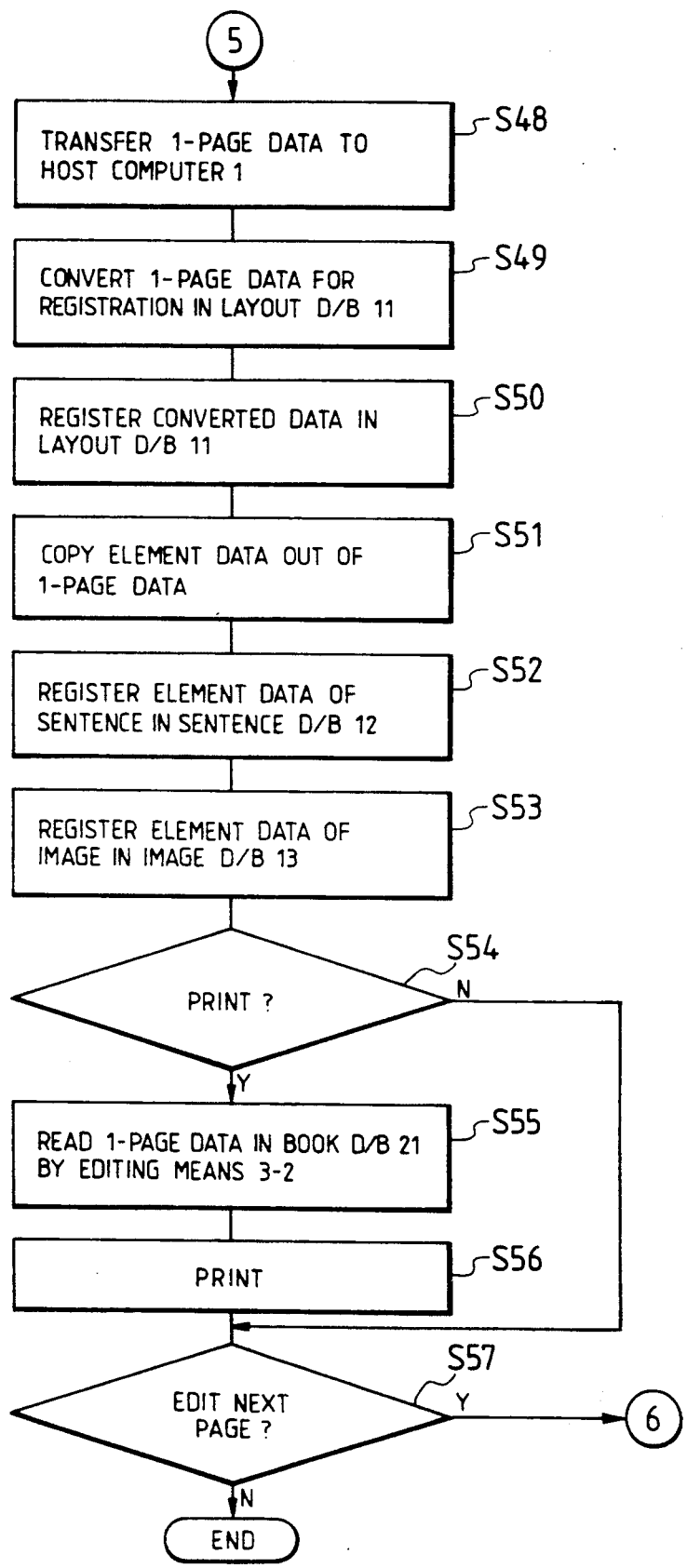

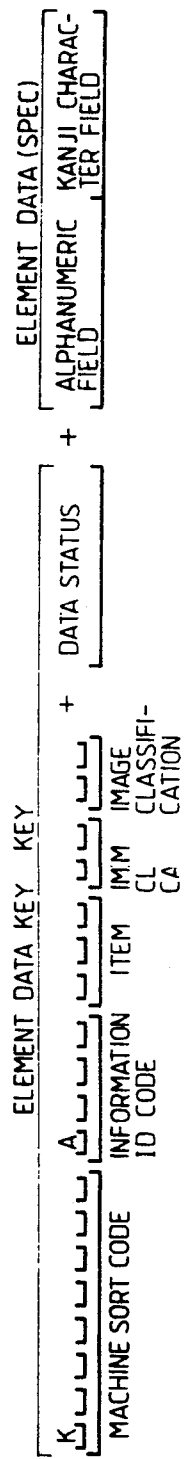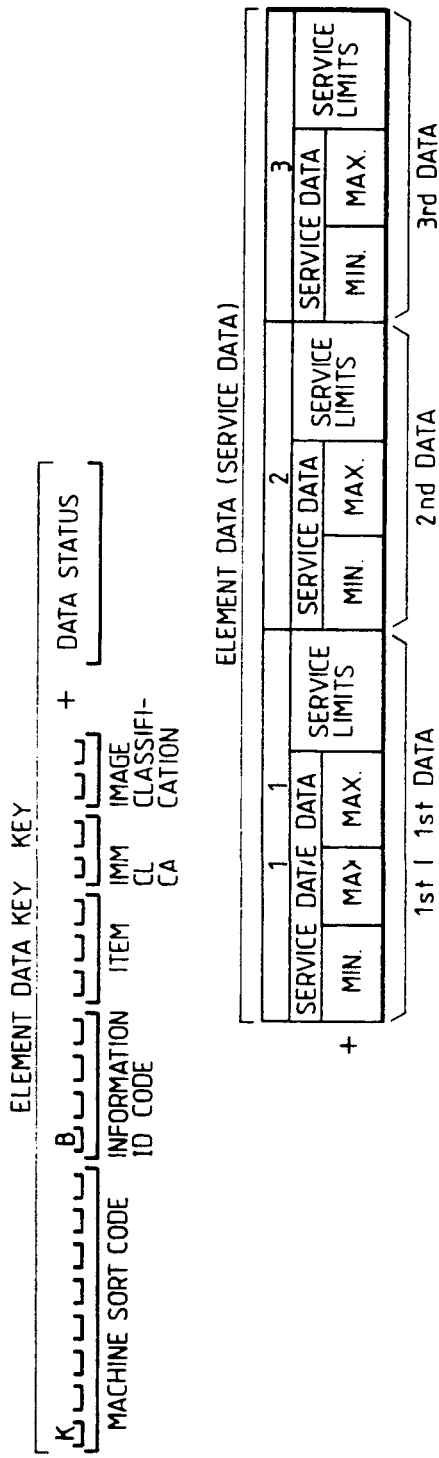

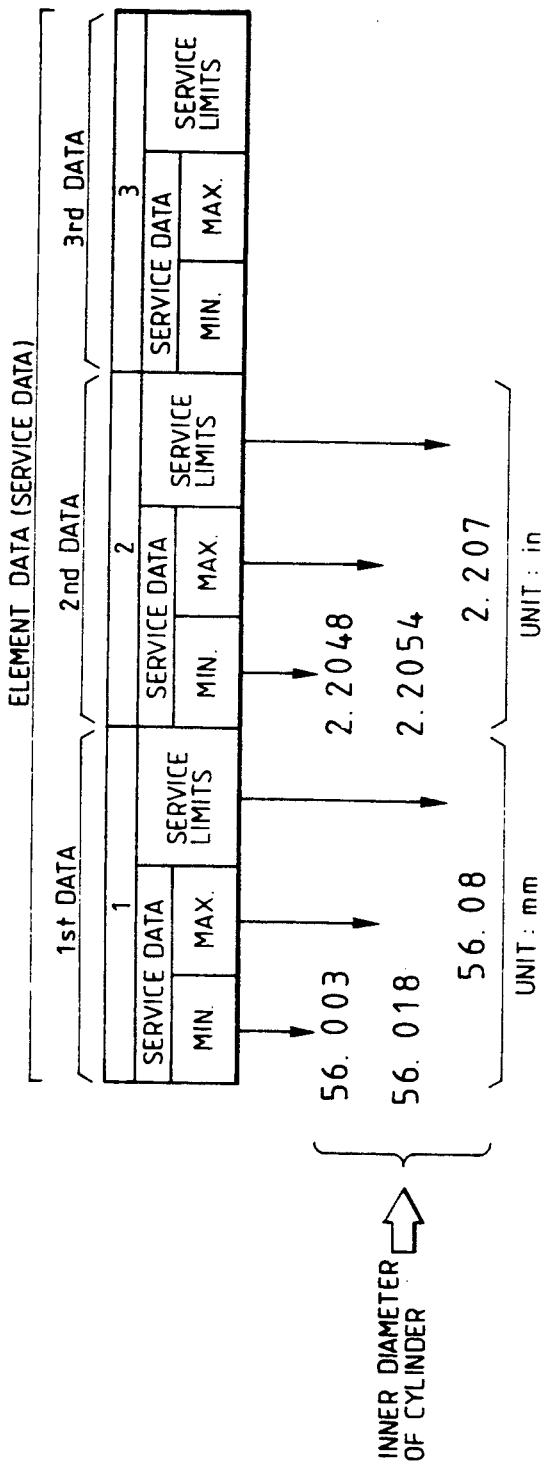

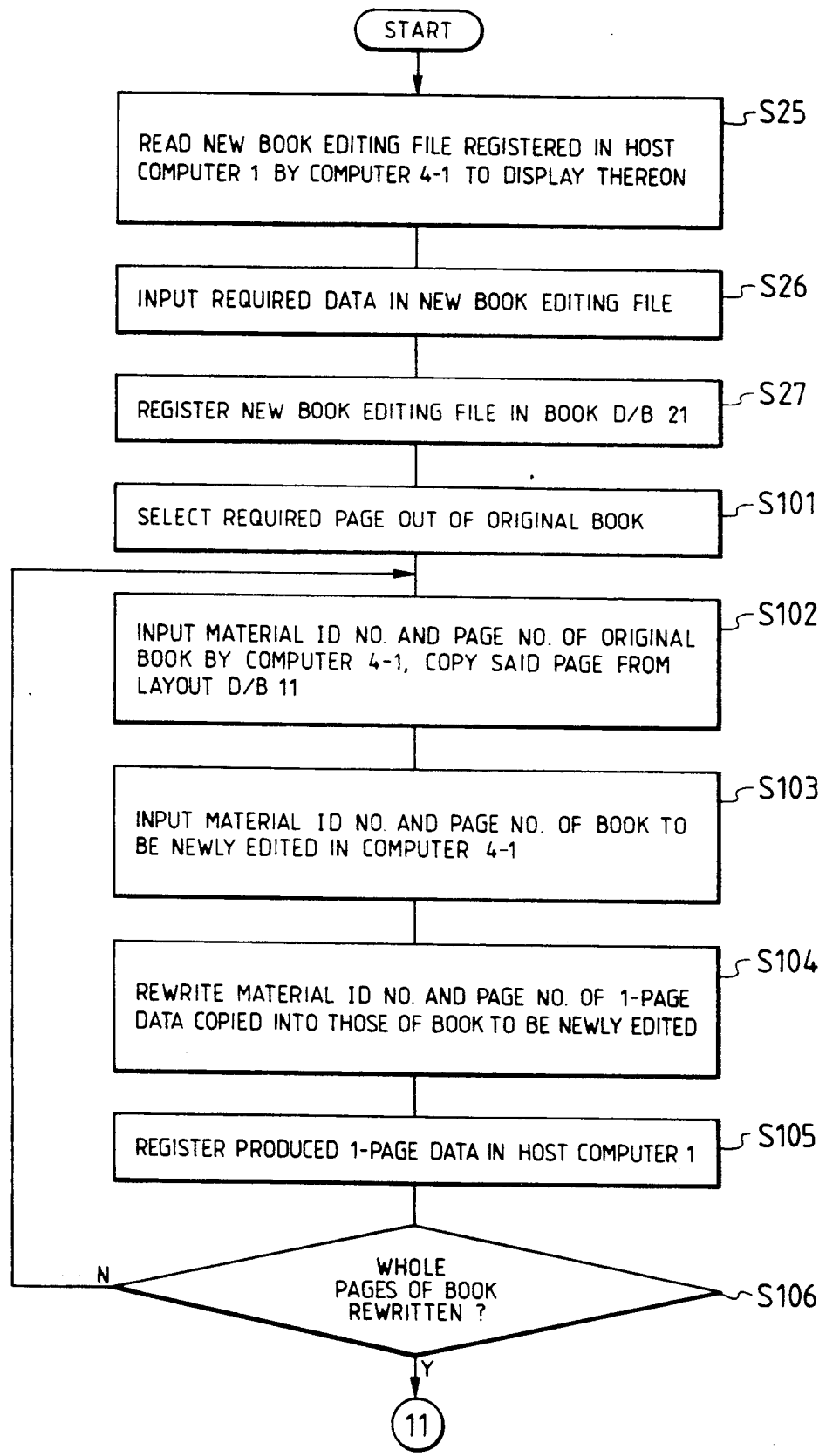

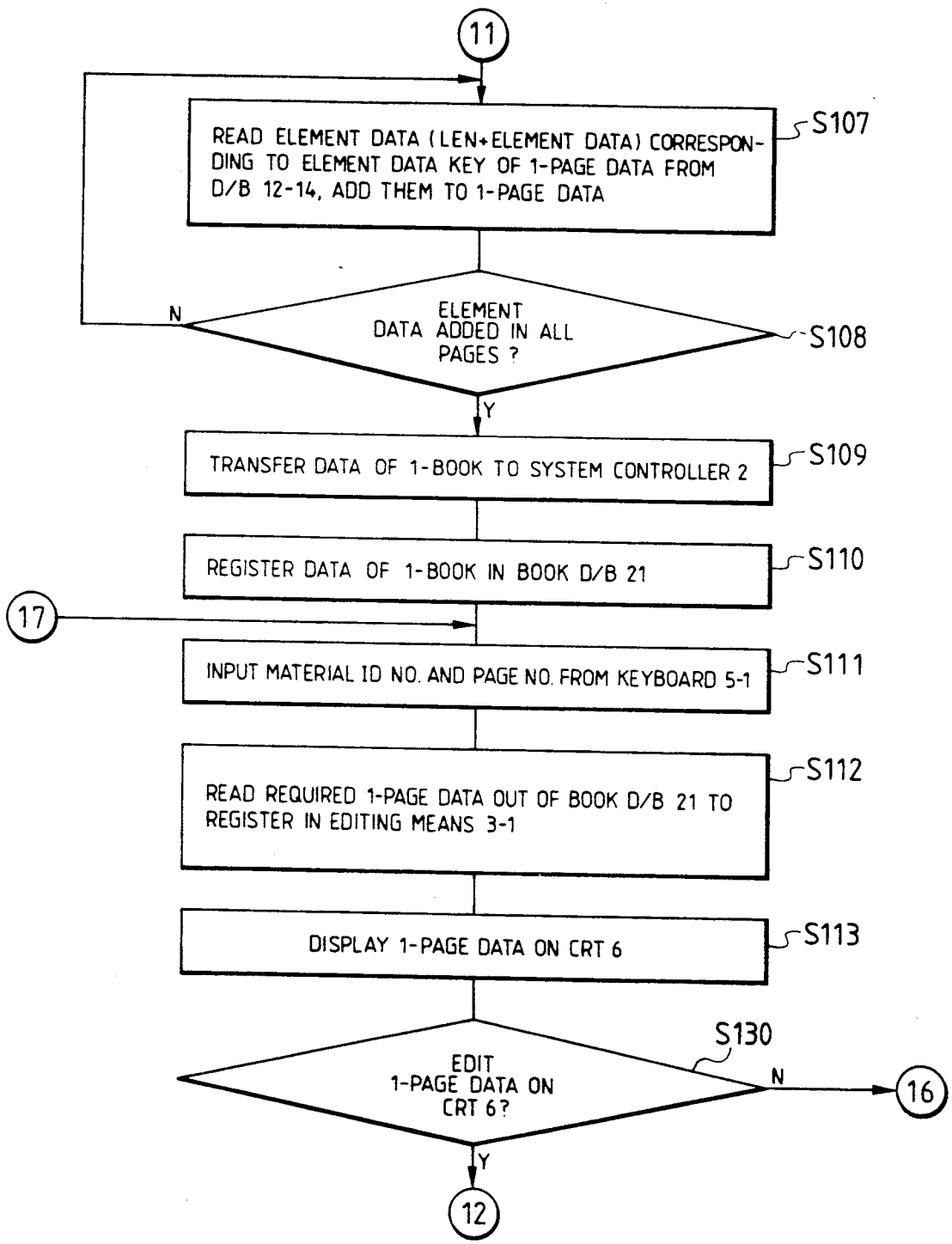

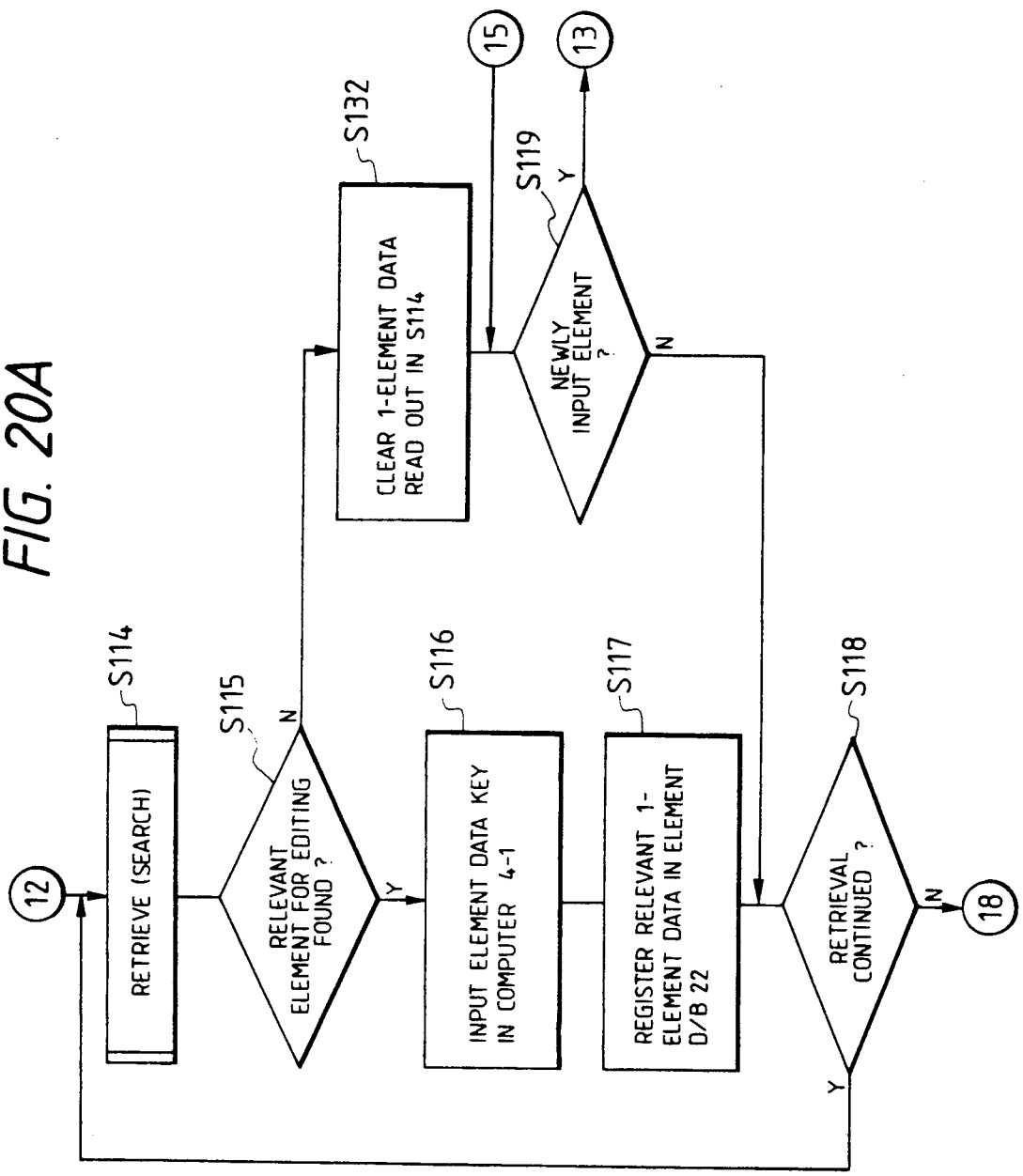
FIG. 20A
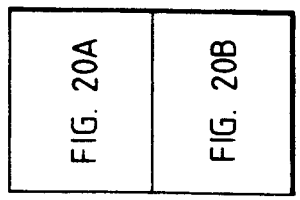
FIG. 20(3/6)

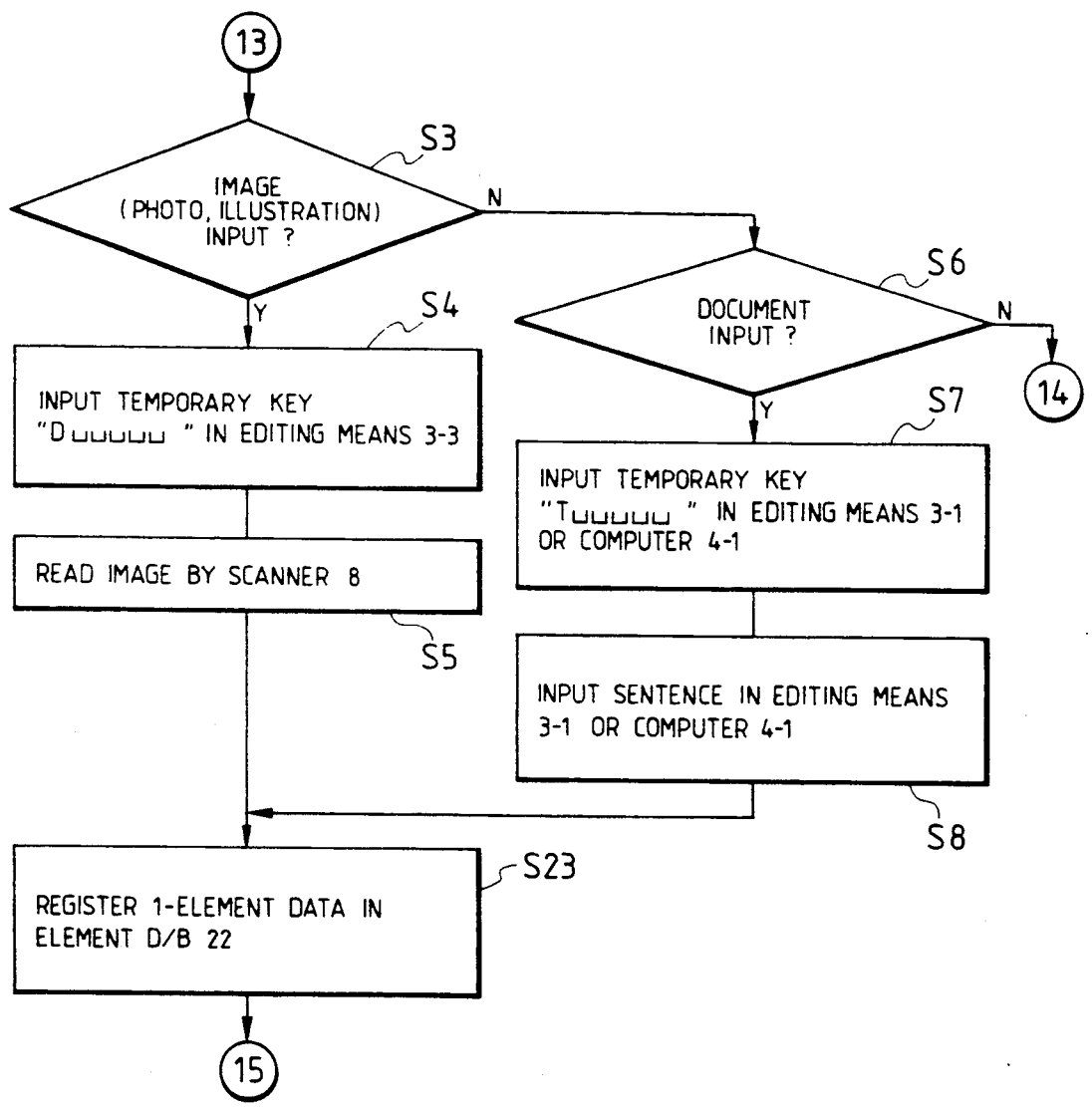
FIG. 20(4/6)

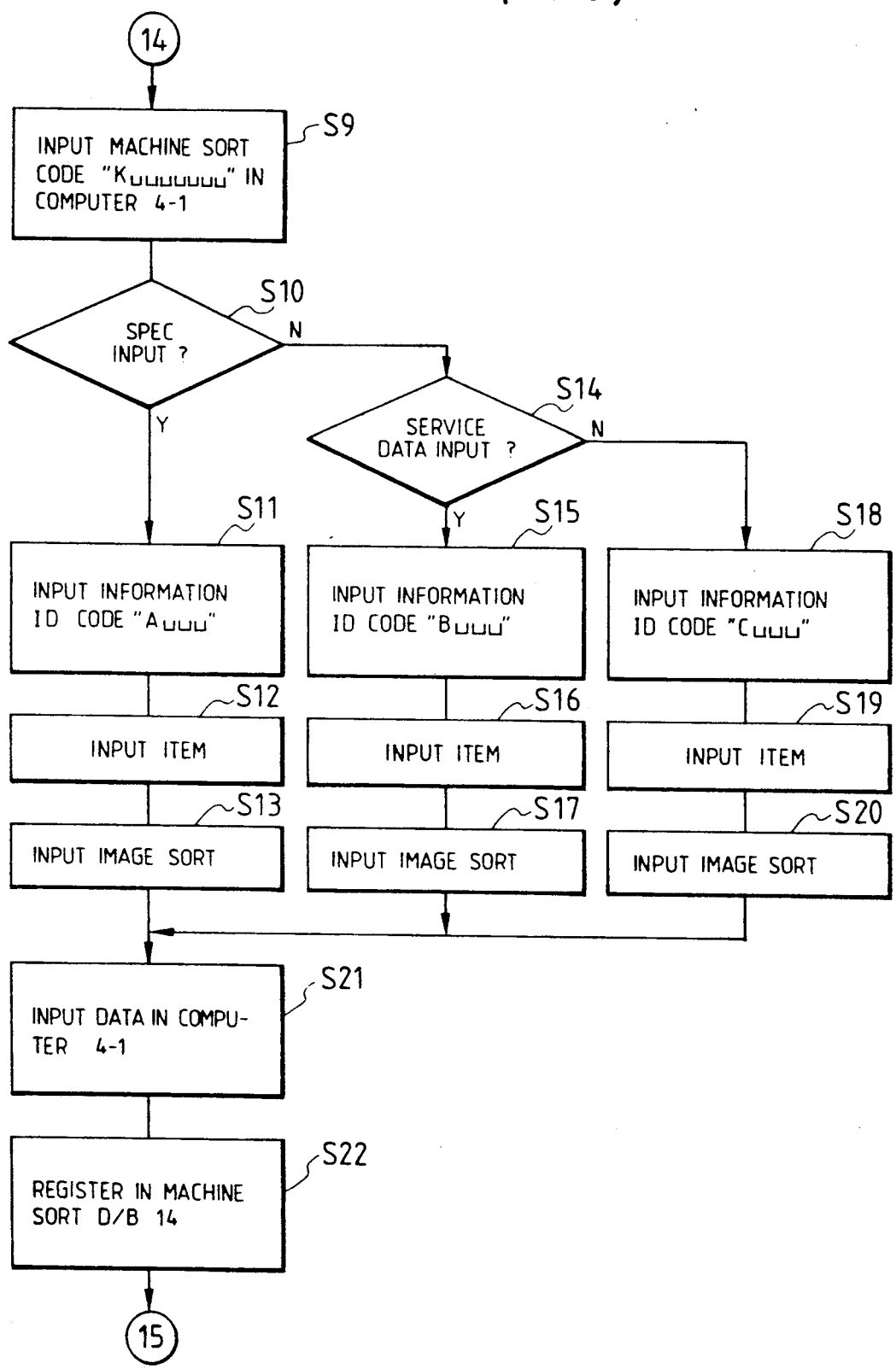
FIG. 20(5/6)

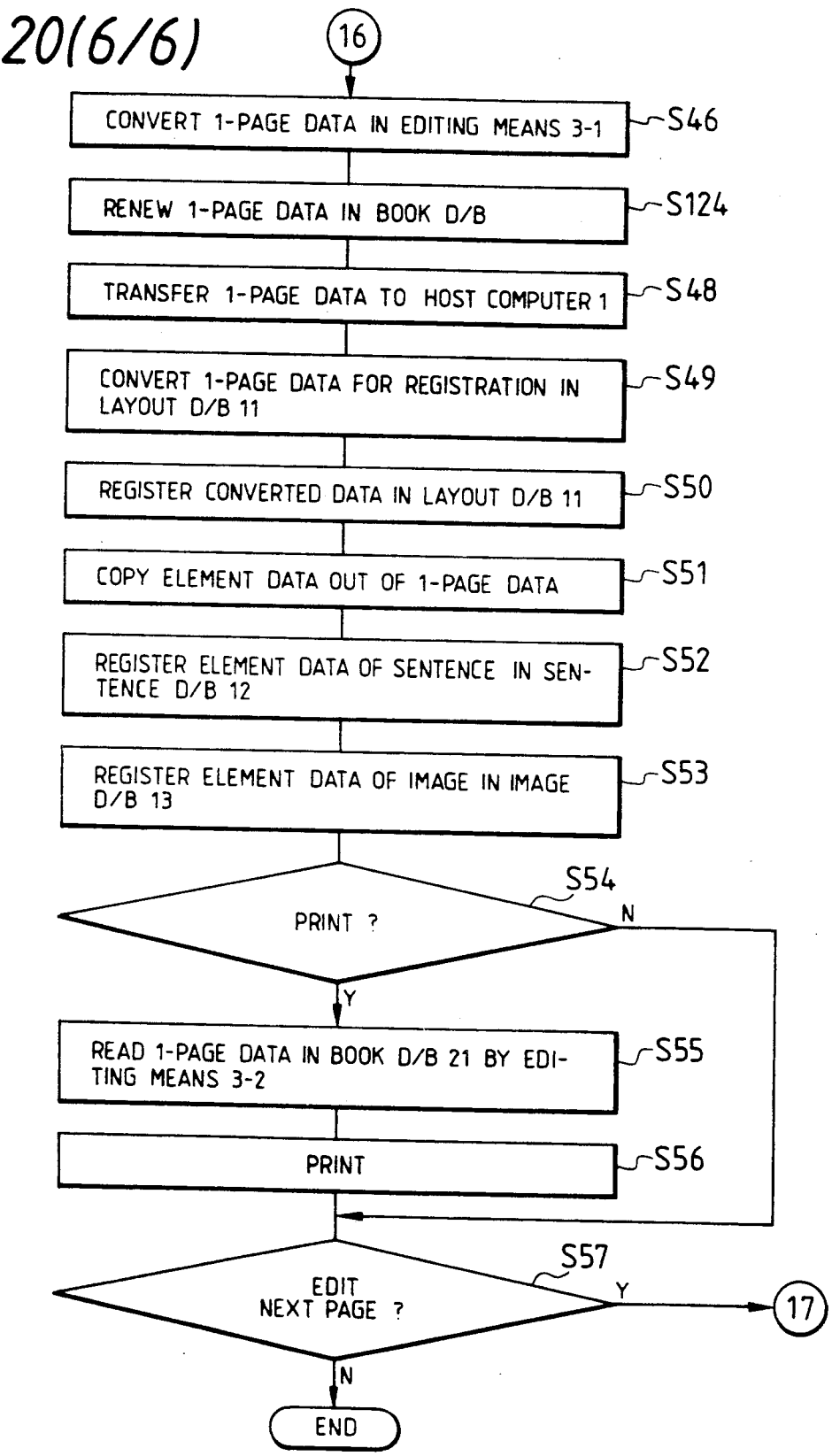
FIG. 20(6/6)

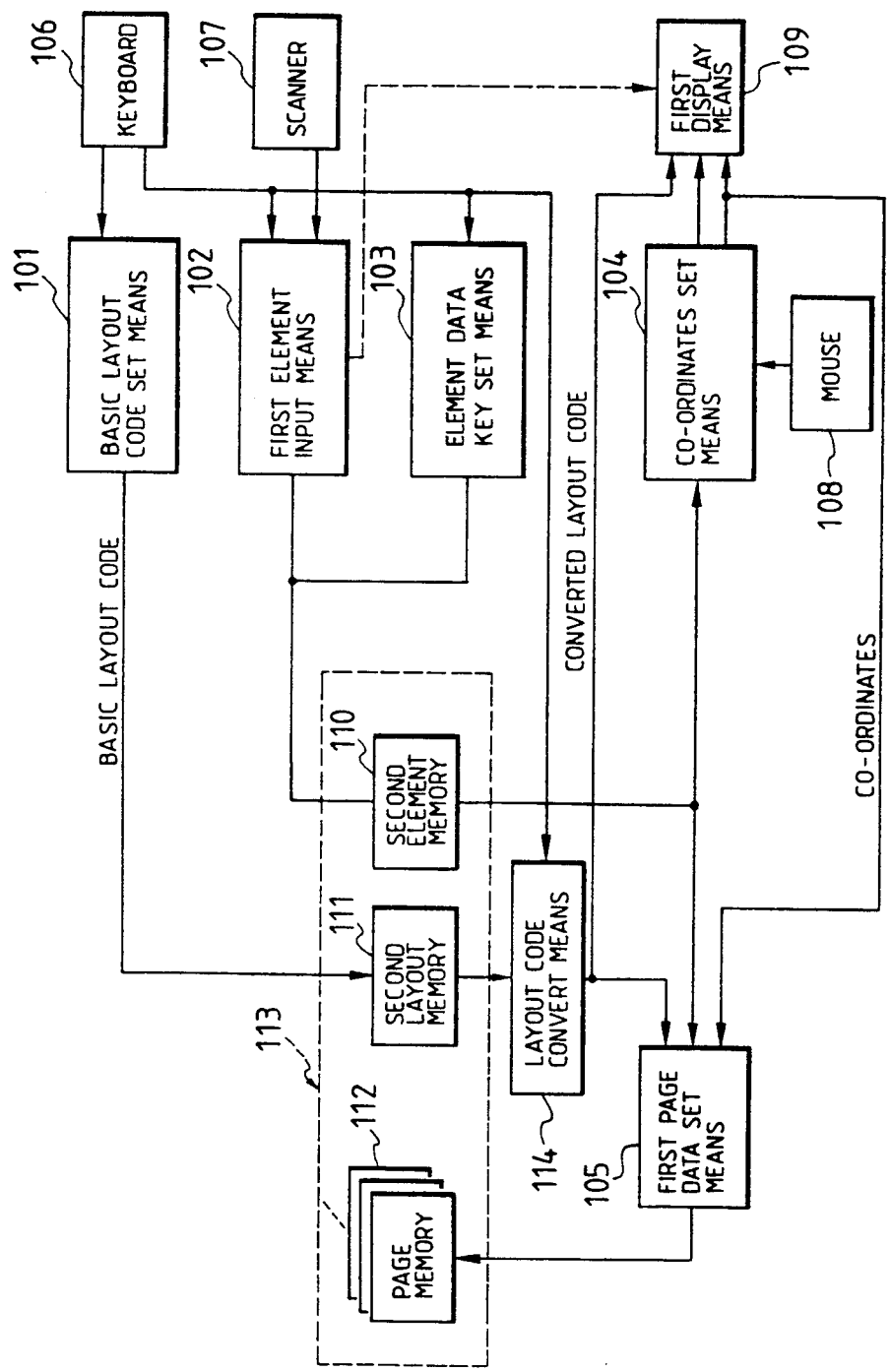

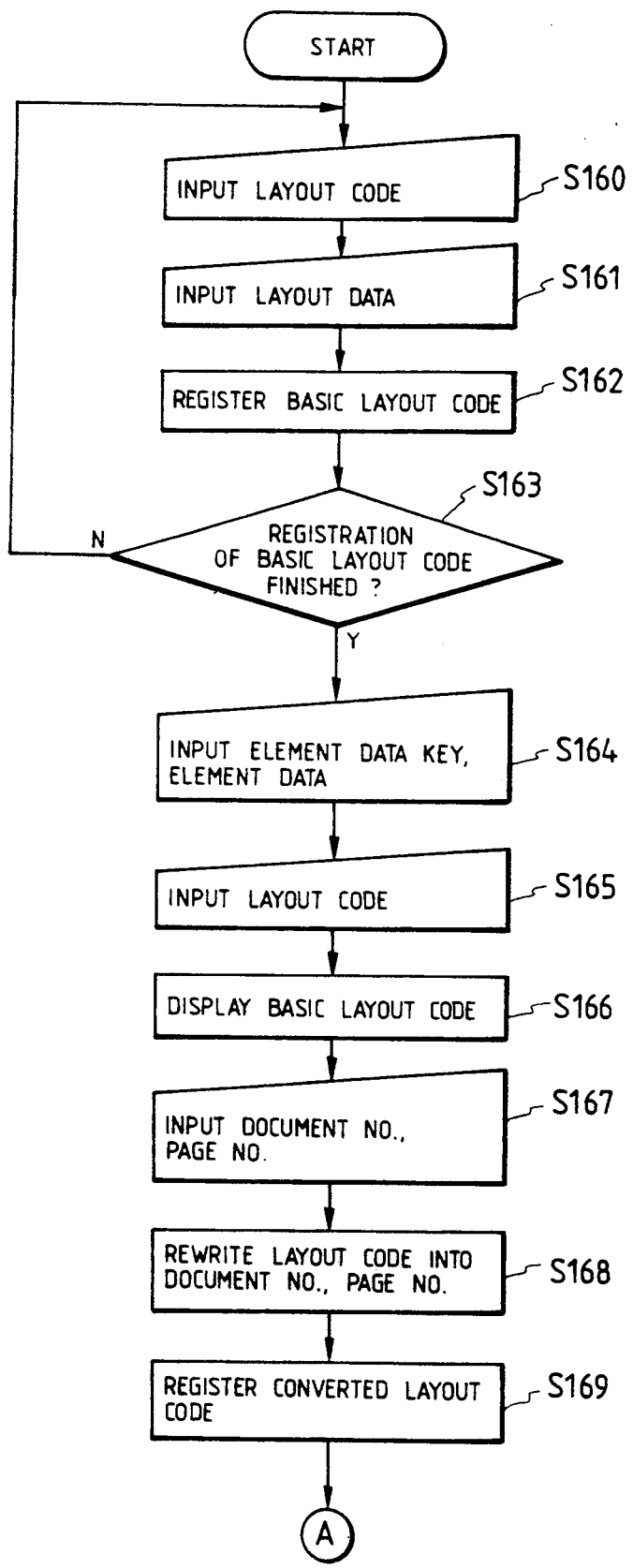
FIG. 31(1/2)

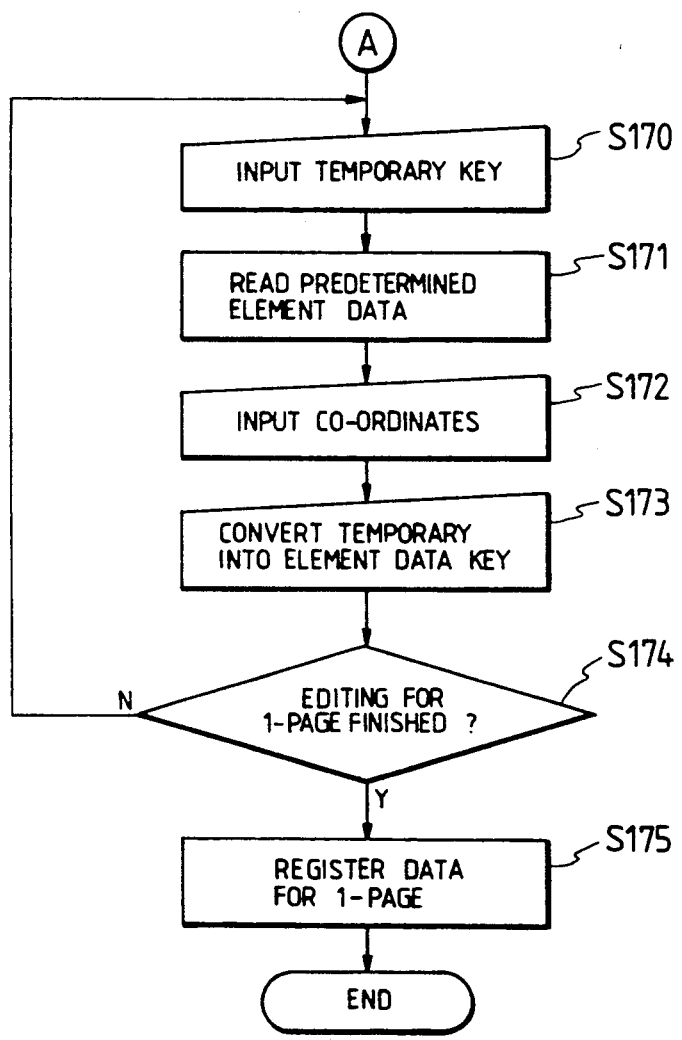
FIG. 31(2/2)

FIG. 34

| STANDARD VALUE ITEM | | NORMAL | LIMITS |
|---|---|---|---|
| INNER DIAMETER OF CYLINDER | | 56.003 — 56.018 mm | 56.08 mm |
| PISTON | OUTER DIAMETER OF PISTON | 55.955 — 55.970 mm | 55.92 mm |
| | OUTER DIAMETER OF PISTON-PIN | 15.994 — 16.000 mm | 15.98 mm |
| | ---- | ---- | ---- |

DATA PROCESSING SYSTEM AND EDITING APPARATUS AIDED THEREBY

TECHNICAL FIELD

This invention relates to a data processing system. More particularly this invention relates to a data processing system which comprises a large general-purpose computer having data bases (D/B's) connected thereto, small computers functioning as a terminal device, and medial relaying computers connecting the small computers to the large computer.

This invention relates specifically to a data processing system which automatically converts numerical data introduced therein in specific units into data in other units and handles these data as one set of data.

This invention relates further to a method and apparatus for editing by the use of the data processing system, particularly to a method and apparatus for editing which is capable of quickly and easily accomplishing the editing of handling manuals on automobiles and electric appliances and books, magazines, and newspapers in general (hereinafter referred to simply as "books").

BACKGROUND ART

In a data processing system which comprises a general-purpose computer provided with D/B's and small computers (terminal devices) connected to the general-purpose computer, the terminal devices are used for the traffic of input and output data and the general-purpose computer performs a prescribed processing by using the input data and the data registered in the D/B's and, from the data obtained as the result of the processing, selects only pertinent data and causes them to be registered in the D/B's.

In the data processing system constructed as described above, the general-purpose computer is required to control the D/B's and, at the same time, carried out the data processing. When the general-purpose computer is provided with many terminal devices, therefore, heavy traffic of input and output data through the terminal devices has the possibility of causing temporary congestion of load on the general-purpose computer and consequent impairment of the computer's capacity for data processing.

In recent years, the work of editing a book has come to be carried out by the use of a data processing system which comprises a host computer provided with D/B's and personal computers and work stations (editing devices) connected to the host computer. In this case, the host computer performs a prescribed processing using the input data and the data registered in the D/B's and, from the data obtained by the processing, selects pertinent data and causes the data to be registered in the D/B's.

As described above in the conventional editing apparatus wherein the host computer is provided with many editing devices, heavy traffic of input and output data through the editing devices has the possibility of causing temporary congestion of load on the host computer and consequent impairment of the computer's capacity for data processing.

The drawback mentioned above is eliminated by interposing medial computers between the host computer having the D/B's connected thereto and the small computers handling input and output data, causing the medial computers to control the small computers and carry out data processing, and enabling the host computer to engage exclusively in controlling the input data to and the output data from the D/B's.

An attempt to employ as the host computer a large general-purpose computer which is serving as a common host computer for various data processing systems entails the following problem.

Specifically in the editing apparatus constructed as described above, when the transfer of data between the medial relaying computers and the large computer is effected by a real-time processing, namely a processing which comprises receiving demands or data for processing from time to time, immediately carrying out a processing thereon, and feeding out the result of the processing, the large-scale computer is compelled to stand in a suspended state waiting for the arrival of the input data from the medial computers even when the actual work of editing is not in progress.

The time in which the large computer is held in an idle state is long and, as the result, the time in which the large computer is used as the host computer for editing devices is proportionately long. Thus, there arises the possibility that the capacity for processing to be exhibited by the large computer in serving as the host computer for the other data processing system will be inferior.

The work of editing a book by the use of the data processing system is carried out by putting new text and illustrations in each of the pages of the book. The information for the book is memorized in the memory device page by page of the book.

In the conventional editing apparatus constructed as described above, the information of an edited book is stored in the memory device and controlled page by page. In the production of two mutually similar books such as, for example, handling manuals of automobiles mutually similar in style of coach, one set of stored information cannot be used in common for the two books, though the two books have many documents and illustrations in common. All the documents and illustrations, therefore, must be newly input for the pages of the new book to be edited. The production of such books, therefore, takes up much time and labor and proves to be expensive.

The conventional editing apparatus described above entails the following problems.

(1) In the conventional editing apparatus, the information of an edited book is available exclusively for processing by the editing apparatus. In other words, the information or data of the edited book cannot be utilized for the data processing system which carries out any processing other than the processing for the editing books.

Whenever some part of the contents of the information of the edited book is looked up or retrieved, it is needed to be attained either by the use of the editing apparatus or by personally reading the actually produced book. Incidentally, the editing apparatus or the terminal devices of the editing apparatus are relatively expensive. A scheme of having these items installed at various places within an enterprise, for example, is highly uneconomical and entails a grave inconvenience of having the produced books stored one each at the places of installation mentioned above and read personally.

(2) Further the information of an edited book is stored in the memory device page by page as described above. When a part of the information of the book edited is to be sought out by the editing apparatus, for example, since the information of the book is displayed in units of page on the display device, information of no interest is also displayed.

The work of seeking out any pertinent part of the information, therefore, cannot be carried out efficiently and proves to be highly intricate.

When a part of the information of the edited book is to be printed, parts of no interest are also printed out for the same reason as given above.

When a service manual or a shop manual covering an automobile or a motorcycle is to be edited, the reconditioning data which define the specifications and the standard numerical data of the component parts of the automobile or motorcycle must be produced. FIG. 34 is a table showing a typical set of reconditioning data for a motorcycle.

As illustrated in FIG. 34, the reconditioning data table is composed of designations of items such as "inside diameter of cylinder" and "outside diameter of piston," standard numerical (minimum and maximum) data of the items, and data of working limits. The conventional technique described above has entailed the following problems.

(1) The reconditioning data shown in FIG. 34 are entered in a service manual which is intended for distribution in Japan. The numerical data are indicated therein in units of mm.

When this service manual is to be produced in a version fit for distribution in countries using the yard-pound system, for example, the numerical values must be indicated in units of inch, for example.

When the motorcycle is manufactured in a country using the metric system, the numerical values in units of the metric system are converted into those of the units of the yard-pound system and the reconditioning data table is produced by using the data resulting from this conversion.

Since this conversion must be carried out by the editor of the service manual, the production of the table of reconditioning data and consequently of the service manual takes up much time and proves to be intricate.

(2) Where the numerical data are indicated in units of the metric system and their equivalents in units of the yard-pound system are additionally indicated as juxaposed thereto, since the numerical data in units of the metric system and those in units of the yard-pound system must be put in together, the production of the reconditioning data table and consequently of the service manual takes up much time and proves to be intricate.

This invention has been produced for the solution of the problems mentioned above.

SUMMARY OF THE INVENTION

This invention, for the solution of the problems mentioned above, contemplates a system comprising a large general-purpose computer having D/B's connected thereto, small computers handling input and output data, and medial relaying computers interposed between the large general-purpose computer and the small computers, which system is characterized by the fact that the medial computers are adapted to control the small computers and perform data processing.

This invention is also directed to an editing apparatus comprising a large general-purpose computer having D/B's connected thereto, and small and medial computers, which editing apparatus is characterized by the fact that the transfer of data between editing devices and the large general-purpose computer is effected by batch processing, namely a technique by which necessary data are allowed to collect into groups and subjected collectively to processing.

The large computer, therefore, is only required to control the input and output data to and from the D/B's. This precludes congestion of load on the large computer and prevents the large computer sacrificing its capacity for data processing.

Further this invention is directed to a system comprising a large computer having D/B's connected thereto and controlling the input data and output data to and from the D/B's, and an editing means composed of small computers and medial computers, which system is characterized by the fact that the editing means is adapted to control the edited data in units of the size of at least one page, and the large computer is adapted to decompose the edited data controlled in the units of not less than one page by the editing means into data concerning element and layout, and transfer the data to relevant D/B's.

As the result, a book similar to an already edited book can be produced by calling out data of the edited book stored in the D/B's. The present system, therefore, enables the element data to be commonly used for books of similar contents.

This invention is characterized by the addition of a judgement key code for discrimination of element data to element data introduced through data inputting means. Owing to this arrangement, various sets of element data can be controlled (specifically stored, read out, and sought out) solely by the data. This invention, therefore, makes easy to effect common use of element data.

This invention is characterized by the fact that element data keys of a format common to the various sorts of element data such as documents, illustrations, and photographs forming one page are attached to the element data and the data of said one page are set by the keys and data, the basic layout of one page, and the coordinates of the element data on the layout.

Since the individual sets of element data, the positional coordinates of the element data, and the basic layout of one page are adapted to be handled independently of one another and the data for one page are organized by using such factors as mentioned above, this invention allows one set of element data to be commonly used for the production of similar books.

This invention is characterized by setting data concerning layout by using layout data for indicating a basic layout and positional coordinates data of element data and setting and storing a basic layout code by adding a layout code for discriminating the layout data to the layout data.

As the result, the data concerning the basic layout can be used in common in unit of pages of a book. This invention, therefore, facilitates the work of editing.

This invention is characterized by adding a simplified element data key (temporary key) to the various element data such as documents, illustrations, and photographs forming one page when such element data are to be newly input.

As the result, the element data key has to be set only with respect to those of the newly introduced element data which are actually used in the work of editing.

This invention, therefore, enables the work of editing to be carried out quickly.

This invention is characterized by setting data concerning layout by using data indicating a basic layout and the positional coordinates data of element data, setting and storing a basic layout code by adding a layout code for discriminating the layout data to the layout data, calling out and displaying a pertinent layout code by use of the layout code, and converting the layout code into a data control number and page number to use in the work of editing.

As the result, the data concerning the basic layout can be used in common for pages of a book. This also facilitates the work of editing.

This invention is characterized by attaching element data keys in a format common to the various element data such as documents, illustrations, and photographs forming one page to such element data, setting data for one page by using the keys and data, the basic layout of the page, and the positional coordinates of the element data on the layout, decomposing the data for one page into data concerning the elements and the layout, and causing these separate groups of data in memory devices connected to data processing means adapted to perform processing other than the editing.

Since the memory means connected to the data processing means for other editing are adapted to memorize the data concerning the elements forming each of the pages of an editing book and the data concerning the layout, this enables the data processing means to make use of the information being on the book produced by the editing apparatus, the information available not in unit of pages but in unit of element.

This invention is characterized by feeding at least information of the image classification and the conversion classification prior to the introduction of numerical data, converting numerical data introduced in a specific unit into data of at least one other unit in accordance with the information on the classification of conversion, suffixing the data resulting from the conversion to the introduced numerical data, and controlling the form of display of the numerical data in accordance with one or both of the informations on the classification and the conversion, namely effecting a control as to the selection of the unit of numerical data and the form of display to be made.

As the result, this invention enables numerical data introduced in one unit to be automatically converted into data in at least one other unit and allows numerical data in that unit or numerical data in a plurality of different units to be displayed.

BRIEF DESCRIPTION OF THE DRAWINGS

FIG. 3, comprising FIG. 3(1/5) through FIG. 3(5/5), is a flowchart representing a first editing method according to the first preferred embodiment of the invention.

FIG. 6 illustrates a data format of one spec- information element among machine sort information.

FIG. 7 illustrates a data format of one data element of service data information among machine sort information.

FIG. 10 represents only element data in one element data of the service data information shown in FIG. 7.

FIG. 11 represents a file for editing a new book.

FIG. 30 is a functional block diagram of the editing apparatus of the present invention.

FIG. 31, constituting FIG. 31(1/2) and FIG. 31(2/2), is a flow chart for explaining the operation of the embodiment of FIG. 30.

FIG. 34 is a diagram illustrating typical data to be handled in the working example of FIG. 33.

DESCRIPTION OF THE PREFERRED EMBODIMENTS

Now, the present invention will be described in detail below with reference to the accompanying drawings.

Figure 2:
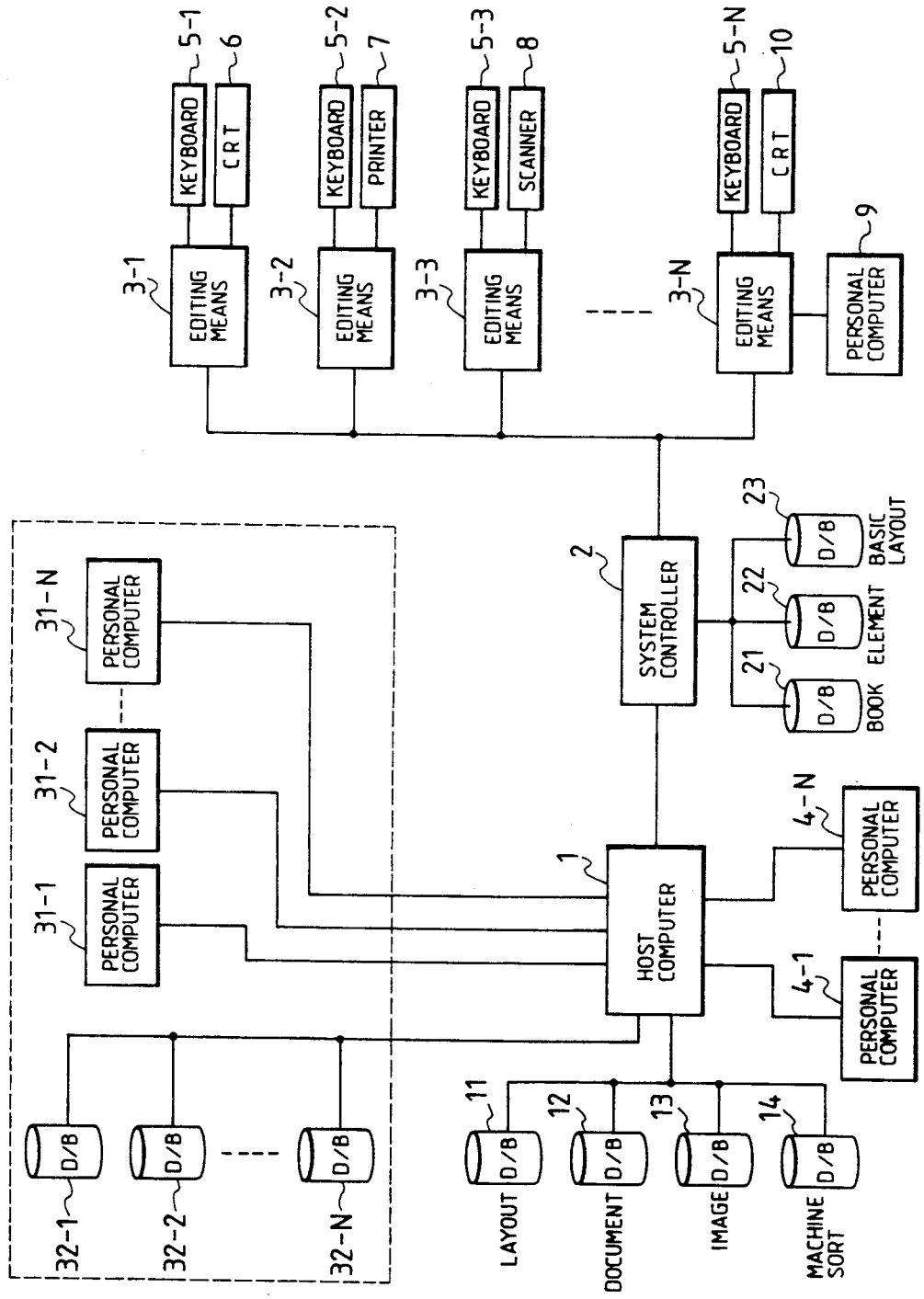
FIG. 2 is a schematic block diagram of the first preferred embodiment of the invention.

FIG. 2 is a schematic block diagram of a typical editing apparatus in which the data processing apparatus of the present invention can be embodied.

In the figure, a plurality of editing apparatuses (work stations) 3-1 to 3-N for inputting/outputting text, photographs, illustrations and the like are connected in an on-line mode to a system controller 2 for controlling the editing apparatus. Since these devices are connected in the on-line mode to each other, the quantity of transferred data is not large, but the transfer speed of the data becomes high. These editing apparatuses receive various information such as text, photographs and illustrations by way of the vector conversion.

A CRT (cathode-ray tube) 6 is connected to the editing apparatus 3-1, a printer 7 is connected to the editing apparatus 3-2, a scanner 8 is connected to the editing apparatus 3-3, and a personal computer 9 and another CRT 10 are connected to the editing apparatus 3-N. Furthermore, keyboards 5-1 to 5-N are connected to the respective editing apparatuses 3-1 to 3-N.

The system controller (a medium-scale relay computer) 2 is furthermore connected to a host computer 1.

A book data base (D/B) 21, an element data base 22 and a layout basic data base 23 are connected to the system controller 2.

The system controller 2 controls these editing apparatuses 3-1 to 1-N, and transfers/receives the information in page unit or an element (document, photograph, illustration) unit constituting one page to and from the respective editing apparatus.

the host computer 1 is a large-scale general purpose computer such as an IBM 3090 or equivalent. The system controller 2, personal computer 4-1 to 4-N, layout D/B 11, document D/B 12, image D/B 13 and machine sort information D/B 14 are respectively connected to the host computer 1.

It should be noted that the personal computer 4-1 to 4-N may be exclusively used for the editing apparatus, or for a general purpose other than the editing work, which is similar to personal computers 31-1 to 31-N (to be discussed later).

In case the editing apparatus 3-1 to 3-N possess a function capable of inputting a language (referred to as "specific language") other than the language input by the personal computers 4-1 to 4-N, a software for inputting and processing the specific language by the personal computers 4-1 to 4-N is provided with, for instance, the system controller 2. That is to say, the mode to input the specific language is selected by the keyboards (not shown) of the personal computers 4-1 to 4-N. Thereafter, when "A" and ":" keys are depressed, the software stored in the system controller 2 displays the character "A". It should be noted that this software may be stored in either the host computer 1 or personal computers 4-1 to 4-N.

In addition, other software is provided with the system controller 2, by which the document input by the personal computers 4-1 to 4-N is vector-converter, as is similar to the document input by the respective editing apparatus 3-1 to 3-N.

The personal computers 31-1 to 31-N which are employed to carry out other than the editing work effected by the editing apparatus, are connected to the host computer 1. In other words, the machines or parts surrounded by a dot line shown in FIG. 2 do not constitute the editing apparatus of this invention.

The host computer 1 retrieves the data of one book from the information which has been stored in the data bases 11 to 14, and transfers this data to the system controller 2. The system controller 2 transfers the information of one page which has been edited in the editing apparatus to the host computer 1. That is to say, the data transfer between the system controller 2 and the host computer 1 is performed in a so-called "batch" transmission.

When the data code system processed in the host computer 1 is different from the data code system processed in the editing apparatuses 3-1 to 3-N, the code conversion of these data is performed in either the host computer 1 or the system controller 2.

An operation of the data processing apparatus according to a preferred embodiment of the invention will now be described.

Basically, an editing apparatus of the type illustrated in FIG. 2 can produce, or edit a new book by way of two editing methods as follows. (A) When a new book is first produced, all of documents or sentences, illustrations, and photographs etc. to be written on each page of the new book must be newly input.

This will be referred to as "a first editing method". (B) When a new book is produced by utilizing other books which have previously been edited or produced in the editing apparatus, the necessary portions of other books are utilized for the new book and only the minimum portions required to produced the new book are newly input. This will be referred to as "a second editing method".

Referring now to FIGS. 3 to 19, the following description explains how a service manual (simply referred to as "a book" hereinafter) for a bike (auto-bicycle) is produced in accordance with the above-defined first editing method.

FIG. 3 is a flowchart of the first editing method according to the preferred embodiment of the invention.

In FIG. 3, first as a step S1, a basic layout code is input into the editing apparatus to which CRT is connected (for instance, the editing apparatus 3-1) by the keyboard 5-1. The basic layout code is used to set the size of a book to be newly produced, namely, a size, the number of characters, a column number and a column space in one page of the new book.

Figure 4:
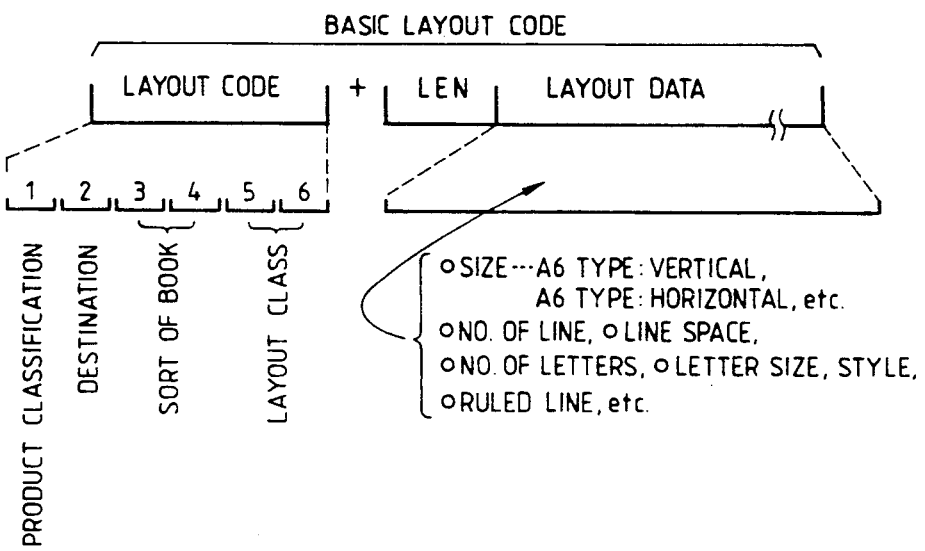
FIG. 4 illustrates a format of the basic layout code.

FIG. 4 illustrated one example of the example of the format of the basic layout code.

The basic layout code is constructed of a layout code having, for example, a 6-byte code length, layout data, and other data representing the data length of the layout data.

It should be noted that the data representing a data length of certain data is simply referred to as a "LEN" in the following description.

The layout code is constructed of data for representing which product classification a book to be produced belongs to; data for indicating which location (country) the new book is designated; data representative of the sort of the new book, e.g., service manual, or shop manual; and data representative of the layout of each page of the new book, e.g., a single frame or a double frame.

The layout data is constructed of data representing a size of each page of the book, i.e., A6 vertical, A6 horizontal and so on; and data indicative of a line number, a line space, the number of characters, a point, style, presence of a ruled line etc.

The data concerning a concrete layout of a page on a screen of CRT is set in the layout data, and the layout code is merely an identification code of the layout data. The layout code is converted into a document identification number and a page number which correspond to the identification data of the new book, as will be described later in connection with the steps S29 and S30.

When entry of the layout data is accomplished, LEN of the layout data is added in front of the layout data.

As previously described in detail, the basic layout code is produced from the layout code, LEN of layout data, and layout data.

Referring back to FIG. 3, when the basic layout code is generated, as illustrated in a step S2, the editing apparatus 3-1 transfers the basic layout code to the system controller 2 which registers the basic layout code in the layout basic D/B 23.

Upon completion of registering the basic layout code, in the next steps S3 to S24, entry of information of illustrations, photographs, text and the like which are to be arranged in each page of the book is carried out. It should be noted that both illustrations and photographs are referred to as an image in the following description.

In the step S3, a judgement is made whether or not the information to be input corresponds to the image. When the image is entered, as indicated in the step S4, as temporary key having, for instance, a 6-byte length is entered in the editing apparatus 3-3 by the keyboard 5-3. The temporary key corresponds to an identification code of image data to be entered which is determined by an operator. "D" indicating that this temporary key relates to the image data is entered into the head byte of the temporary key.

In the next step S5, the image is read out by the scanner 8.

In a step S23, the temporary key, LEN of the readout image data, and the image are registered into the element D/B 22 as one element data.

If a judgement is made in the previous step S3 that no image is entered, another judgement is made in a step S6 whether or not a document or sentence is entered. When the document (sentence) is entered, as indicated in a step S7, the temporary key is input in the editing apparatus 3-1 by the keyboard 5-1 or in any of the personal computers 4-1 to 4-N. As previously explained in the step S4, the temporary key is constructed of, for instance, a 6-byte length, and corresponds to an identification code of the document to be input which is determined by the operator himself. In this case, "T" indicating that the temporary key relates to the document key is input into the head byte of the temporary key.

In the subsequent step S8, the document or sentence is entered in the keyboard 5-1 or any one of personal computers 4-1 to 4-N.

Then, in the step S23, the temporary key entered in the previous step S7, LEN of the document entered in the step S8, and this document are registered as one element data in the element D/B 22.

Figure 5:
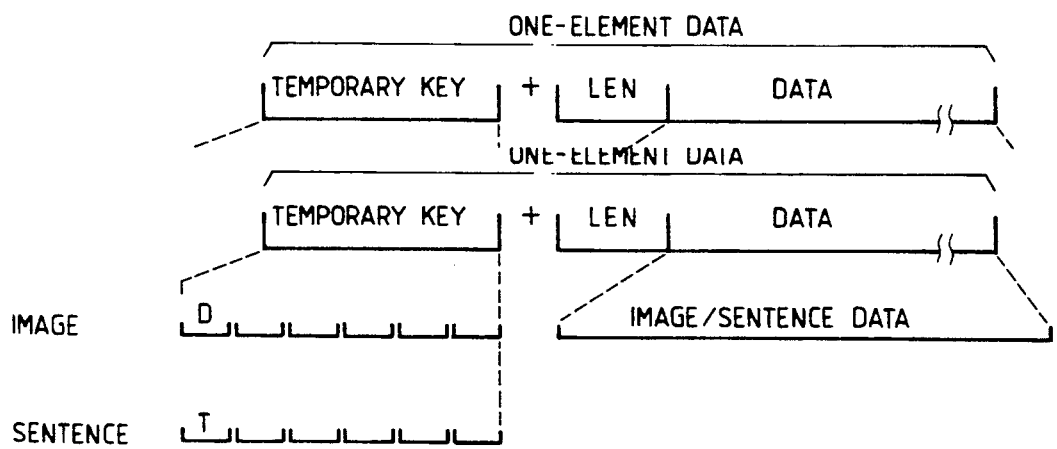
FIG. 5 represents a data format of one data element when image data or document data is newly entered.

In FIG. 5, there is shown one element data registered in the step S23.

When the data relating to the document which is entered in the steps S7 and S8 is intput into the personal computer 4-1, the entered data is edited as the one element data (see FIG. 5) in the system controller 2, host computer 1, or personal computer 4-1.

In the step S6, if a judgement is made that no document is entered, it is decided that said input is related to the machine sort information.

The machine sort information includes data on repairs, tools to be used and the like for a bike. In accordance with the preferred embodiment of this embodiment, the machine sort information includes the specification, service data and torque, which will be described in detail hereinafter.

(A) Specification is, for instance, repair data on the bike, and the data representative of the repairing items and details which are entered into a list indicating the tool to be used, and is constructed of alphanumerical data and KANJI characters. In other words, this specification represents a type of an engine oil, a name of a tool to be used, and repairing items such as an inner diameter of a cylinder, an outer diameter of a piston, and the like.

(B) Service data is numerical data representative of, for instance, maintenance data which is entered into a list of the maintenance data, and constructed of three different data, i.e., a maximum value, a minimum value, and a limit value of usage (or a center value).

That is, as the maintenance data relating to the inner diameter of the cylinder, there are the typical maximum value and minimum value, and the usable maximum value. Also, as the maintenance data concerning the outer diameter of the piston, there are the typical maximum value and minimum value, and the usable minimum value. As to the data of capacity of an engine oil tank, a capacity of coolant and the like which has no discrimination in the maximum and minimum values, the same values as these maximum and minimum values are input, by which these data are registered.

(C) Torque is numerical data indicative of the fastening torque of screws for the bike (maximum value, minimum value, and center value), diameter of a screw, and the number of the required screws. That is to say, the torque information is constructed of five pieces of numerical data containing the maximum value, minimum value, center value (or the limit value for usage) and the other two informations.

When the judgement is made that the input data corresponds to the machine sort information, the machine sort code is entered which represents that the machine sort information to be input is related to which sort of the bike, as indicated in the step S9, by utilizing any one of the personal computers 4-1 to 4-N (e.g., personal computer 4-1) connected to the host computer 1. This machine sort code is constructed of, for instance, 8 bytes, and "K" for representing that the machine sort code is related to the machine sort information is input into the head byte of the machine sort code.

In a step S10, a judgement is made whether or not the machine sort information to be input is the specification.

If a judgement is affirmative in the step S10, then, an information identification code having, for instance, a 4-byte length is input in a step S11. At this time, "A" for indicating that the information identification code is related to the specification is input at the head byte of the identification code.

In a next step S12, an item having, for example, a 3-byte length is entered.

In a subsequent step S13, an image classification or sort having, for instance, a 2-byte length is input. Data representing a language sort of the specification information (for example, the language is Japanese, or English) is entered into this image classification.

In a step S21, specification information is entered by the personal computer 4-1.

In a subsequent step S22, the machine sort code, information identification code, item and image classification which have been input by the previous steps S9, S11, S12, and S13, the data status (which is automatically set in the host computer 1) for indicating the history of the specification information entered in the step S21, and the specification information are registered as one element data in the machine sort D/B 14 by means of the host computer 1.

A data format of the one element data is illustrated in FIG. 6. As is shown in FIG. 6, the data consisting of the machine sort code, information identification code, item, image classification, and data status will be referred to as an element data key in the following description.

If no specification is input in the previous step S10, another judgement is made whether or not the service data is entered in a step S14.

If the service data is entered, the information identification code is input in a step S15, which is similarly done in the preceding step S11. In this case, "B" is input into the head byte of this code.

In the next step S16, the item is input, which is similarly executed in the previous step S12.

In the subsequent step S17, the image section is entered. The function of the image classification information entered at entry of the service data will be discussed later with reference to a step S42.

In the step S21, the service data information is input by means of the personal computer 4-1.

The service data information is constructed of three different data, i.e., the maximum value, minimum value and a limit value of usage (or a central value). When these three data are input in a specific unit in the editing apparatus according to the preferred embodiment, these data are stored and also converted into other units to be stored thereafter.

FIG. 7 illustrates a format of 1-element data (element data key and service data) which is registered in the machine sort information D/B 14 in the step S22.

As illustrated in FIG. 7, the service data is so constructed as to be set in a first data section through a third data section. In the step S21, when the three data are input in the preselected specific unit (for example "mm"), these data are set in the first data section. Although it is not shown in FIGS. 3 and 7, just before entry of the service data information, a conversion classification (for example, 2-byte length data) is provided for indicating what other units the three data set in the first data section should be converted into, with the result that the three data entered in millimeter units into the first data section are converted into other units (e.g., an inch unit) and thereafter stored in the second data section.

Then the three data in millimeter units stored in the first data section are converted into still other units designated by the conversion classification and the resultant converted data are transferred to the third data section.

Referring to FIG. 10, the above-mentioned conditions will now be described more in detail. FIG. 10 illustrates only the service data (element data) among the data shown in FIG. 7.

When the information on the inner diameter of the cylinder of the bike is entered as the service data, the minimum value of 56.003, the maximum value of 56.018, and the limit value of usage of 56.08 (illustrated in FIG. 10 as the service limit) are input in millimeter units. These numerical data are set in the first data section.

If the conversion classification set before entry of the service data is designated to convert the millimeter unit into inch units, each of the data set in the first data section is converted into 2.2048; 2.2054; and 2.207 inches, respectively and the converted data are set in the second data section.

Also in the third data section, each of the data set in the first data section is converted into still other unit in accordance with the designation of the conversion classification.

In other words, the function of the conversion classification is to automatically convert the service data into certain units other than the originally input units when the service data is entered in the certain specific units, and thereafter to set these converted data into the second and third data sections.

Figure 8:
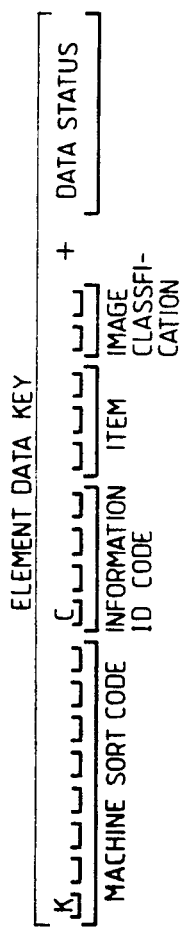
FIG. 8 indicates a data format of one torque information element among machine sort information.

It should be noted that in the steps S9 to S21, the respective data input by the personal computer 4-1 are edited as machine sort information data as illustrated in FIGS. 6 to 8 in the system controller 2, host computer 1, or personal computer 4-1.

Next, in the step S22 as shown in FIG. 7, the machine sort code, information identification code, item and image classification which have been entered in the previous steps S9, S15, S16 and S17, the data status (which is automatically fixed in the host computer 1) for representing a history of the service data information entered in the step S21, and the service data information consisting of the first to third data sections are registered as the 1-element data in the machine sort information D/B 14 under the control of the host computer 1.

Then, if no service data is entered the judgement of the step S14 is negative and shows that the torque information is entered.

When the entry of the torque information is judged, the information identification code is entered in the step S18, which is similarly executed in the preceding steps S11 and S15. At this time, "C" is input in the head byte of the information identification code.

In the subsequent step S19, the item is input, which is similarly performed in the steps S12 and S16.

In the step S20, the image classification is entered. The function of the image classification which is entered during entry of the torque information is similar to a function of an image classification which will be described later relating to a step S42.

In the next step S21, the torque information is input into the personal computer 4-1.

The torque information is constructed of five pieces of data containing the maximum value, minimum value, and center value (or a limit value of usage), and also two pieces of data representative of other information. In the editing apparatus, when these five pieces of data are input in specific units similar to the above-mentioned entry method of the service data, these data are stored, and at least three pieces of data other than two pieces of data to represent the other information are firstly converted into other units and secondly stored.

FIG. 8 illustrates a format of 1-element data (element data key and torque) which is registered in the machine sort information D/B 14 in the step S22.

As illustrated in FIG. 8, the torque data is so arranged as to be set in the first to third data sections. In the step S21, when the torque data is entered in some particular units (for example, "kg"), this torque data is set in the first data section. Although not shown in FIGS. 3 and 8, the conversion classification is input, just before entry of the torque information, so as to instruct that five pieces of data set in the first data section should be converted into certain different units. As a result, at least three pieces of data input in "kg" units into the first data section (i.e., three pieces of data other than two pieces of data representative of the other information among five pieces of data to indicate the torque information) are converted into a different unit (e.g., "lb" unit) designated by the conversion classification. Then, the converted data is set in the second data section.

In addition, at least three pieces of data entered into the first data section in "kg" units are converted into still other units which are designated by the conversion classification, and thereafter the converted data are set in the third data section.

In other words, the conversion classification is used to automatically convert the torque data into units other than the above-described unit when the torque data is input in the certain specific unit, and also to set these converted data into the second and third data sections, in a manner similar to the case of the service data.

Since the data concerning the diameter and the number are not required to be converted by units, no unit conversion is needed for these two pieces of data. It may be possible, of course, to perform a similar unit conversion on these two data as in other three data. In this case, however, it is necessary to prohibit use of the converted two data.

In the 1-element data illustrated in FIGS. 6 to 8, the byte lengths of the respective element data keys are identical to each other.

In the step S22, as shown in FIG. 8, the machine sort code, information code, item and image classification which have been input in the steps S9, S18, S19 and S20, the data status (which is automatically set in the host computer 1) representative of the history of the torque data which has been input in the step S21, and the torque data information consisting of the first to third data sections are registered as 1-element data by the host computer 1 into the machine sort information D/B 14.

In the steps S22 or S23, when entry of one-image, one-document, or one piece of the machine sort information (these are referred to as "element data" hereinafter) is accomplished, a judgement is made whether or not the entry of the element data is continued in the next step S24. If the entry of the element data is continued, the control process is returned to the previous step S3. If the entry of the element data is not continued, the editing work of the book is commenced at a step S25. The editing work is performed by one page unit.

In the step S25, a new book producing file is read out from the host computer 1 by any one of the personal computers 4-1 to 4-N connected to the host computer 1.

FIG. 11 illustrates an arrangement of the new book producing file. As shown in FIG. 11, the new book producing file is constructed of material supervision or ID No. information, staff-in-charge information, and starting page information.

The material supervision No. is a title of a book to be newly produced or the supervising number. The staff-in-charge information is the data representative of a staff person who is qualified to produce the new book. The starting page information indicates what page the book to be produced is commenced from. In other words, the page information indicates the first page of the new book for the starting page. For instance, the second page corresponds to the starting page of a book distributed in Japan, whereas the eleventh page corresponds to the starting page of a book distributed in the United States of America.

The staff-in-charge information is able to be applied to the security supervision of a newly edited book, for example. That is to say, the information relating to a staff person who is permitted to produce a new book is previously registered in the host computer 1, and the new book is edited by that person only when he has been registered in the new book producing file in the host computer 1. This security supervision prevents the book from being improperly or mistakenly edited or a previously edited book from being unnecessarily and mistakenly revised by the editing apparatus.

In this case, the staff-in-charge information may be preferably encrypted or stored in a magnetic card.

When the new book producing file is read out, predetermined data is input into this file at a step S26. When the predetermined data is entered, as shown in a step S27, the new book producing file is transferred from the host computer 1 to the system controller 2 and then registered in the book D/B 21.

In the next step S28, the layout code (see FIG. 4) is entered by the keyboard 5-1, so that the basic layout code previously registered in the layout basic D/B 23 is called up to CRT 6.

When the basic layout code is called up in the editing apparatus, both the document supervision number and the page number to be edited are input. The document supervision number is a title or the supervision or ID number of the new book, which is similar to the document supervision No. of the new book producing file shown in FIG. 11.

Figure 12:
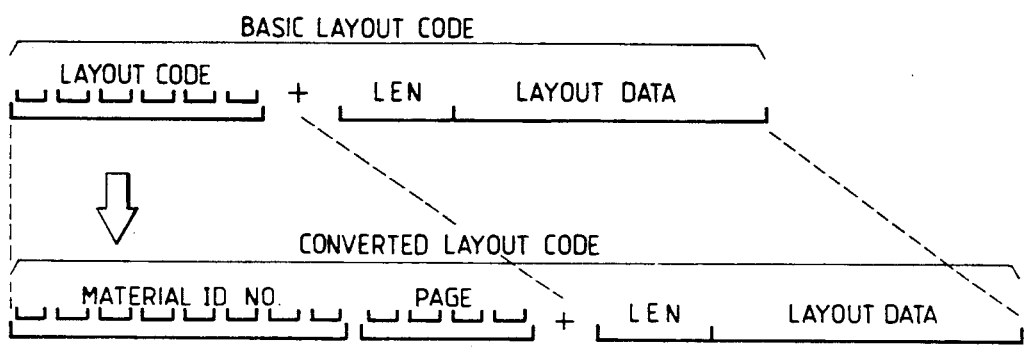
FIG. 12 illustrates how the converted layout code is produced from the basic layout code.

After the document supervision No. and the page number to be edited are input in a step S29, the editing apparatus 3-1 converts the layout code among the basic layout code read in the step S28 into the document supervision No. and the page number which have been input in the step S29, as illustrated in a step S30 and FIG. 12.

Upon completion of the code conversion, the editing apparatus 3-1 stores the document supervision No., the page number, LEN and layout data in the editing apparatus 3-1 in a step S31. These document supervision No., the page number, LEN and layout data will be referred as "a converted layout code" in the following description.

Figure 13:
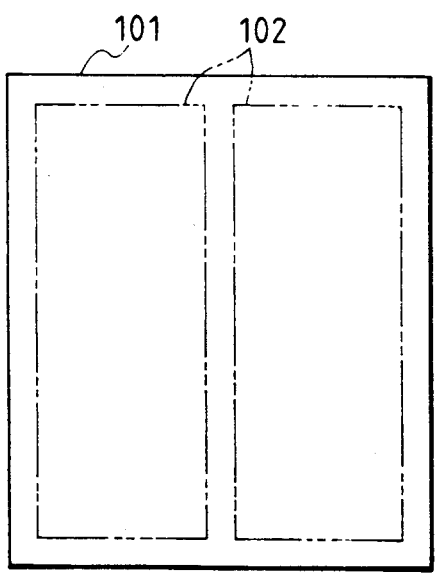
FIG. 13 is an illustration of one example of a display screen of the basic layout.

In a step S32, the basic layout is displayed on CRT 6 by employing the converted layout code. As illustrated in FIG. 13, the basic layout is basically constructed of a contour 101 of a page to be edited and a document entry region 102. The basic layout shown in FIG. 13 is a double frame.

In a subsequent step S33, a judgement is made whether or not the image is displayed on CRT 6.

To display the image, the temporary key (see FIG. 5) is entered by the keyboard 5-1 in a step S34 so as to call up one element data, i.e., temporary key, LEN of the image data to be called up, and the image data from the element D/B 22, and display the image data called up on CRT 6.

In a step S35, by a mouse (not shown) connected to the keyboard 5-1, the image displayed on CRT 6 is moved to a desirable position on the basic layout.

Figure 14:
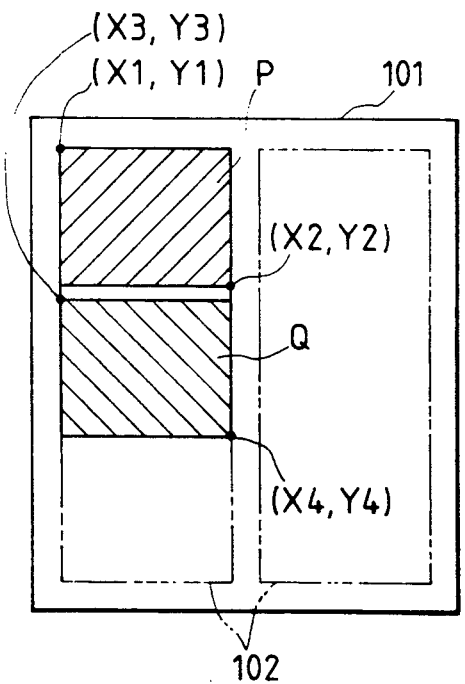
FIG. 14 is an illustration of one example of a display screen during the editing operation.

FIG. 14 illustrates an image of the screen of CRT 6 at that moment, which is similar to the illustration of FIG. 13. As shown in FIG. 14, when the image is moved to the region denoted by "P", the upper left coordinates and lower right coordinates of the image are (X1, Y1) and (X2, Y2), respectively.

When the image is transferred in this way, the upper left coordinates (X1, Y1) and lower right coordinates (X2, Y2) on the basic layout are entered into the editing apparatus 3-1.

It should be noted that while the image is moved, the size of the image may be enlarged or reduced in accordance with the capability of editing apparatus. Only the image can be moved over the document input region 102.

Figure 15:
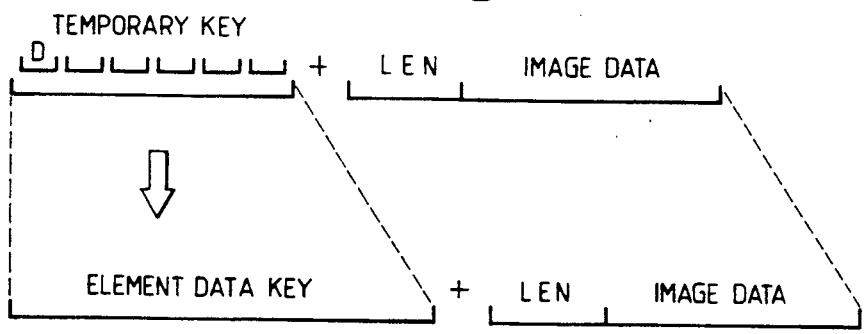
FIG. 15 illustrates how a temporary key of one element data of newly input image information is converted into an element data key.

In a step S36, as illustrated in FIG. 15, the temporary key among the 1-element data consisting of the temporary key, LEN of image data to be called up, and image data is converted into the element data key.

Figure 9:
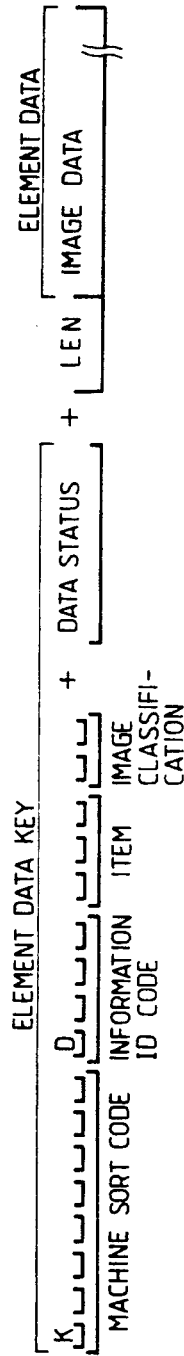
FIG. 9 illustrates a data format of one image information element which is converted during the editing operation.

As illustrated in FIG. 9, the element data key is constructed of the machine sort code, information identification code, item, image classification, and also data status (which is automatically input in the host computer 1) representative of a history of image data, which is similar to the machine sort information including the specification information, service data information, and torque information.

The conversion operation of the temporary key into the element data key in the step S36, is practically performed when an editor has entered the element data key excepting for the data status. "D" is input in the head byte of the information identification code. A byte length of the element data key shown in FIG. 9 is identical to the respective byte lengths shown in FIGS. 6 to 8.

In a step S37, both the 1-element data consisting of the element data key, LEN of the image data corresponding to the element data key and the image data, and the coordinates (X1, Y1), (X2, Y2) are registered in the editing apparatus 3-1.

In a step S45, another judgement is made whether or not the editing of one page is accomplished. If not yet the accomplished, then the control process is returned to the step S33.

If it is judged in the step S33, that the image is not displayed on CRT 6, another judgement is made whether or not the document or sentence is displayed in a step S38.

When the document or sentence is displayed, in a step S39, the temporary key (see FIG. 5) is entered by the keyboard 5-1, and the one element data consisting of the temporary key, LEN of the document data to be called up, and the document data themselves is called up from the element D/B 22, and the document data are displayed on CRT 6.

By employing the mouse (not shown) connected to the keyboard 5-1, the document displayed on CRT 6 is moved to the desired position on the basic layout in a step S40.

When the document is moved to the position indicated by the symbol "Q" on the basic layout shown in FIG. 14, the upper left coordinates and the lower right coordinates of the document are (X3, Y3) and (X4, Y4), respectively.

After the document has been moved, both the upper left coordinates (X3, Y3) and the lower right coordinates (X4, Y4) of the document on the basic layout are input into the editing apparatus 3-1 (S40).

Figure 16:
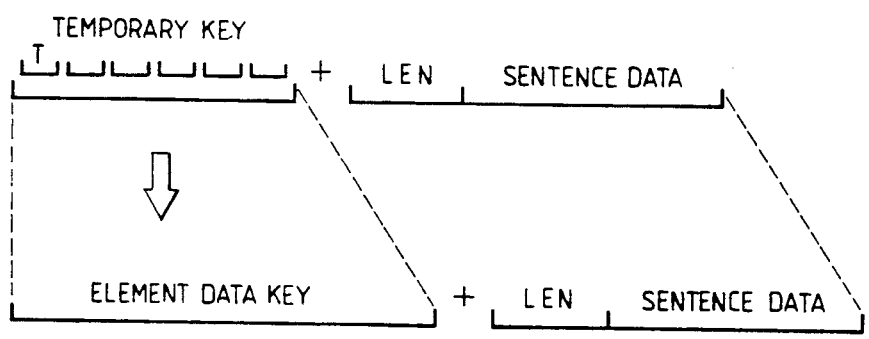
FIG. 16 illustrates how a temporary key of one element data of newly entered document information is converted into an element data key.

In a step S41, as illustrated in FIG. 16, the temporary key in the 1-element data consisting of the temporary key, LEN of the called up document, and document data is converted into the element key data. Formats of these element data key, LEN of the called up document data and document data are illustrated in FIG. 17.

Figure 17:
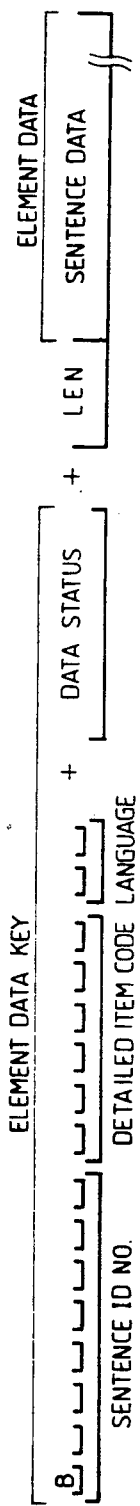
FIG. 17 illustrates a data format of one document information element which is converted during the editing operation.

As shown in FIG. 17, the element data key corresponding to the document data is constructed of the sentence supervision No. having a length of, for instance, 8 bytes; the detailed item code having a length of, for example, 6 bytes; the language information having a length of, for example, 2 bytes; and the data status (which is automatically added by the host computer 1) indicative of a history of the sentence or document data.

The sentence supervision No. is the data to specify each document, in the head byte of which "B" is input. The language information indicates what language the document data has been produced in, for example, Japanese or English. The detailed item code is a classification code of the document or sentence.

It should be noted that after the data status of the 1-element data shown in FIG. 17, an appropriate number of blanks are added to make the byte length of the element data key equal to that of the respective element data keys as shown in FIGS. 6 to 9. In other words, each byte length of the element data keys corresponding to the document data, image data and machine sort information data is set to be identical with each other.

By employing the detailed item code, the editing apparatus can retrieve the document or sentence. This document retrieval operation will be discussed later in a step S114.

In a step S37, the element data key, LEN of the document data corresponding to the element data key, and document data are registered as the 1-element data together with the coordinates (X3, Y3), (X4, Y4) into the editing apparatus 3-1.

In a step S38, if a judgement is made that no document is displayed on CRT 6, it can be recognized that the machine sort information is to be displayed.

In a step S42, the element data key of the machine sort information to be called up is input by the keyboard 5-1, whereby the machine sort information having 1-element data, i.e., element data key, specification information, service data information or torque information is called up from the machine sort information D/B 14 to the editing apparatus 3-1, and then the specification information, service data information or torque information is displayed on CRT 6.

In the preferred embodiment, the element data key is entered by the keyboard 5-1, and the machine sort information is directly called up via the host computer 1 and system controller 2 from the machine sort information D/B 14 to the editing apparatus 3-1. However, alternatively, employing any one of the personal computers 4-1 to 4-N, the machine sort information may be called up from the machine sort information D/B 14 to be temporarily registered into the element D/B 22. Thereafter, the element data key may be input by the keyboard 5-1, and the machine sort information may be called up via the system controller 2 from the element D/B 22 to the editing apparatus 3-1.

It should be noted that display conditions or modes of the service data information and torque information among the machine sort information data are determined in accordance with the image classification information in the element data key and the conversion classification (not shown) described with reference to the step S21.

Figure 25:
FIG. 25 is a graphic representation for showing relationships of a conversion section, an image section and service data on a CRT.

As to the service data, for instance, as illustrated in FIG. 10, when the data set in the first data section is automatically converted to be set within the second and third data sections in accordance with the conversion classification information previously set, the service data is displayed on CRT 6 in the illustration format of FIG. 25 in accordance with the conversion classification and image classification information.

FIG. 25 is a table for representing one example of a relationship between the conversion classification, image classification and service data, which is displayed on the CRT.

In FIG. 25, if the conversion classification is "10" and the image classification is "10", only the data set in the first data section (see FIG. 10) is displayed on CRT 6 in millimeter units.

If the conversion classification is "10" and image classification is "20", the data set in the first data section is displayed in millimeter units, and subsequently, the data set in the second data unit is displayed within parentheses in inch units.

If the conversion classification is "20" and image classification is "10", only the data set in the second data is displayed in the inch units.

When the conversion classification is "20" and image classification is "20", the data set in the second data is displayed in inch units, and subsequently, the data set in the first data unit is displayed within parentheses in millimeter units.

When the conversion classification is "40", the same data and unit display as in the conversion classification being "10" is performed, and its decimal point is not a period, but a comma.

As is similar to the steps S35 and S40, the data on the machine information is positioned on the basic layout and the coordinates thereof is input in a step S43.

In a subsequent step S44, the element data key and its coordinate information selected from the 1-element data, as illustrated in FIGS. 6 to 8, are registered into the editing apparatus 3-1.

Not only the element data key, but also the respective element data together with the coordinate information thereof may be of course registered.

Figure 18:
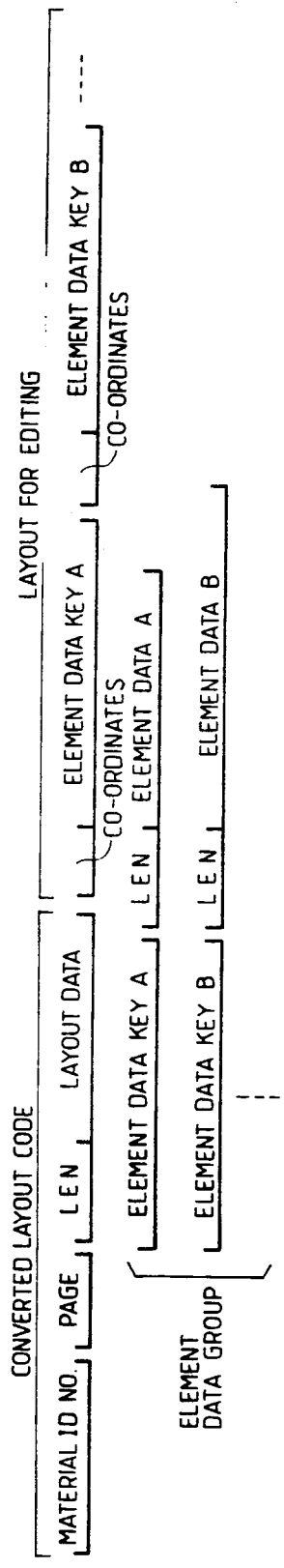
FIG. 18 illustrates a data format of one page which is edited by the editing machine.

When a judgement is made that the editing work for one page is accomplished in the step S45, the format of one page data is converted into another format shown in FIG. 18 in a step S46. This conversion is executed in the editing apparatus for performing the editing work (the editing apparatus 3-1 in this case).

FIG. 18 illustrates a format of the data having one page information converted in the editing apparatus. In FIG. 18, the one page data converted in the editing apparatus is constructed of the following data:

(A) The converted layout data which has been converted in the step S30 (see FIG. 12)

(B) The coordinates entered in the previous steps S35, S40 or S43, and the element data key of the 1-element data arranged in the region designated by said coordinates. When a plurality of element data (image data, document data, or machine sort information data) are arranged within one page, plural sets of the coordinates and element data key should be stored for one page.

The coordinates and element data key are set subsequent to the converted layout data. A set of coordinates and element data key will be referred to as "a layout for the editing work" in the following description.

(C) The element data key of the element data arranged within one page, LEN of the element data, and the element data. When a plurality of element data are inserted in one page, plural sets of the element data key, LEN, and element data should be arranged for one page.

In other words, the number of the 1-element data constituted of the element data key, LEN and element data is the same as that of a pair of the coordinates and element data key contained in the layout for the editing work.

Subsequent to the layout for the editing work, the element data key, LEN and element data are set.

When the element data is the machine sort information, as apparent from FIGS. 6 to 8, since no LEN is present in front of the element data, of course, only the element data key and element data are set.

These data arranged behind the layout for the editing work will be referred to an element data group in the following description (see FIG. 18).

Although not shown in FIG. 18, an end code for indicating that one page data is completed is added at the end of the final element data.

When one page data is converted as illustrated in FIG. 18, the resultant converted one page data is registered via the system controller 2 in the book D/B 21 in the step S47.

In the next step S48, one page data which has been converted in the previous step S46 is transferred to the host computer 1.

It should be noted that if the host computer 1 is not in operation due to a holiday or the like, the data processes until the step S47 may be repeatedly performed, and the data of several pages which have been registered in the book D/B 21 may be transferred after the operation of this host computer 1 is commenced.

Figure 19:
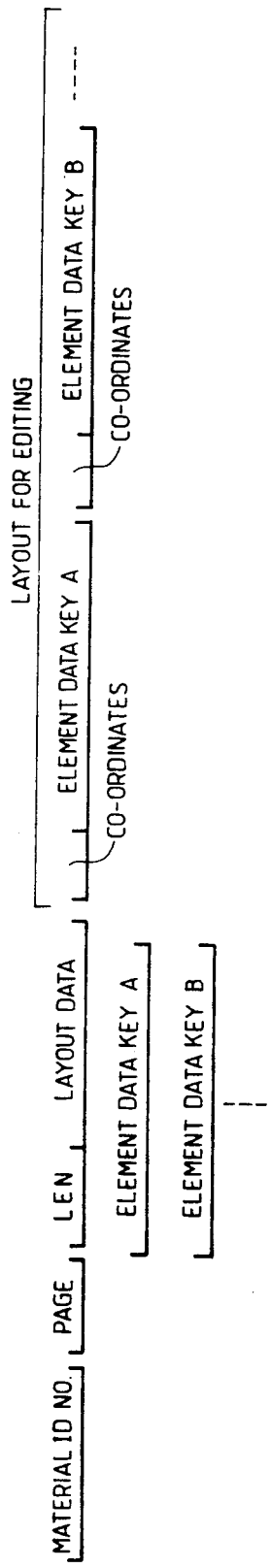
FIG. 19 is an illustration for representing a data format of one page which is converted by the host computer so as t be registered into the layout D/B 11.

In a step S49, the above-described one page data is duplicated and the format thereof is converted into that illustrated in FIG. 19 in the host computer 1. FIG. 19 illustrates one page layout information which is converted in the host computer 1 so as to be registered in the layout D/B 11.

The one page data transferred to the host computer 1 is distributed and stored in the respective D/B (i.e., layout D/B 11, document D/B 12, image D/B 13 and machine sort information D/B 14) connected to the host computer 1. The data conversion executed in the step S49 is performed so as to store in the layout D/B 11, only the information relating to the layout among the one page data.

As is obvious from comparison of FIGS. 18 and 19, in the step S49, both LEN and the element data have been removed from the element data group of the 1-page data which is set subsequent to the layout for the editing work.

In a next step S50, the data converted in the previous step S49 is registered in the D/B 11.

In a step S51, the element data group is copied by employing the 1-page data which has been transferred to the host computer 1 in the previous step S48.

In a step S52, the data relating to the document data among the element data group is registered in the document D/B 12.

In a step S53, the data relating to the image data among the element data group is registered in the image D/B 13.

In a subsequent step S54, a judgement is made whether or not the edited 1-page data is to be printed out. If no printing operation is to be carried out, the control process is advanced to a step S57. If the printing operation should be performed, the control process is advanced to a step S55.

In a step S55, both the reference supervision No. and page are entered by use of the keyboard 5-2, so that the 1-page data registered in the book D/B 21 is called up into the editing apparatus 3-2.

In a step S56, the 1-page data is printed out by the printer 7.

In a step S57, a judgement is made whether or not the next page is produced. When the next page is produced, the control process is returned to the step S28. Conversely if the next page is not produced, the control process is accomplished.

In accordance with above-mentioned process (first editing method), a new book is newly produced or edited.

Referring now to FIGS. 20 to 24, in a manner similar to the description on the first editing method, a description will be made of the second editing method applied to produce a service manual of a bike or the like.

Figure 20B:
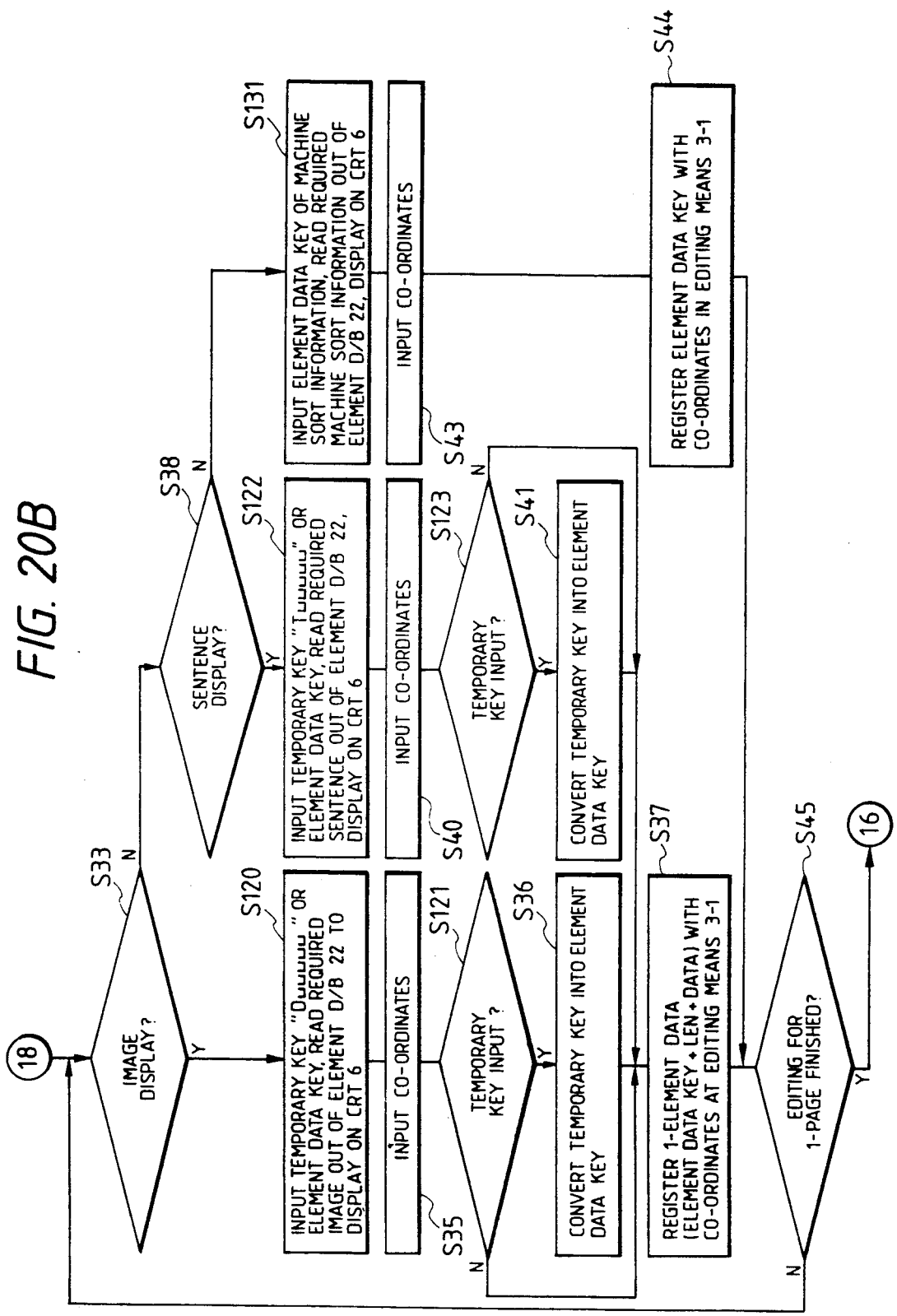
FIG. 20, comprising FIG. 20(1/6) through FIG. 20(6/6), is a flowchart of a second editing method according to the first preferred embodiment of the invention.

FIG. 20 is a flowchart illustrating the second editing method according to a preferred embodiment of the invention.

In the respective steps shown in FIG. 20, the same reference numerals as those in FIG. 3 indicate the same or similar processing operations.

According to the second editing method, in a step S25, a new book producing file is first called up which has been registered in the host computer 1, by employing any one of the personal computers 4-1 to 4-N (for instance, the personal computer 4-1) connected to the host computer 1. Since the arrangement of this new book producing file is identical to that shown in FIG. 11, the description thereof is omitted.

After the new book producing file is called up, predetermined data, i.e., the material supervision No. information, staff-in-charge information and starting page information are entered into the new book producing file in a step S26.

Next, as illustrated in a step S27, the new book producing file is transferred by the host computer 1 to the system controller 2 and registered in the book D/B 21.

In a step S101, referring to a book which has been produced in the editing apparatus (referred to as "an original book"), a selection is made of the pages of this original book that are to be utilized to produce a new book. That is to say, the following page selection is carried out, as one example. The 21st to 30th pages of a first original book are available to produce the 1st to 10th pages of the new book, the 46th to 50th pages of a second original book are utilized to produce the subsequent 11th to 15th pages of the new book, and furthermore, the 31st to 40th pages of the first original book are usable to produce the succeeding 16th to 25th pages thereof.

Such a process is performed while an operator actually observes the original books.

In a next step S102, the material supervision No. and the page number of the original book are input by way of the personal computer 4-1, and 1-page data (see FIG. 19) is copied in the host computer 1 from the layout D/B 11.

In a step S103, a new material supervision No. and a new page number of a book to be newly edited are input into the personal computer 4-1.

In a step S104, both the document supervision No. and the page number in the 1-page data copied in the previous step S102 are rewritten by the new material supervision No. and page number of the new book input in the previous step S103.

Figure 21:
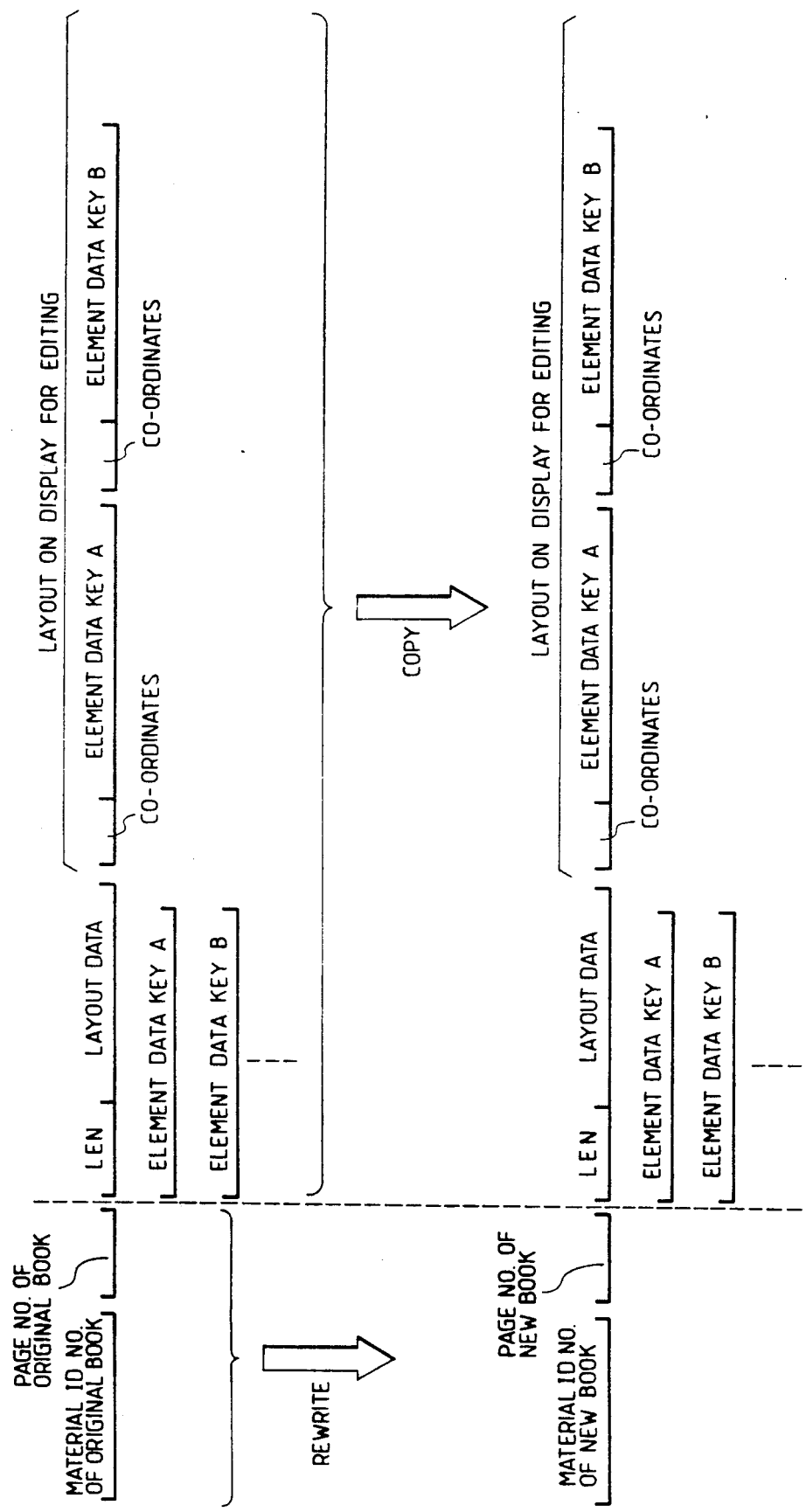
FIG. 21 is an illustration for explaining how the data rewriting at the step S104 of FIG. 20 is performed.

FIG. 21 illustrates the data rewriting operation executed in the step S104.

The 1-page data of the original book which has been called up and copied in the step S102 is as shown in the upper portion of FIG. 21. In the step S104, as illustrated in the lower portion of FIG. 21, only the material supervision No. and page number among the above-described data are rewritten by those of the new book.

In the step S105, the 1-page data produced in such a way is stored in the host computer 1.

In a step S106, a judgement is made whether or not the rewriting operation of the material supervision No. and the page number is accomplished for the new book. In accordance with the previous example, a judgement is made whether or not all of the 21st to 30th pages of the first original book, the 46th to 50th pages of the second original book, and the 31st to 40th pages of the first original book have been converted into the 1st to 25th pages of the new book.

If one book is not yet rewritten, the control process is returned to a step S102. To the contrary, if the rewriting operation is accomplished, the control process is advanced to a step S107.

In the step S107, the element data or both LEN of the element data and element data corresponding to the element data key, among the 1-page data converted in the step S104 are called up from the respective D/B 12 to 14. These data are added after the respective element data keys of the 1-page data which are arranged in the rear of the layout for the editing work. That is to say, the 1-page data converted in the step S104 is rearranged in a complete form as shown in FIG. 18.

In a step S108, a judgement is made whether or not all pages of the new book have been rearranged in a complete form. If all pages of the new complete book are not yet rearranged, the control process is returned to step S107. If all pages are converted, the control process is advanced to a step S109.

In the step S109, the data of the new complete book is transferred from the host computer 1 to the system controller 2.

In a step S110, all pages of one complete book are registered in the book D/B 21 by the system controller 2.

The editing work can be executed even when the host computer 1 is not in operation for some reason if all pages of one complete book are registered in the book D/B 21 connected to the system controller 2 as previously described.

In a subsequent step S111, the new material supervision No. and page number of the new book are entered by the keyboard 5-1 into the editing machine 3-1.

In a step S112, the input page data of the new book is read out from the book D/B 21 to be registered in the editing apparatus 3-1.

Then, in a next step S113, the page called up from the book D/B 21 is displayed on CRT 6.

In a step S130, a judgement is carried out whether or not the editing operation of the 1-page data displayed on CRT 6 is executed. That is to say, a judgement is made whether or not the pages which have been copied from the original books for the new book in the steps S102 to S104 can be utilized without any further editing. If no editing work is required, the control process is advanced to a step S46. If editing work is required, the control process is advanced to a step S114.

In the step S114, a retrieval operation by any one of the personal computers 4-1 to 4-N is performed whether or not the elements of the original book (including the original book selected in the previous step S101) can be utilized for editing the page of the new book displayed on CRT 6. The retrieval method will be discussed later with reference to FIGS. 22 to 24.

In a step S115, a judgement is made whether or not the element usable in the new book editing operation is found in the above-described retrieval operation.

If some relevant elements are found, the element data key of the retrieved relevant elements are input in the personal computer (for example, 4-1) in a step S116.

In a step S117, the 1-element data called up by the above retrievel operation is transferred to the system controller 2, and is registered in the element D/B 22 under the control of the system controller.

In a step S118, a judgement is made whether or not the retrieval operation is continued. If yes, then the control step is returned to the step S114.

If the element usable for editing the new book is not found in the step S115, the 1-element data retrieved in the step S144 is cleared in a step S132. It is, of course, not appropriate to clear the data stored in the D/B 12 to 14 at this stage.

In the step S119, a judgement is made whether or not the image data, document data or machine information data, namely element is newly input. If the element is not newly input, the control step is returned to the step S118.

When the element is newly input, the control process is advanced to the step S3. Since the processes effected in the steps S3 to S23 are same as those denoted by the same reference numerals in FIG. 3, the descriptions thereof are omitted.

If the control process defined by the step S22 or S23 is completed, the control step is returned to the step S119.

In the step S118, if the retrieval operation is not continued, another judgement is made whether or not the image is displayed on CRT 6 in the step S33. If the image is displayed, the temporary key or element data key of the image to be displayed is input by the keyboard 5-1 in the step S120, and the predetermined image is read out from the element D/B 22 and then displayed on CRT 6.

In the next step S35, the image is moved to the desired position and the coordinates thereof are input.

In the step S121, a judgement is made whether or not the temporary key is input in the previous step S120.

When the temporary key is input, it is converted into the element data key in the step S36. The data conversion has been described with reference to FIG. 3, so that no further description is made here.

If a judgement is made that no temporary key was entered in the step S121, or after the process of the step S36 is accomplished, the element data key, LEN of the image data corresponding to the element data key and the image data itself are registered as one element data into the editing apparatus 3-1 together with the coordinates input in the previous step S35.

In the step S33, if a judgement is made that the image is not displayed, another judgement is made whether or not the document or sentence is displayed in the step S38.

When the document is displayed on CRT 6, the temporary key or element data key to be displayed is entered by the keyboard 5-1 in a step S122, and the predetermined document is called up from the element D/B 22 to be displayed on CRT 6.

In a subsequent step S40, the above document is moved to the desired position and the coordinates thereof are entered.

In a step S123, a judgement is made whether or not the temporary key was input in the previous step S122. When the temporary key is input, it is converted into the element data key in the step S41. This key conversion is carried out in the same way as in the conversion effected in the preceding step S36.

If a judgement is made that no temporary key was input in the step S123, or after the process effected in the step S41 is accomplished, the element data key, and both LEN and the sentence data of the document data corresponding to the element data key, are registered as one element data into the editing apparatus 3-1 together with the coordinates input in the preceding step S35.

If a judgement is made that no sentence was displayed in the preceding step S38, it is judged that the machine sort information is displayed, and the control process is advanced to a step S131.

In the step S131, the element data key of the machine sort information to be displayed is entered by the keyboard 5-1 and the predetermined machine sort information is called up from the element D/B 22 to be displayed on CRT 6.

In the next step S43, the above machine sort information is moved to the desired position and the coordinates thereof are input.

In a step S44, the element data key is registered together with the coordinates entered in the step S43 in the editing apparatus 3-1.

When the process in the step S37 or S44 is completed, a judgement is made whether or not the 1-page data displayed on CRT 6 has been edited. If not yet edited, the process is returned to the step S33. If the editing is completed, then the process is advanced to a step S46.

In a step S46, the edited one page data is converted in the form as illustrated in FIG. 18 in the editing apparatus 3-1.

In the next step S124, the converted one page data is updated in the book D/B 21.

Since the processes define in steps S48 through S57 are the same as those denoted by the same reference numerals of FIG. 3, the explanations thereof will be omitted. If in the step S57, the judgement is performed to edit the next page, the control process is returned to the step S111.

It is obvious that although in the explanations with reference to FIG. 20, the retrieval operation was previously executed before the 1-page data was edited in the steps S33 and thereafter, and the necessary data were read out of the D/B 12 through 14 to be registered in D/B 22, these processes may be performed during the editing work.

A detail description will now be made wherein the process of the above-described step S114 is carried out for the document data retrieval operation. The retrieval operation of the step S114 is performed by employing any one of the personal computers 4-1 to 4-N.

Figure 22:
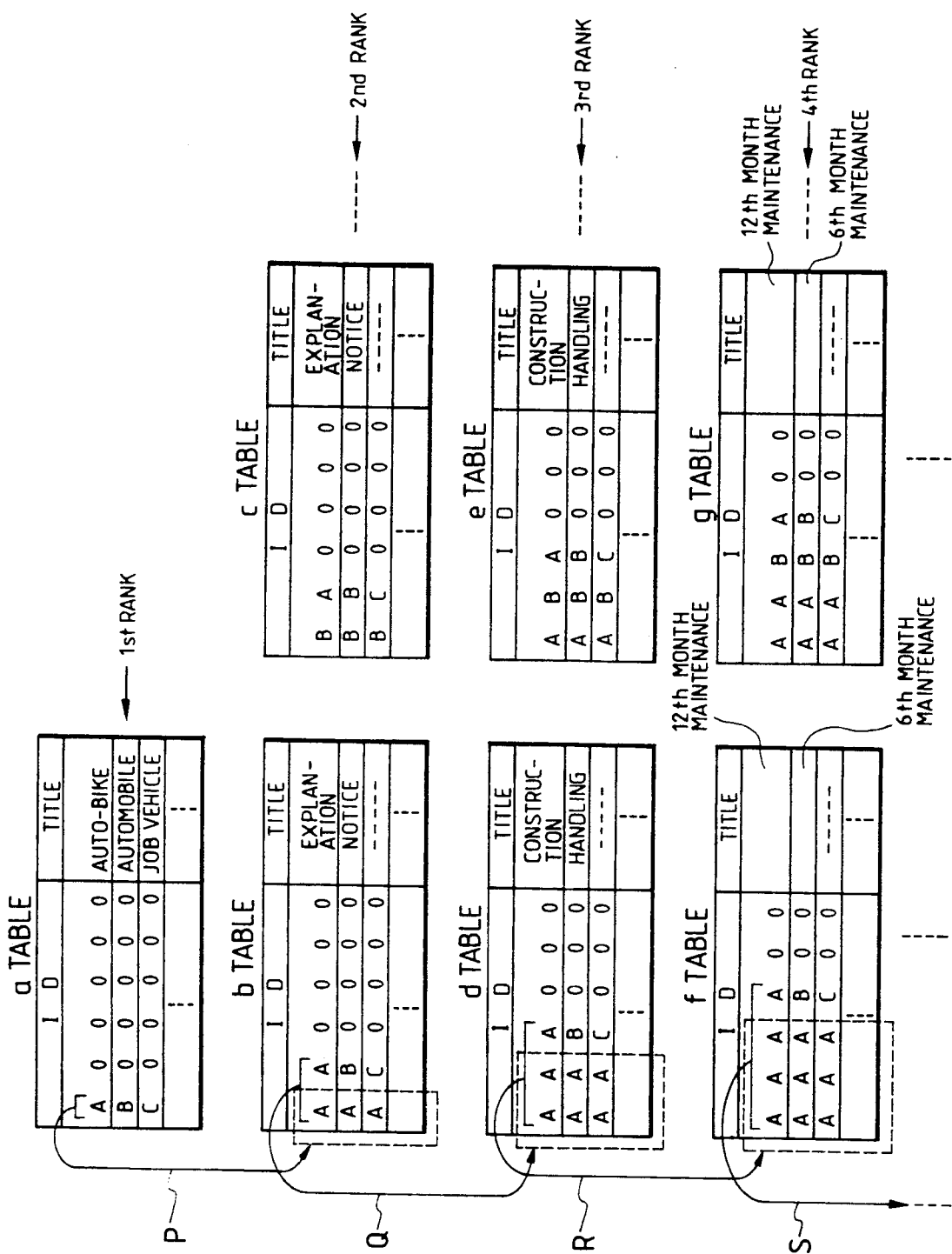
FIG. 22 is a schematic diagram for showing a portion of a table for retrieving document data set in the document D/B 12.

FIG. 22 is a schematic diagram showing a portion of a table for the document data retrieval which has been previously set in the document D/B 12. A symbol "0" indicated in the respective tables of FIG. 22 represents "null", or that no data is entered.

In the document D/B 12, as illustrated in FIG. 22, a plurality of document data retrieval tables each consisting of an index (referred to as an "ID" simply) and a title have been input and set. A byte length of the ID is set to be equal to that of the detailed item code (6 bytes in the preferred embodiment) in order to correspond to the detailed item code of the element data key which in turn corresponds to the document or sentence data shown in FIG. 17.

In an a-table of FIG. 22, the different data such as A, B, C, and so on, are respectively input in the head byte (first byte) of ID each having a 6-byte length.

In a b-table of FIG. 22, the common data of "A" is input in the first byte of each ID, and the different data of "A, B, C" are respectively input in the second byte thereof.

In a c-table of FIG. 22, the common data of "B" is entered in the first byte of each ID and the different data of "A, B, C" are entered, respectively, in the second byte thereof.

In a d-table of FIG. 22, the common data of "AA" is input in the first and second bytes of each ID, and also the different data of "A, B, C" are entered, respectively in the third byte.

In an e-table of FIG. 22, the common data of "AB" is input in the first and second bytes of each ID, and the different data of "A, B, C" are entered, respectively, in the third byte thereof.

Similarly, in the f-table of FIG. 22, the common data of "AAA" is input in the first to third bytes of each ID, and the different data of "A, B, C" are entered, respectively, in the fourth byte thereof.

In a g-table of FIG.22, the common data of "AAA" is input in the first to third bytes of each ID, and the different data of "A, B, C" are entered, respectively, in the fourth byte.

Figure 23:
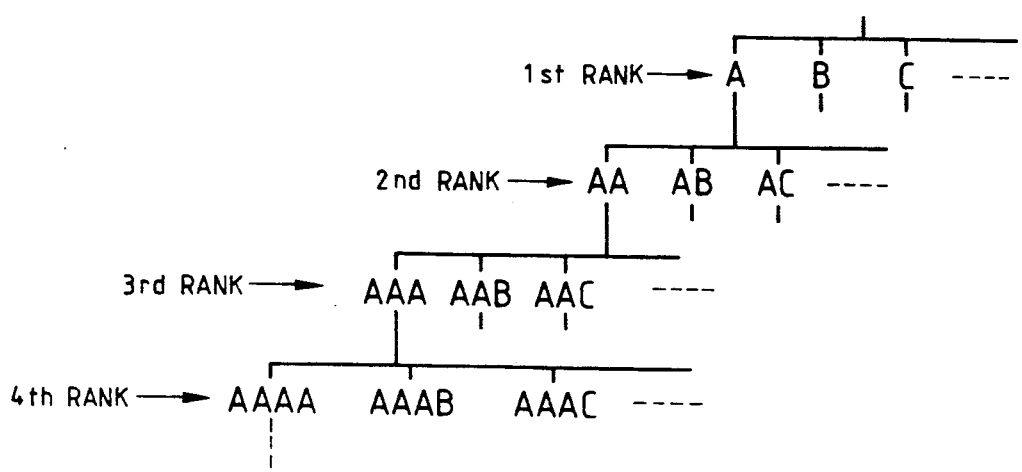
FIG. 23 is a schematic diagram for representing a hierarchical structure of a document retrieval table.

Thus, the respective tables for the document data retrieval operation set in the document D/B 12 are formed in a hierarchical structure as illustrated in FIG. 23.

In practice, each of the tables for the document data retrieval operation are formed by the following method. That is to say, in correspondence to the respective ID's in the table (a-table) of the first hierarchy or rank where the data has been input in only the first byte of each ID, each title (auto-bike, automobile, or special-purpose car etc.) representative of the first highest concept of the document data is input. Also, in correspondence to each of ID's in the tables (b and c-tables) of the second hierarchy or order where the data has been input in only the first and second bytes of each ID, another title (explanation, or notice etc.) representative of the second highest concept is input. Similarly, a still further title (structure explanation, operating or handling manual etc.) representative of the third rank concept is input in the tables (d and e-tables) of the third hierarchy, and a further title (twelfth month maintenance, or sixth month maintenance, etc.) indicative of the fourth rank concept is input in the tables (f and g-tables) of the fourth hierarchy. Also the same data as the ID representative of the lowest concept is previously input in the detailed item code of the element data key shown in FIG. 17. And then the retrieval operation of the document data is performed as illustrated in FIG. 24.

It should be noted that the lowest hierarchy data need not be set in the table of the sixth hierarchy, but may be set in a table higher than the sixth hierarchy.

Figure 24:
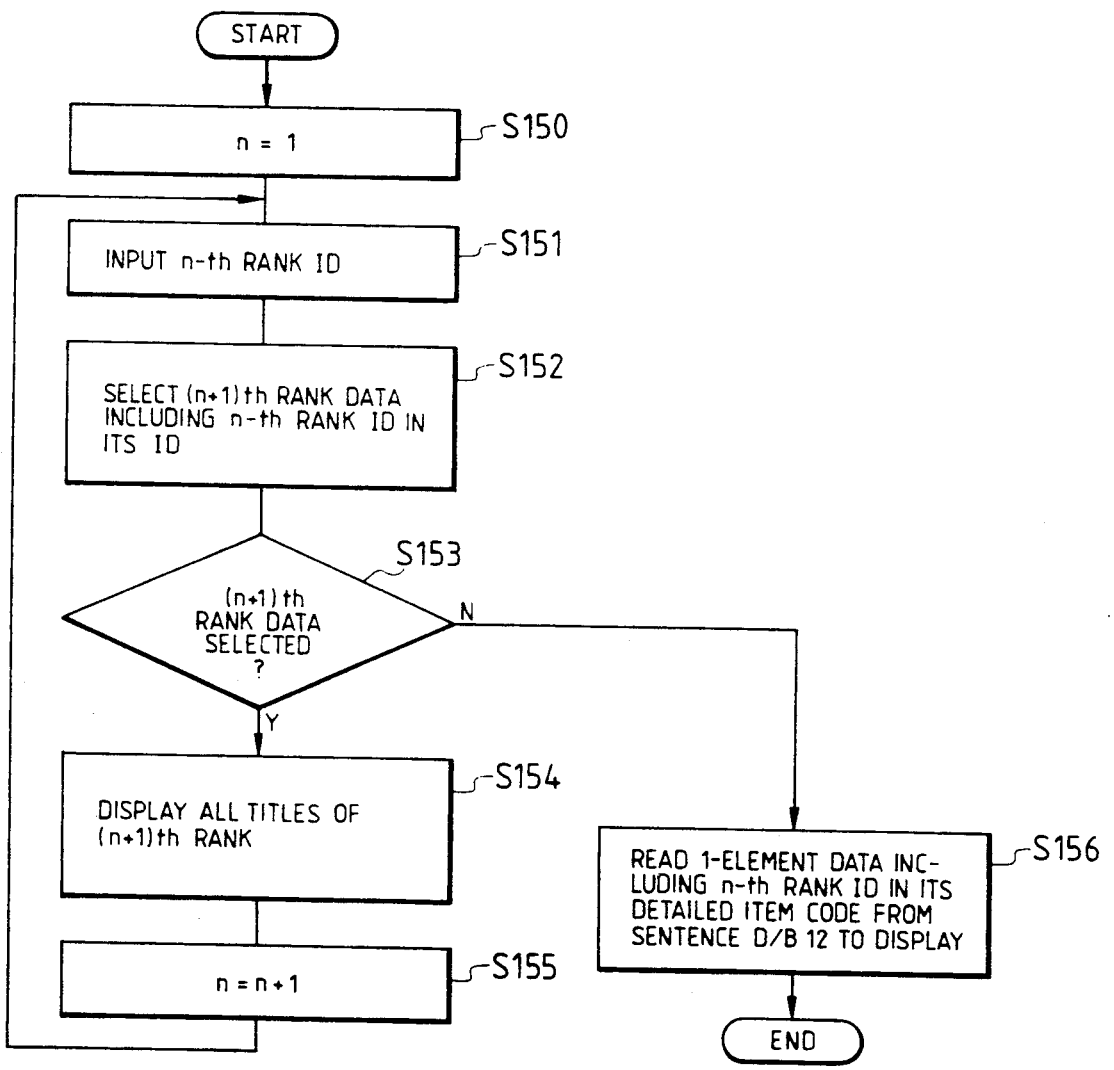
FIG. 24 is a flowchart for illustrating a retrieval method according to one preferred embodiment of the invention.

FIG. 24 is a flowchart for illustrating the retrieval method indicated in the step S114 according to one preferred embodiment of the invention. As previously described, the retrieval operation is carried out by any one of the personal computers 4-1 to 4-N.

In a step S150 of FIG. 24, first "n" is set to be 1.

In a step S151, the ID of the n-th hierarchy of rank is input by, for instance, the personal computer 4-1.

In a step S152, the (n+1) th hierarchy data containing the n-th hierarchy ID in ID thereof is selected from the table for the document data retrieval operation.

In a step S153, a judgement is made whether or not the (n+1)th hierarchy data is present, namely, the (n+1)th hierarchy data is selected in the step S152.

If yes, then all titles of the (n+1)th hierarchy are displayed in step S154. Then, after 1 is added to "n" in a step S155, the control process is returned to be the step S151.

When a judgement is made that the (n+1)th hierarchy data is not present in the step S153, the control process is transferred to the step S156.

In a step S156, the 1-element data containing the n-th hierarchy ID in the detailed item code thereof (i.e., 1-document or 1-sentence data shown in FIG. 17) is called up via the host computer 1 from the document or sentence D/B 12 and displayed in the personal computer 4-1.

Consequently, when the table for the document data retrieval operation is constructed as in FIG. 22, and "A" is input as ID to the first byte, the b-table of the second hierarchy or rank where "A" is set in the first byte is selected and displayed, as indicated by an arrow "P".

Then, the "AA" is input in the first and second bytes as ID, the d-table of the third hierarchy where "AA" is set in the first and second bytes is displayed, as denoted by an arrow Q.

Similarly, when "AAA" is entered as ID in the first to third bytes, the f-table of the fourth hierarchy where "AAA" is set in the first to third bytes is displayed, as shown by an arrow R.

According to the above-mentioned method, a retrieval operation can be done to show that such documents or sentences as a twelfth month maintenance manual are registered with respect to the document of the structure explanation on, for example, the auto-bike.

Furthermore, when "AAA" is input as ID into the first to fourth bytes for the retrieval operation, the list of the fifth hierarchy (not shown) where "AAAA" is set in the first to fourth bytes is displayed as denoted by an arrow S.

When such a retrieval process is performed for the list of the lowest hierarchy, a judgement can be made whether or not the required document data is registered in registered in the document D/B 12.

When the necessary data is retrieved, the retrieved data can be utilized to edit a new book if the retrieved data is registered in the element D/B 22 as previously described with regards to the step S117.

Although the above explanation was made on the retrieval operation of the document data, the image data or machine sort information may be similarly retrieved. That is to say, if a plurality of retrieval tables as illustrated in FIG. 22, are set in the image D/B 13 and machine sort information D/B 14, and if ID's of the retrieval tables are input into the items (3-byte length; see FIGS. 6 to 9) in the element data key of the image data and machine sort information, the above-mentioned retrieval operation may be performed.

Although in the preceding description, the machine sort information and image were registered into the respective different D/B (i.e., the machine sort information D/B 14 and image D/B 13), they may be registered in a common D/B since the data of the machine sort information shown in FIGS. 6 to 8 has the same format as that of the image data shown in FIG. 9.

Also when the image and document data were input in the previous embodiment, the temporary key was input first and converted into the element data key in the actual editing operation. However, the temporary key may not be input in advance but the element data key may be input at the beginning, which is similar to the entry of the machine sort information data.

In accordance with the preferred embodiment of the invention having the above-described arrangement, the host computer 1 which may be a large-scale general purpose computer illustrated in FIG. 2 enables the materials or elements to be supervised, and the system controller 2 which may be a medium-scale relay computer for connecting the host computer 1 and respective editing apparatuses 3-1 to 3-N, enables the data to be supervised in the page unit or book unit, so that a new book can be produced by utilizing an original book or elements of the original book produced by the editing apparatus. In consequence, new books can be efficiently produced.

In other words, when, for instance, a service manual, a shop manual, or the like are produced by the editing apparatus, if a new manual of the machine similar to one described in the original book which has been already produced is to be produced, the manual relating to the similar machine can be produced within an extremely short time and at low since a major part of the original book can be utilized for editing the new manual.

The editing apparatus according to this invention may be utilized not only to produce service manuals, shop manuals, but also general books, magazines and newspaper.

In the foregoing description, when a new book was produced by utilizing the information of a previously edited book, the layout information read out from the layout D/B 11 was reconstructed into the 1-page data in the host computer 1. It is of course possible to perform such a process in the system controller 2. Similarly, under the control of the system controller 2, the 1-page data may be resolved into the information in the element unit and layout information.

It should be noted that when the element data of the machine information was input, in the previous description the element data key was entered at the beginning without entry of the temporary key. According to the present invention, the temporary key may be first entered, which is similar to the element data relating to the document or sentence and image.

Figure 26:
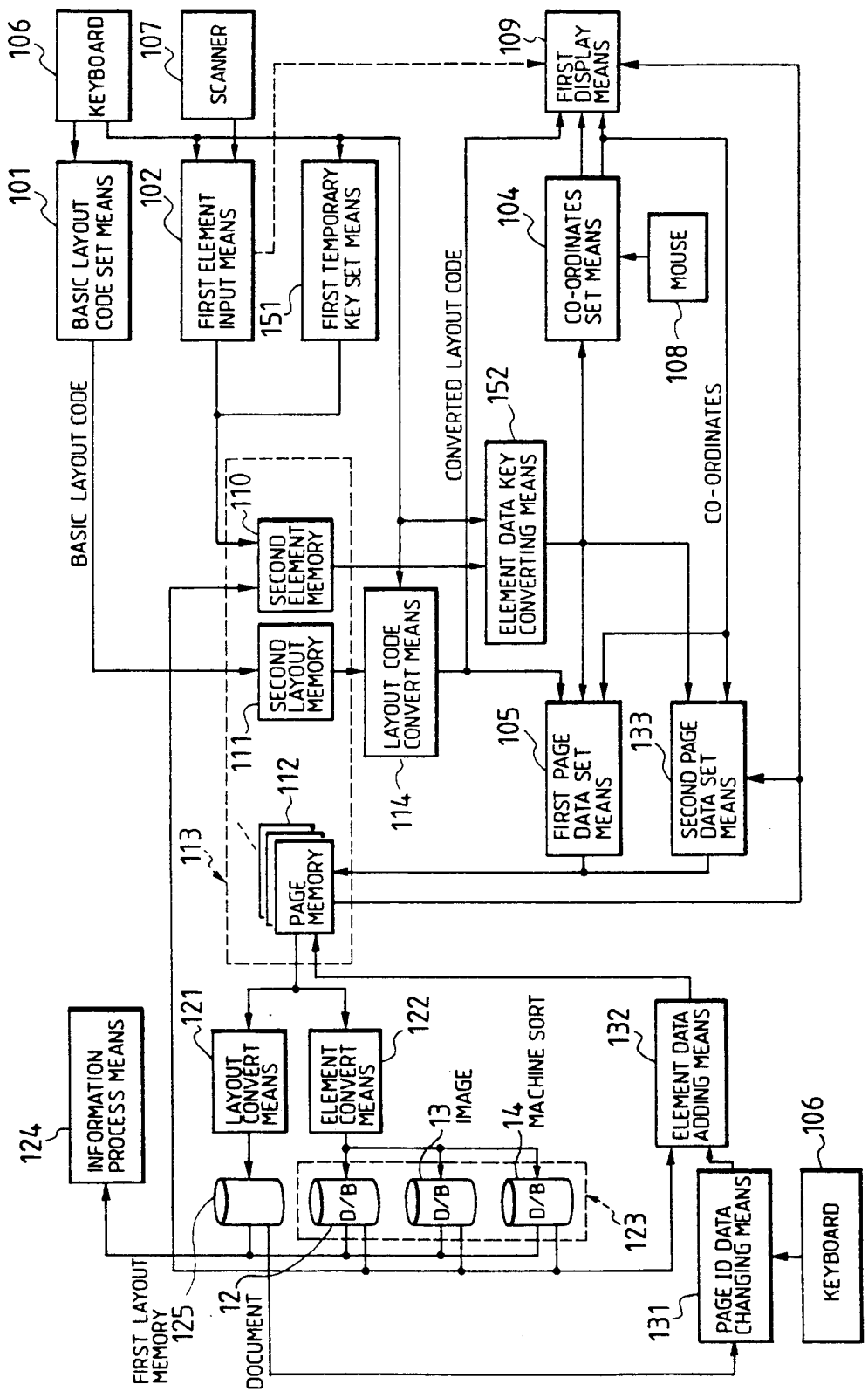
FIG. 26 is a functional block diagram of a typical editing apparatus as one embodiment of the present invention.

FIG. 26 is a functional block diagram illustrating the construction of still another embodiment of this invention. In FIG. 26, the reference numerals which have their equals in FIG. 2 denote identical parts. With reference to FIG. 26, the keyboard 106 has the same function as the keyboard 5-1 to 5-N and/or the keyboards of the personal computers 4-1 to 4-N in FIG. 2 and the scanner 107 has the same function as the scanner 8 in the same drawing. Similarly, the second element memory means 110, the second layout memory means 111, and the page memory means 112 have the same functions as the element D/B 22, the layout basic D/B 23, and the book D/B 21 in FIG. 2, respectively.

With reference to FIG. 26, keyboard 106 is connected to a basic layout code setting means 101, an element input means 102, a temporary key setting means 151, a layout code conversion means 114, and an element data key conversion means 152.

The basic layout code setting means 101 sets the basic layout code (refer to FIG. 4) to be put in the step S1 of FIG. 3. The temporary key setting means 151 set the temporary key illustrated in FIG. 5.

As already described with reference to FIG. 5, the leading byte of the temporary key is "D" in the case of image data, or "T" in the case of document data. The leading byte enables the editing devices 3-1 to 3-N to discriminate whether the data are for the images or the documents and handle the element data depending on the sort of the data.

When the temporary key is composed of six bytes as illustrated in FIG. 5, data (of any arbitrary form) selected by the operator himself for the discrimination of element data are introduced into the five bytes other than the leading byte. In this case, numerical data may be set in the three least significant bytes of the temporary key and may be automatically carried after the element data have been introduced therein. For example, the numerical data are set at "001" when the input of element data is started and they may be automatically advanced to "002" and then to "003" and so on, each time the element data are subsequently input.

The element input means 102 converts the document data introduced through the keyboard 106 and the image data introduced through the scanner 107, etc. into vectors to hold therein.

The layout code conversion means 114 converts the "layout code" part of the basic layout code introduced in the basic layout code setting means 101 into data control No. and page.

The element data key conversion means 152 converts the temporary key introduced in the temporary key setting means 151 and memorized in the second element memory means 110 into an element data key as illustrated in FIG. 15 and FIG. 16. The element data key conversion means 152 may be adapted to convert the temporary key into the element data key by having the element data key directly introduced through the keyboard 106 or to effect, during the conversion, sequential selection of the component codes forming the element data key (codes such as the code for designating the machine sort and the code for discriminating the kind of information in the case of the images information) by causing these component codes to be displayed on a display device and allowing the operator to select the displayed codes in the mode of conversation.

In the second element memory means 110, the element data and the element data key transferred from the first element memory means 123 are additionally memorized as described more specifically hereinafter. When the element data key and the element data are fed out of the second element memory means 110, the element data key is supplied in its unmodified form, i.e. without being converted into any other element data key in the element data key conversion means 152, to the first or second page data setting means 105, 133 and the coordinates setting means 104.

The basic layout code setting means 101 is connected to the second layout memory means 111 disposed in the memory means 113. The second layout memory means 111 is connected to the layout code conversion means 114.

The element input means 102 and the temporary key setting means 151 are connected to the second element memory means 110 disposed in the memory means 113. The second element memory means 110 is connected to the element data key conversion means 152. The element data key conversion means 152 is connected to the coordinate setting means 104, the first page data setting means 105, and the second page data setting means 133 which will be described more specifically hereinafter. The coordinates setting means 104 supplies to the display means 109 the element data key supplied from the second element memory means 110 and the element data corresponding to the element data key and, at the same time, sets the positional coordinates of the element data which are moved by the manipulation of the mouse 108, to output the display means 109, the first page data setting means 105, and the second page data setting means 133.

The layout code conversion means 114 calls out a desired basic layout code memorized in the second layout memory means 111, and converts the code into a converted layout code as shown in the lower part of FIG. 12, to supply to the first page data setting means 105 and the display means 109.

The first page data setting means 105, which is actuated when an absolutely new book is to be produced, prepares one page data as shown in FIG. 18 by using the element data key and the element data fed out of the element data key conversion means 152, the converted layout code fed out of the layout code conversion means 114, and the information on coordinates fed out of the coordinates setting means 104, to supply to the page memory means 112 in the memory means 113.

The element input means 102 is connected with a dotted line to the display means 109, indicating that the data on documents are displayed on the display means 109 when such documents are introduced through the keyboard 106.

The page memory means 112 is connected to the layout conversion means 121 and the element conversion means 122.

The layout conversion means 121 forms such information on layout as shown in FIG. 19 by subtracting LEN and element data from the group of element data included in the one page data (FIG. 18) memorized in the page memory means 112. The layout conversion means 121 is connected to the first layout memory means 125 which is connected to the data processing means 124. The first layout memory means 125 corresponds to the layout D/B 11 illustrated in FIG. 2.

The element conversion means 122 copies the group of element data from the data of one page memorized in the page memory means 112 and decomposes the copied group of element data into units of element. The element conversion means 122 is connected to the first element memory means 123 which is in turn connected to the data processing means 124. The first element memory means 123 is provided with a document D/B 12, an image D/B 13, and the machine sort information D/B 14.

The first layout memory means 125 is further connected to the page discriminating data conversion means 131. The page discriminating data conversion means 131, when a book is to be produced by using the information of another book already edited by the editing apparatus and memorized in the first layout memory means 125 and the first element memory means 123, reads out a necessary part of the layout data memorized in the first layout memory means 125 and rewrites the data control No. and page number of the layout data (namely the page discrimination data for discriminating the page of the layout data) into the data control No. and page number of the book to be produced. The introduction of the data for the rewriting is effected through the keyboard 106.

The page discrimination data conversion means and the first element memory means 123 are connected to the element data addition means 132. The element data addition means 132 reads out of the first element memory means 123 the "element data" part of the layout information (FIG. 19) put out of the page discriminating data conversion means 131 which corresponds to the element data keys set behind the layout for editing and attaches the element data to the element data keys.

The element data addition means 132 is connected to the page memory means 112. The page memory means 112 is further connected to the second page data setting means 133 and the display means 109.

The second page data setting means 133, which is actuated when a new book similar to an already edited book is to be produced, modifies the information of one page fed out of the page memory means 112 by using the data on element units supplied from the element data key conversion means 152 and the positional coordinates of the element data supplied from the coordinates setting means 104. Then, it supplies the modified information of one page to the page memory means 112. The second page data setting means 133, when the element data key conversion means 152 have not fed out the data of element units, returns the one page information transferred from the page memory means 112 to the page memory means 112 in their unmodified form.

The first element memory means 123 is connected further to the second element memory means 110.

The basic layout code setting means 101, the element input means 102, the temporary key setting means 151, the coordinates setting means 104, the first page setting means 105, the second page data setting means 133, the layout code conversion means 114, and the element data key conversion means 152 are provided, respectively, in the editing devices 3-1 to 3-N, the system controller 2, or the personal computers 4-1 to 4-N illustrated in FIG. 2. The layout conversion means 121, the element conversion means 122, the page discrimination data conversion means 131, and the element data addition means 132 are provided, respectively, in the host computer 1, the system controller 2, or the personal computers 4-1 to 4-N illustrated in the same drawing.

The FIG. 26 embodiment of this invention constructed as described above possesses a function of producing a new book without precedent and a function of producing a book similar to an already edited book by using the data on the edited book.

First, the operation of the FIG. 26 embodiment in the production of a new book within precedent will be described in detail below.

First the information designating the basic layout of one page is introduced through the keyboard 106. The information is processed in the basic layout code setting means 101 to form such basic layout codes as shown in FIG. 4. The basic layout codes are memorized in the second layout memory means 111.

The introduction and memorization of the basic layout are performed a plurality of times as occasion demands.

Then, the temporary key corresponding to the element data to be introduced is put in through the keyboard 106. The data of the temporary key except the leading byte represent the code to be arbitrarily decided by the operator himself for the discrimination of the element data introduced by him, and are not intended to effect control of the element data in the first element memory means 123 or the second element memory means 110. The temporary key is set in such a form as illustrated in FIG. 5 in the temporary key setting means 151.

After the introduction of the temporary key, the document and/or machine sort information are put in through the keyboard 106 or the images are introduced through the scanner 107 and these data are supplied to the element input means 102. In the element input means 102, the LEN of the element data are added to the element data, if necessary, to be supplied in combination with the temporary key to the second element memory means 110 and stored therein. The introduction and memorization of the temporary key and the element data may be performed a plurality of times as occasion demands.

Then, necessary parts of the basic layout codes memorized in the second layout memory means 111, namely the basic layout codes on which the layout data of a page to be edited are set, are read out of the second layout memory means 111 by injecting the layout codes through the keyboard 106, and supplied to the layout code conversion means 114.

In the layout code conversion means 114, the "layout code" part of the basic layout code is converted into the data control No. and page introduced through the keyboard 106. As the result, the converted layout code (the diagram in the lower part of FIG. 12) is produced. The converted layout code is supplied to the first page data setting means 105 and the display means 109.

From the second element memory means 110, the element data or the LEN and the element data to be used in editing the page, and the temporary key corresponding to the element data are supplied to the element data key conversion means 152. In the element data key conversion means 152, the temporary key is converted in to the element data key as described above.

The element data key output, by the element data key conversion means 152 and the element data or the LEN and the element data are supplied to the first page data setting means 105 and the coordinates setting means 104. The coordinates setting means 104 supplies the element data to the display means 109.

When the element data displayed in the display means 109 are moved with the mouse 108, the positional coordinates corresponding to the position after the movement are set by the coordinates setting means 104 and the coordinates are transferred to the first page data setting means 105.

The editing of a page is effected by causing optionally a plurality of kinds of element data to be displayed at pertinent positions on the basic layout.

When the work of editing one page is completed, such data of one page as shown in FIG. 18 are produced in the first page data setting means 105, based on the output signals from the layout code conversion means 114, the element data key conversion means 152, and the coordinates setting means 104. To be more specific, the data of one page are composed of the converted layout code supplied from the layout code conversion means 114, the layout for editing consisting of the positional coordinates output from the coordinate setting means 104 and the element data key of the element data corresponding to the positional coordinates, and the group of element data comprising the element data key forming the layout for editing and the element data corresponding to the element data key.

The data for one page produced in the first page data setting means 105 are memorized in the page memory means 112. In the page memory means 112, as many pages of edited data as required for the composition of the book are memorized. These data are supplied to a hard copy producing device (not shown).

The data of one page memorized in the page memory means 112 are transferred to the layout conversion means 121. In the layout conversion means 121, such information of layout as shown in FIG. 19 is produced from the one page data. The information of layout is transferred to and stored in the first layout memory means 125.

The one page data memorized in the page memory means 112 are transferred to the element conversion means 122. The element conversion means 122 copies the group of element data from the one page data, decomposes the copied group of element data into units of element, and transfers the decomposed data to the first element memory means 123. Of the group of decomposed element data, those concerning the element of document are memorized in the document or sentence D/B 12, those concerning the image element in the image D/B 13, and those concerning the element of the machine sort information in the machine sort information D/B 14, respectively, in the first element memory means 123.

The element information memorized in the first element memory means 123 and the layout information memorized in the first layout memory means 125 are called out by the data processing means 124 as occasion demands and are utilized for various data processing and retrieval to be executed by the data processing means 124.

In the manner described above, the new book is produced and the data on the new book are decomposed into those concerning the layout and those concerning the element to be memorized.

Now, the operation of the FIG. 26 embodiment in the production of a book similar to an already edited book by using the edited book will by described below.

The operator examines the edited book to find which pages of the book are available, then injects the data (document) control No. and page (page discriminating data) of the utilized book, and reads out the data for the pertinent pages from the first layout memory means 125. The data thus read out are transferred to the page discrimination data conversion means 131.

When the data control No. and page of the book to be produced are injected through the keyboard 106, the data control No. and page so read out are converted into the data No. and page which are input, in the page discrimination data conversion means 131.

The element data addition means 132 reads the element data part of the modified one page data which correspond to the element data key set behind the layout for editing from the first element memory means 123 and attaches the element data to the element data key mentioned above. As the result, the data for one page are completed.

The data for one page are memorized in the page memory means 112, then transferred to the display means 109, displayed on the display means 109, and transferred to the second page data setting means 133.

The operator examines the one page data displayed on the display means 109 and decide whether the data require modification or not. When the data are not found to require any modification, information to that effect is supplied from a suitable means (not shown) and the data are transferred to the page memory means 112 and decomposed into those concerning element and those concerning layout in the layout conversion means 121 and the element conversion means 122. In this case, since the data concerning the element has been already memorized in the first element memory means 123, only the data concerning the layout are supplied to and memorized in the first layout memory means 125.

When a desired element data part of the data for one page displayed on the display means 109 is to be deleted or modified into another kind of element data, namely when the one page data displayed on the display means 109 are to be edited, information regarding the element namely the element, data key and the element data are read out of the first element memory means 123 by injecting the element data, key corresponding to the element data to be required and registered in the second element memory means 110.

When the element data to be required are not present in the first element memory means 123 the temporary key and the element data are newly injected and they are registered in the second element memory means 110.

To be specific, the second element memory means 110 is capable of memorizing the element information consisting of the temporary key and the element data and the element information consisting of the element data key and the element data.

The second data element memory means 110 is energized by a means (not shown) to supply the element data end the element data key or the element data and the temporary key to the element data key conversion means 152. The element data key conversion means 152, when the element data and the temporary key are called out, converts the temporary key into the element data key to be introduced through the keyboard 106 and supplies this key or, when the element data and the element data key are called out, supplies the element data key in its unmodified form.

The element data key and the element data fed out of the element data key conversion means 152 are transferred to the coordinates setting means 104 and the second page data setting means 133. The coordinates setting means 104 supplies the element data to the display means 109, and sets the positional coordinates of the element data fixed by the manipulation of the mouse 108 for supply to the second page data setting means 133.

When the one page data displayed on the display means 109 is completely modified (edited) by repeating the procedure mentioned above, the second page data setting means 133 reconstructs the one page data transferred from the page memory means 112 into the edited data for one page. To be more specific, the second page data setting means 133 erases the element data superposed by the element data set newly on the layout by the editing, the element data key corresponding to the element data, and the positional coordinates thereof from the one page data transferred from the page memory means 112 and adds to the one page data mentioned above the element data newly set on the layout by the editing, the element data key corresponding to the element data, and the positional coordinates of the element data.

The one page data which have been modified as described above are supplied by the second page data setting means 133 to the page memory means 112 for memorization therein. The one page data are supplied in units of page or book to the layout conversion means 121 and the element conversion means 122. The layout conversion means 121 and the element conversion means 122 decompose the supplied data into data concerning the element and those concerning the layout, and supply them to the first layout memory means 125 and the first element memory means 123 for memorization therein. In this case, data concerning the element which have been already memorized in the first element memory means 123 are not doubly memorized.

When a new book similar to an already edited book is produced by the operation mentioned above, the element data which are common to the two books concerned can be used in their unmodified form and, therefore, the time required for the production of the new book is shortened notably.

Figure 27:
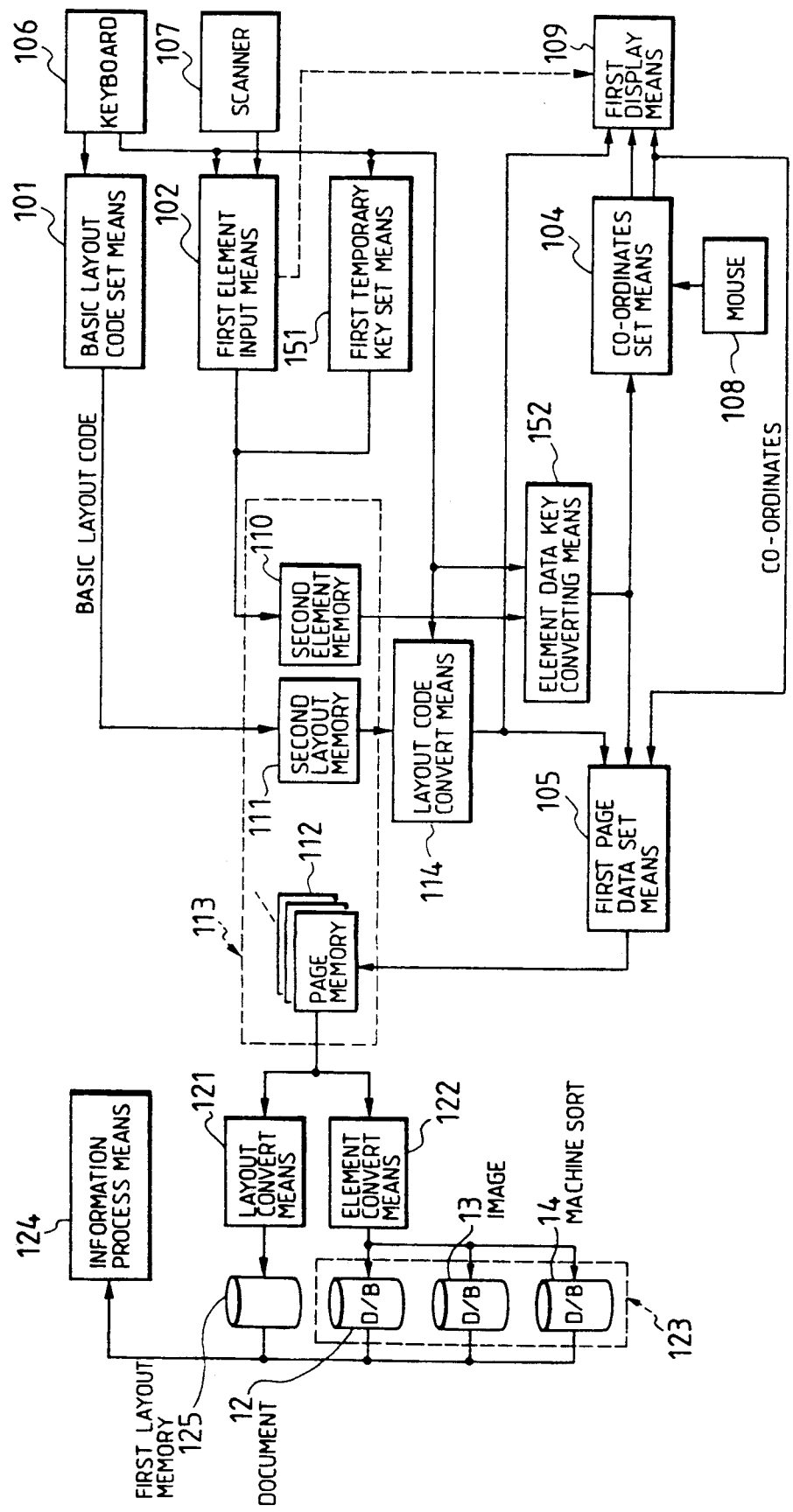
FIG. 27 is a functional block diagram of another typical editing apparatus as another embodiment of the present invention.

FIG. 27 is a functional block diagram of yet another embodiment of the present invention. In FIG. 27, reference numerals which are the same as those in FIG. 26 denote identical or similar parts. As is clearly noted from a comparison of the two diagrams, the FIG. 27 embodiment omits the page discrimination data modifying means 131, the element data addition means 132, and the second page data setting means 133.

In the FIG. 27 embodiment, the production of a new book cannot be accomplished by using the information (the data concerning the layout and the element) of an already edited book. The production of a new book by the use of the element data can be achieved by preventing the element data formerly used for the editing from being erased in the second element memory means 110.

The FIG. 27 embodiment, similarly to the embodiment illustrated in FIG. 26, enables the element data, for example, of the already produced book to be utilized by the data processing means 124 to perform processing other than editing.

Figure 28:
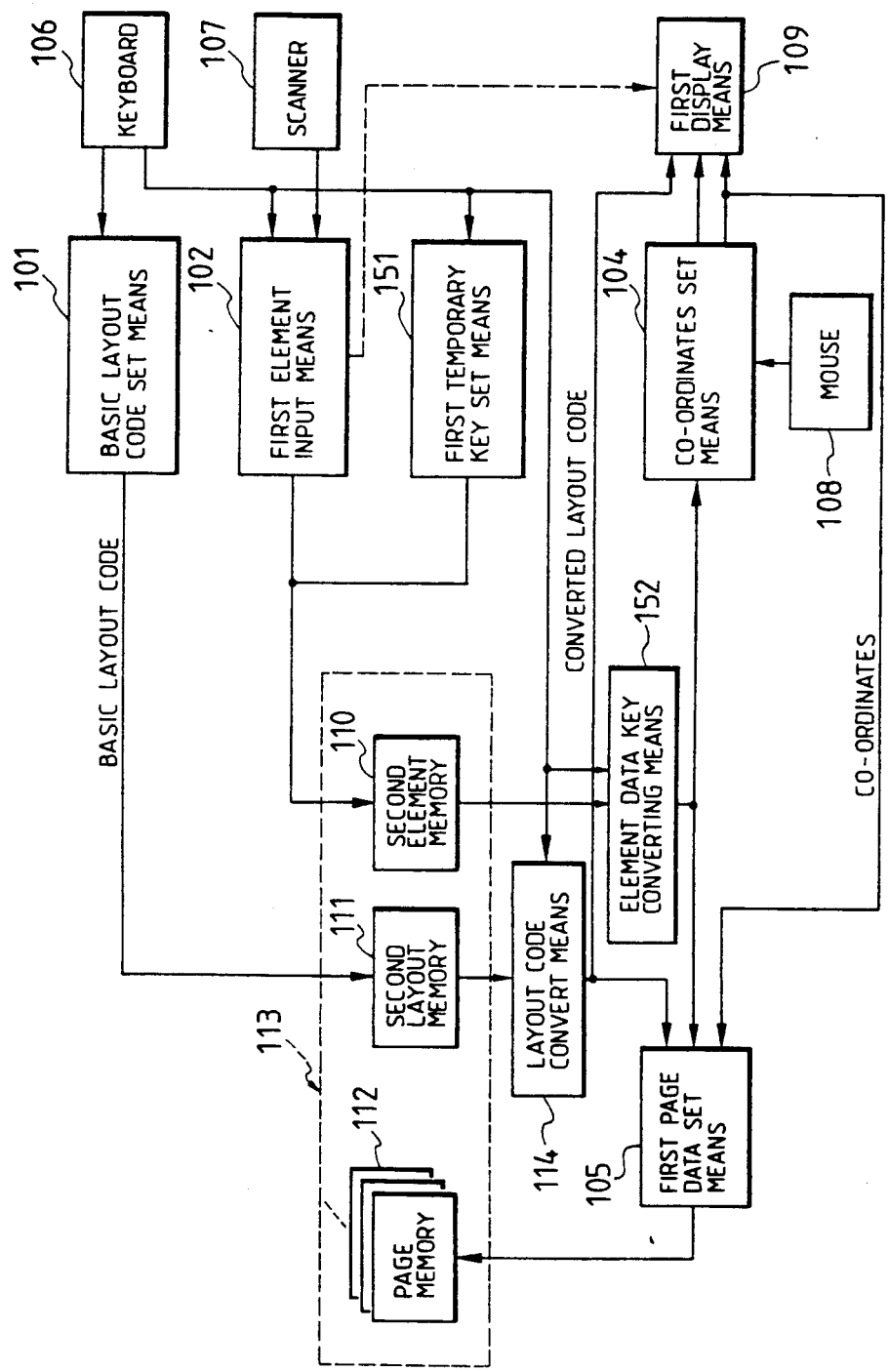
FIG. 28 is a functional block diagram of yet another typical editing apparatus as yet another embodiment of this invention.

FIG. 28 is a functional block diagram of yet another embodiment of this invention. In FIG. 28, reference numerals which are the same as those in FIG. 27 denote identical or similar parts. As clearly noted by a comparison of the two diagrams, the FIG. 28 embodiment omits the layout conversion means 121, the element conversion means 122, the first element memory means 123, and the first layout memory means 125.

The FIG. 28 embodiment is incapable of decomposing the data of an edited book into those concerning the element information and those concerning the layout information for memorization and, therefore, is incapable of utilizing the element information in the data processing means (such data processing means 124 in FIG. 27) other than the editing means. This embodiment, similarly to the editing apparatus illustrated in FIG. 27, enables common element data to be used for the production of a book similar to an already edited book by preventing the data on the edited element from being erased in the second element memory means 110.

Figure 29:
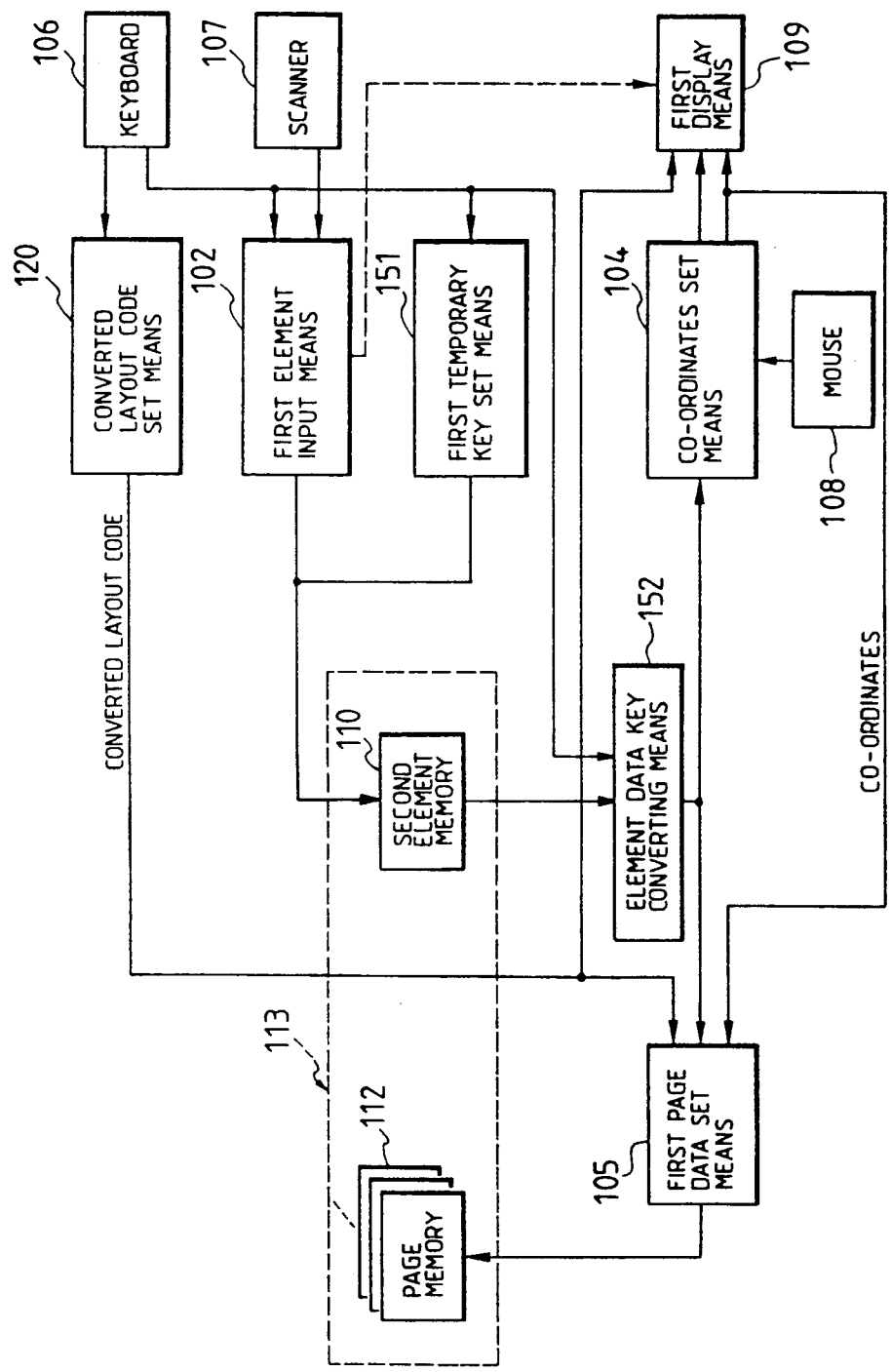
FIG. 29 is a functional block diagram of a further typical editing apparatus as a further embodiment of this invention.

FIG. 29 is a functional diagram of a modified version of the embodiment illustrated in FIG. 28. In FIG. 29, reference numerals which are the same as those in FIG. 28 denote identical or equal parts.

In FIG. 29, the converted layout code setting means 120 sets the converted layout code in response to input by means of the keyboard 106.

The FIG. 29 embodiment is not well suited to the editing of a book having a large number of pages because a layout code must be set each time the editing is performed on one page. It is, however, simpler in construction than the embodiments illustrated in FIGS. 26, 27, and 28.

Figure 1:
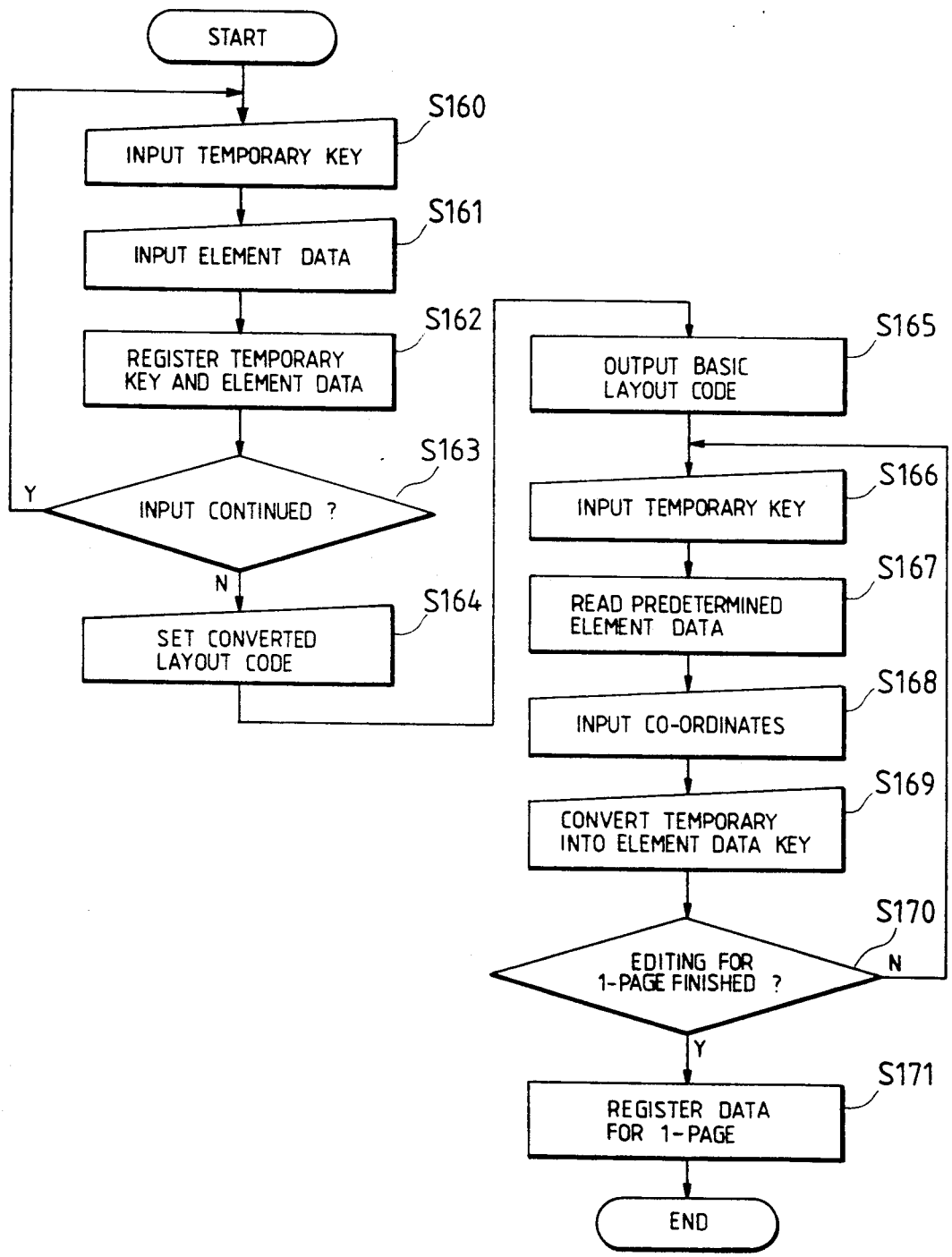
FIG. 1 is a flow chart illustrating the procedure for a method of editing according to the present invention.

FIG. 1 is a flow chart illustrating the procedure of editing embodying the present invention.

With reference to FIG. 1, when the temporary key corresponding to the element data to be newly introduced is injected at the step S160 and the element data are injected at the step S161, the temporary key and the element data are memorized in the second element memory means 110 (FIGS. 26 to 29) at the step S162.

At the step S163, a decision is made as to whether the introduction of the element data is to be continued or not.

When the decision is for continuing the introduction of the element data, the processing returns to the step S160.

When the decision is for discontinuing the introduction of the element data, the converted layout code is set at the step S164 and, as the result, the basic layout corresponding to the converted layout code is presented on the display at the step S165.

When the temporary key corresponding to the element data desired to be displayed on the basic layout is introduced at the step S166, the element data is fed out onto the basic layout at the step S167.

At the step S168, the coordinates of the element data on the basic layout are introduced by causing the element data displayed on the display to be moved to a desired position on the basic layout by means of a mouse, for example.

At the step S169, the temporary key of the element data which has been used for the editing as described above is converted into the element data key.

At the step S170, a decision is made as to whether the editing for one page has been completed or not. When the editing is not found to be completed, the processing returns to the step S166.

When the editing for one page has been completed, the one page data are memorized in the page memory means 112 (FIGS. 26 to 29) at the step S171, with the processing brought to completion.

This invention can be embodied in any procedure of editing on the sole condition that the editing procedure should require introduction of a simplified element data key or a temporary key whenever element data are newly introduced.

The embodiment illustrated in FIG. 26 has been depicted as so constructed that the data of various elements formed by the decomposition in the element conversion means 122 which concern the images are memorized in the image D/B 13 and data which concern the machine sort information are memorized in the machine sort information D/B 14. This invention is not limited to this embodiment but may be so constructed that either of the image D/B 13 and the machine sort information D/B 14 is provided and utilized in common for memorizing the data concerning the images or the machine sort. Since both the data concerning the images and the data concerning the machine sort are furnished with element data keys of one and the same format as illustrated in FIG. 9 and FIGS. 6 to 8, they can be handled as those of one fixed form.

When the element data key for the data concerning the documents illustrated in FIG. 17 uses the same format as that for the data concerning images and the machine sort information, the data concerning the document can be memorized in the D/B intended for the storage of the data concerning the images and/or machine sort.

Though the embodiment mentioned above has been depicted so as constructed that the temporary key is converted into the element data key when the element data are displayed on the first display means 109, it is naturally permissible to modify the construction so that the conversion to the element data key is effected when the one page data are set by either the first page data setting means 105 or the second page data setting means 133 after the work of editing has been completed.

FIG. is a functional block diagram of an editing apparatus in which the method of editing of the present invention is embodied. With reference to FIG. 30, the keyboard 106 possesses the same function as the keyboards 5-1 to 5-N and/or the keyboards of the personal computers 4-1 to 4-N in FIG. 2, and the scanner 107 has the same function as the scanner 8 illustrated in FIG. 2.

Similarly, the element memory means 110 is identical in function with the element D/B 22, the layout memory means 111 with the layout base D/B 23, and the page memory means 112 with the main D/B 21 respectively.

As illustrated in FIG. 30, the keyboard 106 is connected to the basic layout code setting means 101, the element input means 102, the element data key setting means 103, and the layout code conversion means 114.

The basic layout code setting means 101 sets the basic layout code (refer to FIG. 4) which is introduced at the step S1 of FIG. 3. The element data key setting means 103 sets the element data key illustrated in FIGS. 6 to 9 and FIG. 17.

The element input means 102 effects the vector conversion of the document data introduced through the keyboard 106 and the image data introduced through the scanner.

The layout code conversion means 114 converts the "layout code" part of the basic layout code introduced through the basic layout code setting means 101 into data (document) control No. and page.

The basic layout code setting means 101 is connected to the layout memory means 111 in the memory means 113. The layout memory means 111 is connected to the layout code conversion means 114.

The element input means 102 and the element data key setting means 103 are connected to the element memory means 110 in the memory means 113.

The element memory means 110 is connected to the coordinates setting means 104 and the page data setting means 105. The coordinates setting means 104 exhibits on the display means 109 the element data key supplied from the element memory means 110 and the element data corresponding to the element data key, sets the coordinates of the element data moved by the manipulation of the mouse 108, and supplies the information on the coordinates to the display means 109 and the page data setting means 105.

The output code conversion means 114 calls out a desired basic layout code memorized in the layout memory means 111, to convert into such a converted layout code as shown in the lower part of FIG. 12, and supplies the converted layout code to the page data setting means 105 and the display means 109.

The page data setting means 105 forms such data for one page as shown in FIG. 18 by using the element data key and the element data supplied from the element memory means 110, the converted layout code supplied from the layout code conversion means 114, and the information on coordinates supplied by the coordinates setting means 104, and supplies the data to the page memory means 112 in the memory means 113.

The element input means 102 is connected to the display means 109 as shown with a broken line, indicating that when documents are introduced through the keyboard 106, the data of documents are displayed on the display means 109.

In the editing apparatus constructed as described above, in the production of a new book, information for designating the basic layout of one page, i.e., the layout code for discrimination of the layout data and the layout data for indicating the basic layout of each of the pages of the book, are introduced through the keyboard 106. The information is reconstructed in such a basic layout code as shown in FIG. 4 at the basic layout code setting means 101. The basic layout code is memorized in the layout memory means 111.

The introduction and memorization of the basic layout may be performed a plurality of times as occasion demands.

Then, the element data key corresponding to the element date to be introduced is injected through the keyboard 106. The element data key is set in such a form as shown in FIGS. 6-9 and FIG. 17 in the element data key setting means 103.

After the introduction of the element data key, the data on the document and/or machine sort are introduced through the keyboard 106 or the images are taken in through the scanner 107 and those data fed out to the element input means 102. In the element input means 102, the LEN of the element data is added to the element data as occasion demands and the LEN-added element data are supplied in combination with the element data key to the element memory means 110 and stored therein.

Then, the necessary part of the basic layout code memorized in the layout memory means 111, namely the basic layout code in which the layout information of pages to be edited are set, are read out of the layout memory means 111 by the introduction of the layout code through the keyboard 106 and supplied to the layout code conversion means 114.

In the layout code conversion means 114, the "layout code" part of the basic layout code mentioned above is converted into data control No. and page introduced through the keyboard 106. As the result, the converted layout code (shown in the lower part of FIG. 12) is formed. The converted layout code is supplied to the page data setting means 105 and the display means 109.

From the element memory means 110, the element data or the LEN and the element data to be used for editing a page and the element data key corresponding to the element data are supplied to the page data setting means 105 and the coordinates setting means 104. The coordinates setting means 104 supplies the element data to the display means 109.

When the element data displayed on the display means 109 are moved by the use of the mouse 108, the coordinates of the position after completion of the movement are set by the coordinates setting means 104 and these coordinates are transferred to the page data setting means 105.

Optionally a plurality of such element data are displayed at pertinent positions on the basis layout.

When the work of editing one page is completed, the page data setting means 105 forms such data for one page as illustrated in FIG. 18, based on the output signals from the layout code conversion means 114, the element memory means 110, and the coordinates setting means 104. To be more specific, the data for one page are composed of the converted layout code fed out of the layout code conversion means 114, the layout on editing consisting of the positional coordinates fed out of the coordinate setting means 104 and the element data key of the element data corresponding to the positional coordinates, the group of element data which comprise the element data key forming the layout on the editing and the element data corresponding to the element data key.

The data for one page formed in the page data setting means 105 are memorized in the page memory means 112. In the page memory means 112, the edited data of as many pages as required to produce a book are stored. The data are supplied to a hard copy forming device (not shown).

The various function-materializing means illustrated in FIG. 30 except for the keyboard 106, the scanner 107, the mouse 108, the display means 109, and the memory means 113 are provided in the editing devices 3-1 to 3-N and/or the system controller 2 in FIG. 2.

FIG. 31 is a flow chart illustrating the procedure of editing according to the FIG. 30 embodiment.

With reference to FIG. 31, when the layout code corresponding to the layout data to be newly set at the step S160A is introduced and then the layout data are introduced at the step S161A, such a basic layout code as shown in FIG. 4 is formed from the layout code and the layout at the step S162A and are memorized in the basic layout D/B 23 (FIG. 2), or the layout memory means 111 in FIG. 30.

The embodiment has been depicted as so constructed that the introduction of the layout data is effected after the introduction of the layout code is made. Optionally, this embodiment may be modified so that the introduction of the layout data is first made at the step S160 and then the introduction of the layout code corresponding to the layout data is effected at the step S161A.

At the step S163A, a decision is made as to whether the memorization of the basic layout code is completed or not. If it has been completed, the processing proceeds to step S164A. When the memorization of the basic layout code is to be continued, the process returns to the step S160A.

At the step A164A, the various kinds of element data are introduced in combination with the temporary key to be memorized in the element D/B 22 (FIG. 2).

Optionally in this case, the element data key may be directly introduced in the place of the temporary key.

When the editing is performed for the production of a new book, the layout code corresponding to the basic layout desired to be exhibited on the display is introduced at the step A165A.

When the introduction of the layout code is completed, the layout data corresponding to the layout code, namely, the basic layout, is called out and exhibited on the display at the step S166A.

When the data control No. and the page number are introduced at the step S167A, the "layout code" part of the basic layout code called out at the step S168A is rewritten into the data control No. and the page number.

The basic layout code whose "layout code" part has been rewritten into the data control No. and the page number is memorized as the converted layout code at the step S169A.

When the temporary key corresponding to the element data desired to be displayed on the basic layout is introduced at the step S166, the element data are dumped on the basic layout at the step A167.

At the step S168, the coordinates of the element data on the basic layout are injected by moving the element data displayed on the display to a desired position on the basic layout by the use of a mouse, for example. At the step S169, the temporary key of the element data used as described above for editing is converted into the element data key.

At the step S170, decision is made as to whether the editing of one page has been completed or not. When the editing has not been completed, the processing returns to the step S166.

When the editing of one page has been completed, the data for one page are memorized at step 171 in the page memory means 112 (FIG. 30), with the processing brought to completion.

The embodiment of FIGS. 30 and 31 brings about the following effects.

(1) Since the various kinds of element data concerning documents, illustrations, photographs, etc., the basic layout for one page, and the positional coordinates of the layout data on the basic layout are handled independently of one another and the data for one page are set by using them, when a new book similar to an already edited book is to be produced, the common element data can be effectively used for the production of the new book. As the result, the time for editing the new book is decreased notably and the production of the new book can be performed quickly.

(2) This embodiment permits use of the basic layout by memorizing the basic layout in the memory means, calling out the basic layout from the memory means as occasion demands, and converting the key of the basic layout into the data control No. of the book to be edited and the number of page to be edited. It is, therefore, not required to set layout data for the basic layout each time the editing of a page is to be performed.

(3) Since this embodiment permits preparatory formation and memorization of the basic layout code comprising a layout code and layout data, the basic layout information for a page to be edited (namely, the layout data as illustrated in FIG. 4) can be set only by calling out the basic layout code. In other words, this embodiment does not require the layout information to be set each time the editing of a page is to be performed. As the result, the time required for editing a book is decreased notably and the production of the book can be performed quickly.

Figure 32:
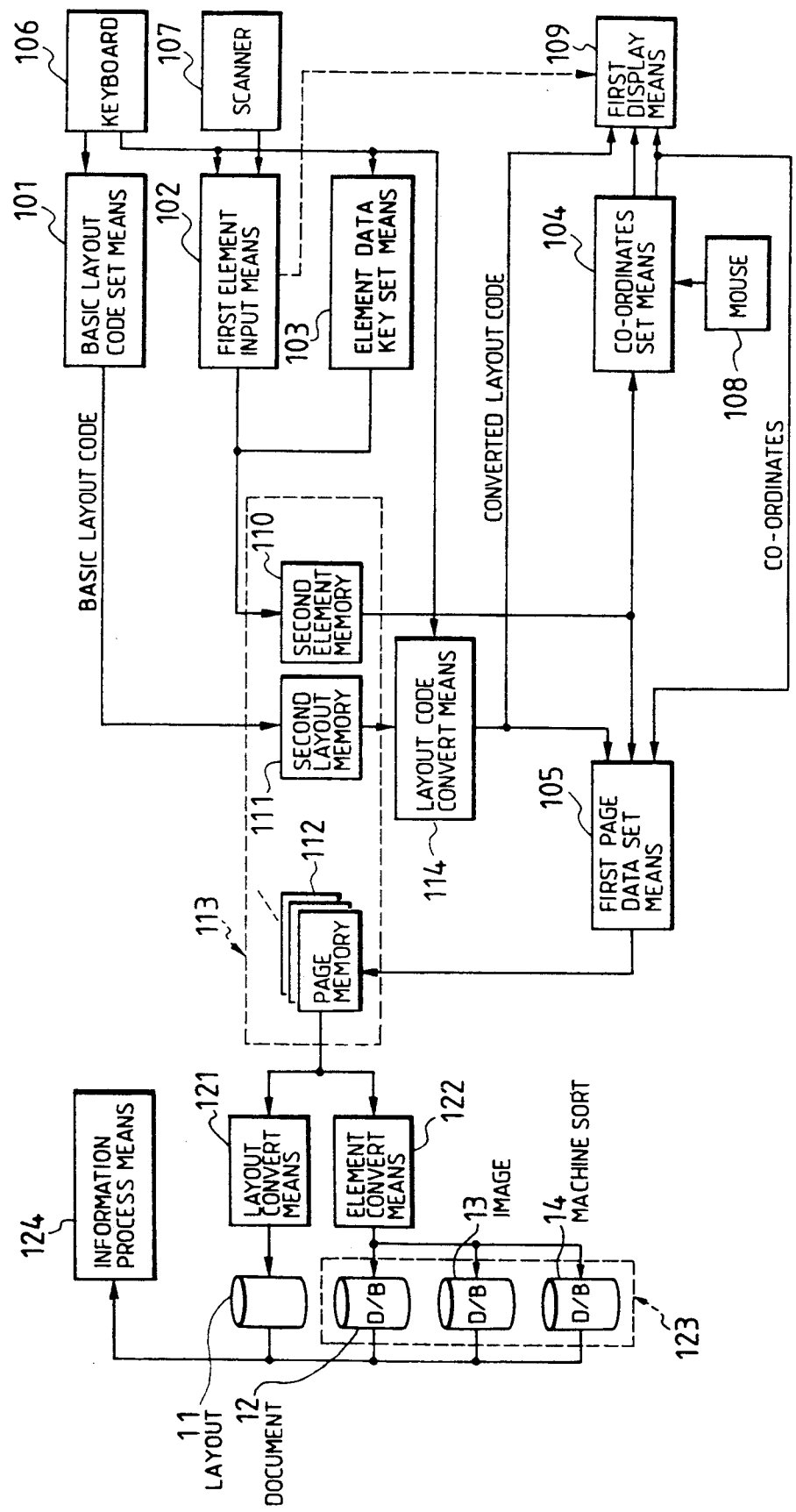
FIG. 32 is a functional block diagram of another embodiment of the invention.

FIG. 32 is a functional block diagram illustrating another typical editing apparatus embodying the present invention. In FIG. 32, reference numerals which are the same as those in FIG. 2 denote identical or similar parts.

With reference to FIG. 32, the keyboard 106 is identical in function with the keyboards 5-1 to 5-N and/or the personal computers 4-1 to 4-N illustrated in FIG. 2 and the scanner 107 is identical in function with the scanner 8 in the same drawing.

Similarly, the element memory means 110 is identical in function with the element D/B 22 of FIG. 2, the layout memory means 111 with the layout basic D/B 23, and the page memory means 112 with the book D/B 21.

as illustrated in FIG. 32, the keyboard 106 is connected to the basic layout code setting means 101, the element input means 102, the element data key setting means 103, and the layout code conversion means 114.

The basic layout code setting means 101 sets the basic layout code (refer to FIG. 4) introduced at the step S1 of FIG. 3.

The element data key setting means 103 sets the element data key illustrated in FIGS. 6 to 9 and FIG. 17.

The element input means 102 receives the data of documents introduced through the keyboard 106 and the image data introduced through the scanner 107 as converted in vectors.

The layout code conversion means 114 converts the "layout code" part of the basic layout code introduced in the basic layout code setting means 101 into data control No. and page.

The basic layout code setting means 101 is connected to the layout memory means 111 in the memory means 113. The layout memory means 111 is connected to the layout code conversion means 114.

The element input means 102 and the element data key setting means 103 are connected to the element memory means 110 in the memory means 113. The element memory means 110 is connected to the coordinates setting means 104 and the page data setting means 105. The coordinates setting means 104 exhibits on the display means 109 the element data key supplied from the element memory means 110 and the element data corresponding to the element data key, sets the coordinates of the element data moved by the manipulation of the mouse 108, and supplies the information on the coordinates to the display means 109 and the page data setting means 105.

The layout code conversion means 114 calls out a desired basic layout code stored in the layout memory means 111, converts the code into such a converted layout code as shown in the lower part of FIG. 12, and supplies the converted layout code to the page data setting means 105 and the display means 109.

The page data setting means 105 forms such data for one page as illustrated in FIG. 18 by using the element data key and the element data fed out of the element memory means 110, the converted layout code fed out of the layout code conversion means 114, and the information on coordinates fed out of the coordinates setting means 104 for supply to the page memory means 112 in the memory means 113.

The element input means 102 is connected with a broken line to the display means 109, indicating that when the documents and others are introduced through the keyboard 106, the data of documents are displayed on the display means 109.

The page memory means 112 is connected to the layout conversion means 121 and the element conversion means 122.

The layout conversion means 121 erases the LEN and the element data from the group of element data for one page (FIG. 18) memorized in the page memory means 112 to form such layout information as illustrated in FIG. 19. The layout conversion means 121 is connected to the layout D/B 11 which is connected to the data processing means 124.

The element conversion means 122 copies the group of element data from the one page data memorized in the page memory means 112 and decomposes the group of element data into units of element. The element conversion means 122 is connected to the memory means 123 which is connected to the data processing means 124. The memory means 123 is provided with the document (sentence) D/B 12, the image D/B 13, and the machine sort information D/B 14.

In the FIG. 32 embodiment of this invention, the information for designating the basic layout for one page is introduced through the keyboard 106 as the first step to the production of a new book. This information is reconstructed in such a basic layout code as illustrated in FIG. 4 in the basic layout code setting means 101. The basic layout code is memorized in the layout memory means 111.

The introduction and memorization of the basic layout may be performed a plurality of time as occasion demands.

Then, the element data key corresponding to the element data to be introduced is injected through the keyboard 106. The element data key is set in such a form as illustrated in FIGS. 6 to 9 and FIG. 17 in the element data key setting means 103.

After the introduction of the element data key, the data of document and/or machine sort are injected through the keyboard 106 or the images are read in through the scanner 107 and these data are supplied to the element input means 102. The element input means 102 attaches the LEN of the element data to the element data as occasion demands and supplies the LEN-added element data in combination with the element data key to the element memory means 110 for storage therein.

Then, the necessary part of the basic layout code memorized in the layout memory means 111, namely the basic layout code serving to set the layout data of the page to be edited, is read out of the layout memory means 111 by introducing the layout code through the keyboard 106, and supplied to the layout code conversion means 114.

in the layout code conversion means 114, the "layout code" part of the basic layout code is converted into the data control No. and the page introduced through the keyboard 106. As the result, the converted layout code (in the lower part of FIG. 12) is formed. The converted layout code is output to the page data setting means 105 and the display means 109.

From the element memory means 110, the element data or the LEN and the element data to be used for editing a page and the element data key corresponding to the element data are supplied to the page data setting means 105 and the coordinates setting means 104. The coordinates setting means 104 outputs the element data on the display means.

When the element data exhibited on the display means 109 is moved with the mouse 108, the coordinates of the position after completion of the movement are set by the coordinates setting means 104 and transferred to the page data setting means 105.

Optionally, a plurality of such element data are displayed at pertinent positions on the basic layout.

When the work of editing one page is completed, the page date setting means 105 forms one such page data as illustrated in FIG. 18, based on the output signals from the layout code conversion means 114, the element memory means 110, and the coordinates setting means 104. To be more specific, the one page data are composed of the converted layout code fed out of the layout code conversion means 114, the layout on editing consisting of the positional coordinates fed out of the coordinates setting means 104 and the element data key of the element data corresponding to the positional coordinates, and the group of element data which comprise the element data key forming the layout on editing and the element data corresponding to the element data key.

The one page data formed in the page data setting means 105 are memorized in the page memory means 112. In the page memory means 112, as many pages of edited data as required for the production of a book are memorized. The data are supplied to a hard copy forming device (not shown).

The data for one page memorized in the page memory means 112 are transferred to the layout conversion means 121. In the layout conversion means 121, such information on layout as shown in FIG. 19 is formed from the data for one page.

The data on layout are transferred to and memorized in the layout D/B 11.

The one page data memorized in the page memory means 112 are transferred to the element conversion means 122. The element conversion means 122 copies the group of element data from the data for one page and decomposes the group of element data into units of element. Of the group of decomposed element data, those concerning the element of document are memorized in the document D/B 12, those concerning the image element in the image D/B 13, and those concerning the element on machine sort information in the machine sort information D/B 14.

The data memorized in the document D/B 12, the image D/B 13 and the machine sort information D/B 14, and the layout information memorized in the layout D/B 11 are called out by the data processing means 124 and are utilized for various data processing and search functions to be executed by the data processing means 124.

The basic layout code setting means 101, the element input means 102, the element data key setting means 103, the coordinates setting means 104, the page data setting means 105, and the layout code conversion means 114 illustrated in FIG. 32 are severally provided in the editing devices 3-1 to 3-N and/or the system controller 2 or the personal computers 4-1 to 4-N. The layout conversion means 121 and the element conversion means 122 are provided in the host computer 1 or the system controller 2.

The embodiment illustrated in FIG. 32 is depicted as constructed so that the basic layout code is preparatorily set in the layout code setting means 101 and the basic layout code in which the layout of a page to be edited is called out by using the layout code and the "layout code" part of the basic layout code is converted in the layout code conversion means 114 into the data control No. and the page before the actual work of editing is started. Owing to this construction, the FIG.

32 embodiment enjoys the advantage that the data on layout of a page to be edited (namely the layout data shown in FIG. 4) are not required to be set each time the editing of a page is to be performed.

This invention is not restricted to the embodiment described above. Optionally, the embodiment may be modified so that the converted layout code illustrated in the lower part of FIG. 12 is directly set by introducing the data control No. and the page during the introduction of the layout data. In this case, since the converted layout code is intended to determine the layout solely of the page to be edited, it is not required to be memorized in the layout memory means 111. This modified construction is not well suited to the editing of a book having a large number of pages because the setting of the layout code must be made each time the editing of a page is performed. The modified construction, however, is simple as compared with that illustrated in FIG. 32.

The embodiment illustrated in FIG. 32 is depicted as so constructed that the image part of the data of each of the elements decomposed in the element conversion means 122 is memorized in the image D/B 13 and the machine sort part thereof in the machine sort information D/B 14. This invention is not restricted to this embodiment. Optionally, the embodiment may be modified so that either of the image D/B 13 and the machine sort information D/B 14 is provided and utilized for memorizing both the data concerning images and the data concerning the machine sort information. The data concerning the images and the machine sort can be handled as those of the same form because they are furnished with element data keys of a fixed same format.

Further, when the element data key of the data concerning the documents illustrated in FIG. 17 and the element data key of the data concerning the image and the machine sort information are used in the same format, the data concerning documents can be additionally memorized in the D/B intended to memorize the data on images and machine sort information.

The embodiment described above is depicted as so constructed that the one page data formed in the page data setting means 105 are memorized in the page memory means 112. This invention is not restricted to this embodiment. Optionally, this embodiment may be modified so that the one page data are directly supplied to the layout conversion means 112 and the element conversion means 122.

The FIG. 32 embodiment of this invention attains the following effect.

Since this embodiment is so constructed that the various kinds of element data on documents, illustrations, photographs, etc., the basic layout of one page, and the positional coordinates of the layout data on the basic layout are handled independently of one another, the one page data are set by using them, the one page data are decomposed into those concerning the layout and those concerning the elements, and the decomposed parts of data are memorized in the memory devices connected to the data processing means for carrying out data processing other than editing, it permits the information of the edited book to be examined, searched, or utilized in units of element with the aid of the data processing means or personal computers (terminal devices) connected to the data processing means.

Figure 33:
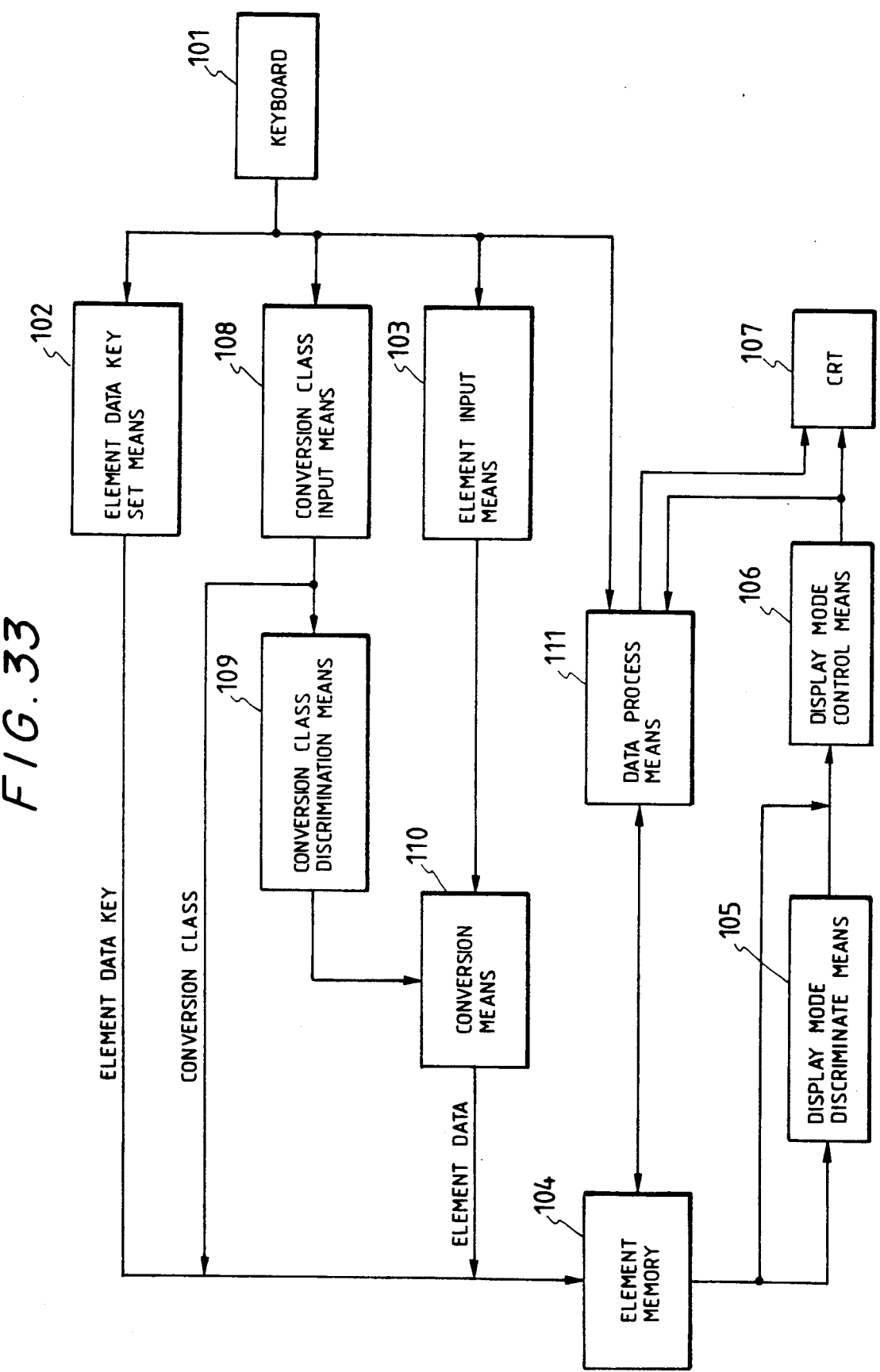
FIG. 33 is a functional block diagram of another editing apparatus as another embodiment of this invention.

FIG. 33 is a functional block diagram illustrating still another typical data processing apparatus embodying this invention.

With reference to FIG. 33, the keyboard 106 is identical in function with the keyboards 5-1 to 5-N and/or the keyboards of the personal computers 4-1 to 4-N illustrated in FIG. 2, the element memory means 110 with the element D/B 22, and the CRT 109 with the CRT's 6 and 10 and/or the CRT's of the personal computers 4-1 to 4-N.

As illustrated in FIG. 33, the keyboard 106 is connected to the element data key setting means 103, the element input means 102, the conversion classification input means 108A, and the data processing means 111A.

The data processing means 111A is connected to the CRT 109 and utilized for various sorts of data processing such as editing.

The element data key setting means 103 sets such an element data key as illustrated in FIGS. 7 and 8 and containing at least the information of image classification.

The element input means 102 receives such numerical data as service data and torques which are introduced through the keyboard 106.

The conversion classification input means 108A takes in the information of conversion classification introduced through the keyboard 106 before the introduction of the numerical data such as service data and torques (element data) which have been already described with reference to FIGS. 7 and 8.

The conversion classification input means 108A is connected to the conversion classification discrimination means 109A which discerns the contents of the information of conversion classification.

The element input means 102 and the conversion classification discrimination means 109A are connected to the conversion means 110A. The conversion means 110A converts the numerical data such as service data and torques which are received through the element input means 102 into units of at least one kind other than the units used at the time of the introduction, depending on the information on classification of conversion discriminated by the conversion classification discrimination means 109A and suffixes the converted data to the input data mentioned above.

The element data key setting means 103, the conversion classification input means 108A, and the conversion means 110A are connected to the element memory means 104 which memorizes such data for one element as illustrated in FIGS. 7 and 8.

The element memory means 110 is energized by the control signal supplied from the data processing means 111A and supplies to the display mode discrimination means 105A and the display mode control means 106A the one element data necessary for the data processing to be performed by the data processing means 111A.

The display mode discrimination means 105A discriminates the mode of display of the element data, based on the information of the image classification and the conversion classification which are included in the data for one element. The discrimination signal is supplied to the display mode control means 106A in combination with the one element data fed out of the element memory means 110.

The display mode control means 106A controls the CRT 109 for display of the numerical data such as service data and torques in a pertinent form, based on the display mode discriminating signal and the data of one element.

The operation of the FIG. 33 embodiment will be explained in detail below, as applied to the introduction of service data, with reference to FIG. 33 and FIGS. 7 and 10.

First the element data key corresponding to the element data to be introduced (namely the service data) is introduced through the keyboard 106. The element data key contains at least the information on images classification.

The element data key is set in such a form as illustrated in FIG. 7 in the element data key setting means 103.

After the introduction of the element data key is completed, the conversion classification is introduced through the keyboard 106. The conversion classification is taken in through the conversion classification input means 108A and the data on conversion classification is discriminated in the conversion classification discrimination means 109A. The conversion classification data which have been discriminated are supplied to the conversion means 110A.

When the introduction of the data on conversion classification is completed, the service data are introduced in a pertinent unit (such as, for example, [mm]). The numerical data are taken in through the element input means 102 and set in the first data part (refer to FIGS. 7 and 10).

When the introduction of the numerical data is completed, the data are transferred to the conversion means 110A.

In the conversion means 110A, the numerical data set in the first data part are converted into at least one unit (such as, for example, [in]) other than the unit mentioned above, depending on the data of conversion classification which have been discriminated in the conversion classification discrimination means 109A. The data resulting from the conversion are set in the second or subsequent data part. Thus, the element data are set as shown in FIGS. 7 and 10.

The element data key fed out of the element data key setting means 103, the conversion classification fed out of the conversion classification input means 108A, and the element data fed out of the conversion means 110A are transferred to the element memory means 110. In the element memory means 110, the one element data are memorized in such a format as shown in FIG. 7, using the various kinds of data mentioned above.

The data processing means 111A performs various kinds of data processing such as editing, depending on the data introduced through the keyboard 106 and supplies the data necessary for the data processing to the CRT 109. When the data processing means 111A energizes the element memory means 110 in accordance with the necessity for data processing, the one element data which are necessary for the data processing are supplied to the display mode discrimination means 105 and the display mode control means 106A.

As described above, the display mode discriminating means 105A discriminates the mode of display of element data in accordance with the information of the image classification and the conversion classification. The display mode control means 106A controls the CRT 109, based on the information of display mode and the element data (service data), so that the service data are displayed in the pertinent mode or form. The mode of display is as shown in FIG. 25.

The various function-materializing means illustrated in FIG. 33 except for the keyboard 106, the element memory means 110, the CRT 109, and the data processing means 111 are provided in the editing devices 3-1 to 3-N or the personal computer 4-1 to 4-N.

In the embodiment described above, the display mode discrimination means 105A is depicted as adapted to discriminate the display mode of the element data, based on the information on the image classification and the conversion classification of the element data key which is included in the data for one element. The present invention is not restricted to this embodiment. The embodiment may be modified so that the discrimination of the mode of display of the element data is attained by the sole use of the information on the image classification.

This invention has been described as embodied in the editing apparatus for books, which includes the host computer 1, the system controller 2, and the editing devices 3-1 to 3-N. This invention is not restricted to this embodiment. The invention may be embodied in a data processing apparatus which is composed of only personal computers, for example.

In accordance with the FIG. 33 embodiment, at least the information on image classification and the conversion classification are introduced before the introduction of the numerical data, the numerical data introduced in a specific unit are converted into those in at least one unit other than the unit mentioned above, depending on the information of conversion classification, and the numerical data resulting from the conversion are suffixed to the introduced numerical data, and the mode of display of the numerical data is controlled based on the information of the image classification and/or the conversion classification. The present embodiment, therefore, brings about the following effect.

(1) When the data processing such as for display of the numerical data in some other pertinent unit than a specific unit which is originally introduced, is performed the operation of conversion is automatically carried out according to the introduction of the data on conversion classification. The burden on the operator of the data processing apparatus, therefore, is alleviated and the data processing can be carried out efficiently.

(2) Even when the numerical data are to be displayed in a plurality of units, input of one numerical data set in one specific unit suffices. The burden on the operator of the data processing apparatus, therefore, is alleviated and the data processing can be carried out efficiently.

INDUSTRIAL APPLICABILITY

As noted clearly from the foregoing description, this invention reduces the load upon a large computer and prevents the large computer from decline of its capacity for data processing. Since the transfer of data between a medial computer and the large computer is performed by batch processing, the amount of data processed within a fixed period is large and the time during which the large computer is occupied can be minimized.

When the data processing apparatus of this invention is used as an editing apparatus, the various kinds of element data concerning documents, illustrations, photographs, etc. are memorized in the D/B connected to the large computer. When the editing apparatus is used for the production of a new book similar to an already edited book, therefore, the element data of the already edited book can be commonly applied to the production of the new book by calling out the data memorized in the D/B. Since the data concerning elements and the data in units of a page or a book are memorized in the second D/B connected to the medial computer, minor corrections can be given to an already edited book or the edited book can be printed without starting the large computer. The time otherwise required in starting the large computer, therefore, is no longer necessary. Further, the work of editing can be attained efficiently because it can be performed without any restriction due to the time zone available for the use of the large computer.

When the various kinds of element data such as documents, photographs, and illustrations, which form one page are newly introduced, the simplified element data key (namely the temporary key) is attached to the element data, and the temporary key is converted to the normal element data key only when the element data are used for the actual work of editing. It, therefore, suffices to set the element data key corresponding to a part of the newly introduced element data which are used in the actual work of editing. In other words, there is no need of setting any element data key with respect to another part of the newly introduced element data which are not used in the actual work of editing.

As the result, the work of editing can be carried out efficiently and quickly.

Having thus described our invention, we claim:

1. An editing apparatus comprising means for setting a converted layout code designating a basic layout of a page to be edited, means for setting an element data key corresponding to element data, means for introducing element data forming each page subsequently to said element data key, means for setting positional coordinates of each element data on the basic layout, and means for setting a layout on editing based on the positional coordinates and the element data key of element data corresponding to the positional coordinates, setting a group of element data based on the element data key forming the layout on editing and the element data corresponding to the element data key, and setting data for one page based on the converted layout code, the layout on editing, and the group of element data.

2. An editing apparatus comprising means for setting a basic layout code designating a basic layout for one page, and consisting of a layout code and layout data, means for memorizing the basic layout code, means for setting an element data key corresponding to the element data, means for introducing element data forming each page subsequently to the element data key, means for setting a converted layout code by calling out a desired basic layout code memorized in said memorizing means and converting a portion of a the basic layout code into a data control number of a book to be edited and a serial number of a page to be edited, means for setting positional coordinates of each element data on the basic layout to be designated by the converted layout code, and means for setting a layout on editing from the positional coordinates and the element data key of element data corresponding to the positional coordinates, setting a group of element data from the element data key forming the layout on editing and the element data corresponding to the element data key, and setting data for one page from the converted layout code, the layout on editing, and the group of element data.

3. An editing apparatus comprising means for setting a converted layout code designating the basic layout of a page to be edited, means for setting a temporary key corresponding to element data which are newly introduced, means for introducing element data to form each page subsequently to the temporary key, means for memorizing the element data and the temporary key, means for setting positional coordinates of each element data called out of said memorizing means on the basic layout, means for converting a temporary key corresponding to the element data used in editing into an element data key, and means for setting a layout on the editing from the positional coordinates and the element data key of element data corresponding to the positional coordinates, setting a group of element data from the element data key forming the layout on editing and the element data corresponding to the element data key, and setting data for one page from the converted layout code, the layout on editing, and the group of element data.

4. An editing apparatus according to claim 3 wherein the means for setting a converted layout code comprises means for setting a basic layout code during the introduction of element data, means for storing the basic layout code, and means for converting the basic layout code read out of said storing means into a converted layout code during the course of editing.

5. A computer implemented method for editing which comprises setting a temporary key corresponding to newly introduced element data forming each page, introducing the element data subsequently to the temporary key, temporarily memorizing the element data and the temporary key, setting a converted layout code designating the basic layout of a page to be edited, reading out element data necessary for editing by means of a temporary key corresponding to the element data, setting positional coordinates of each element data on the basic layout, converting the temporary key corresponding to the element data used for editing into an element data key, and setting data for one page by using the converted layout code, the element data used for editing, the element data key corresponding to the element data, and the positional coordinates of the element data.

6. A method according to claim 5, wherein the converted layout code consists of layout data and layout code and is set by reading out a basic layout code registered in the course of editing and modifying the layout code.

7. An editing apparatus comprising means for setting a converted layout code designating the basic layout of a page to be edited, means for setting an element data key corresponding to element data, means for introducing element data forming each page subsequently to the element data key, means for setting positional coordinates of each element data on the basic layout, and means for setting a layout on editing from the positional coordinates and the element data key of element data corresponding to the positional coordinates, setting a group of element data from the element data key forming the layout on editing and the element data corresponding to the element data key, and setting data of one page from the converted layout code, the layout on editing, and the group of element data, a layout conversion means for setting layout information of one page from the data of one page to memorize in a memory means connected to a data processing means, and means for extracting element information of one page from the data of one page to memorize in the memory means.

8. An editing apparatus according to claim 7, wherein the means for setting a converted layout code comprises means for setting a basic layout code during the introduction of element data means for converting said basic layout code during the course of editing into a converted layout code.

9. An editing apparatus according to claim 8, which further comprises means adapted for temporary memorization of the element data key and element data corresponding to the element data key.

10. A data processing system comprising means for setting an element data key including at least information of image classification, means for introducing information of conversion classification designating the unit conversion of numerical data, means for introducing numerical data, means for identifying the information of conversion classification, means for converting the numerical data into other numerical data in at least one unit different from the unit used in the course of introduction of the numerical data, depending on the information of conversion classification and suffixing the converted numerical data to the numerical data introduced, means for memorizing the element data key, the information of conversion classification, and the numerical data as data for one element, means for discriminating the mode of display of the numerical data, based on the image classification or the information of image classification and the conversion classification of the one element data read out of the element memory means, and means for controlling the mode of display of the numerical data, based on an output signal from the means for discriminating the display mode.

* * * * *